US012676160B2

(12) United States Patent
Xuan et al.

(10) Patent No.: US 12,676,160 B2
(45) Date of Patent: Jul. 7, 2026

(54) SOUND SIGNAL PROCESSING METHOD AND ELECTRONIC DEVICE

(71) Applicant: Beijing Honor Device Co., Ltd., Beijing (CN)

(72) Inventors: Jianyong Xuan, Beijing (CN); Zhenyi Liu, Beijing (CN); Haikuan Gao, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 246 days.

(21) Appl. No.: 18/279,165

(22) PCT Filed: May 26, 2022

(86) PCT No.: PCT/CN2022/095354
§ 371 (c)(1),
(2) Date: Aug. 28, 2023

(87) PCT Pub. No.: WO2023/016053
PCT Pub. Date: Feb. 16, 2023

(65) Prior Publication Data

US 2024/0144948 A1 May 2, 2024

(30) Foreign Application Priority Data

Aug. 12, 2021 (CN) ......................... 202110927121.0

(51) Int. Cl.
*G10L 21/0208* (2013.01)

(52) U.S. Cl.
CPC ................................ *G10L 21/0208* (2013.01)

(58) Field of Classification Search
CPC .................................................. G10L 21/0208
See application file for complete search history.

(56) References Cited

U.S. PATENT DOCUMENTS 11,094,334 B2 8/2021 Wang et al.
11,871,188 B2 * 1/2024 Keum .................... H04R 3/005
(Continued)

FOREIGN PATENT DOCUMENTS

CN 104599674 A 5/2015
CN 104699445 A 6/2015
(Continued)

OTHER PUBLICATIONS

Premananda et al., Selective frequency enhancement of speech signal for intelligibility improvement in presence of near-end noise, Procedia Computer Science, 2015 (Year: 2015).*

*Primary Examiner* — Bhavesh M Mehta
*Assistant Examiner* — Eunice Lee
(74) *Attorney, Agent, or Firm* — WOMBLE BOND DICKINSON (US) LLP

(57) ABSTRACT

Embodiments of this application provide a sound signal processing method and an electronic device, which can reduce an interference sound signal in a sound during video recording and improve quality of a sound signal during the video recording. The method is applied to an electronic device. The method includes: acquiring, by the electronic device, a first sound signal; the first sound signal being a sound signal during video recording; processing, by the electronic device, the first sound signal to obtain a second sound signal; and outputting, by the electronic device, the second sound signal when playing back a recorded video file. Energy of a sound signal in the second sound signal in a non-target orientation is lower than energy of a sound signal in the first sound signal in the non-target orientation. The non-target orientation is an orientation outside a field of view range of a camera during video recording.

20 Claims, 38 Drawing Sheets

(56) References Cited

U.S. PATENT DOCUMENTS

| | | | | |
|---|---|---|---|---|
| 12,149,819 | B2 * | 11/2024 | Gove | G03B 15/006 |
| 2013/0322640 | A1 | 12/2013 | Dickins | |
| 2015/0163587 | A1 * | 6/2015 | Li | H04R 1/326 348/159 |
| 2019/0355384 | A1 * | 11/2019 | Sereshki | G10L 15/22 |
| 2020/0118580 | A1 | 4/2020 | Wang et al. | |
| 2021/0203295 | A1 * | 7/2021 | Mahadeva | H03G 3/32 |
| 2021/0217433 | A1 * | 7/2021 | Liu | G10L 13/02 |
| 2023/0370718 | A1 * | 11/2023 | Yang | H04N 23/6812 |

FOREIGN PATENT DOCUMENTS

| | | | | |
|---|---|---|---|---|
| CN | 106653041 | A | 5/2017 | |
| CN | 109036448 | A | 12/2018 | |
| CN | 111816183 | A | 10/2020 | |
| CN | 112351248 | A | 2/2021 | |
| CN | 112511943 | A | 3/2021 | |
| CN | 113299310 | A | 8/2021 | |
| WO | 2016183791 | A1 | 11/2016 | |
| WO | WO-2022022647 | A1 * | 2/2022 | G10L 21/0356 |

* cited by examiner

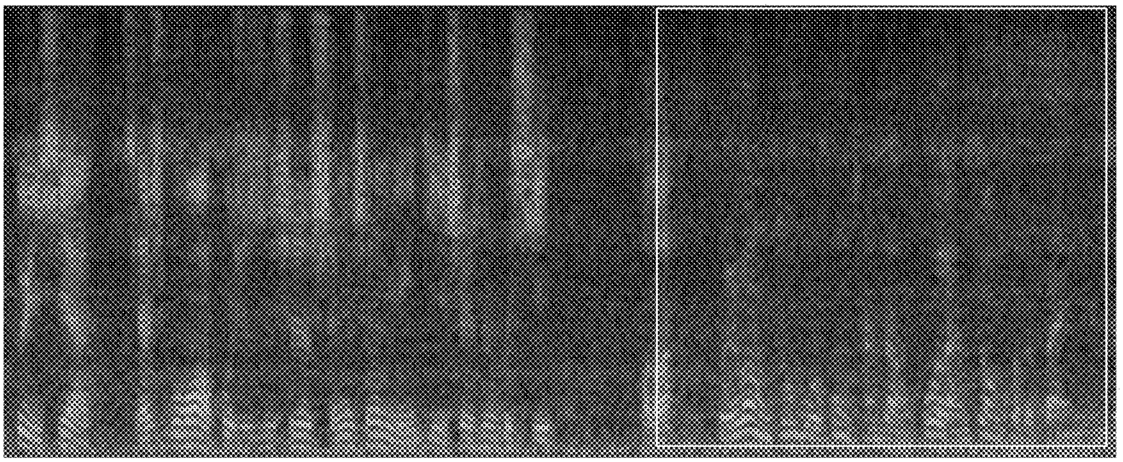
(a)
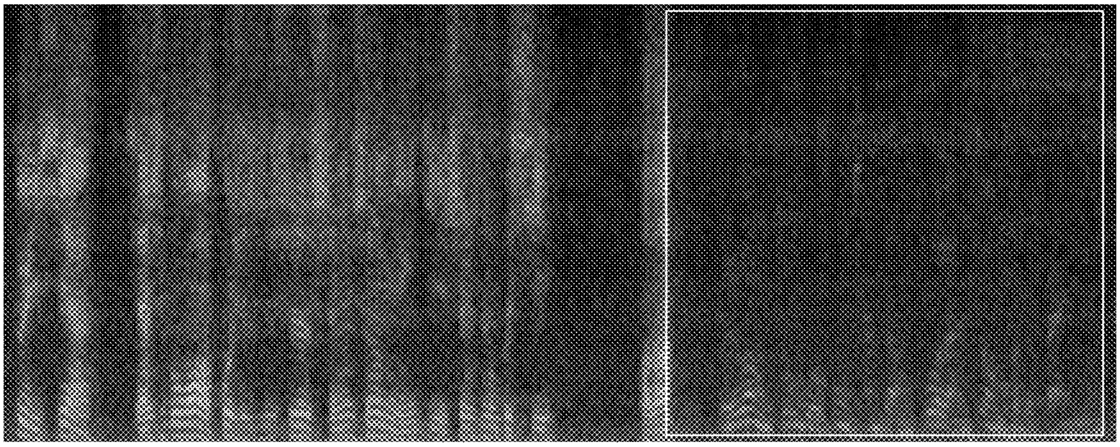
(b)
FIG. 11

(a)

(b)

(a)

(b)

5G 5G
8:00
Jan
15
Clock
Calender
Gallery
Memo
File management
E-mail
Music
Calculator
Settings
Recorder
Weather
Browser
2101
Camera
Address book
Phone
Messages

FIG. 21A(1)

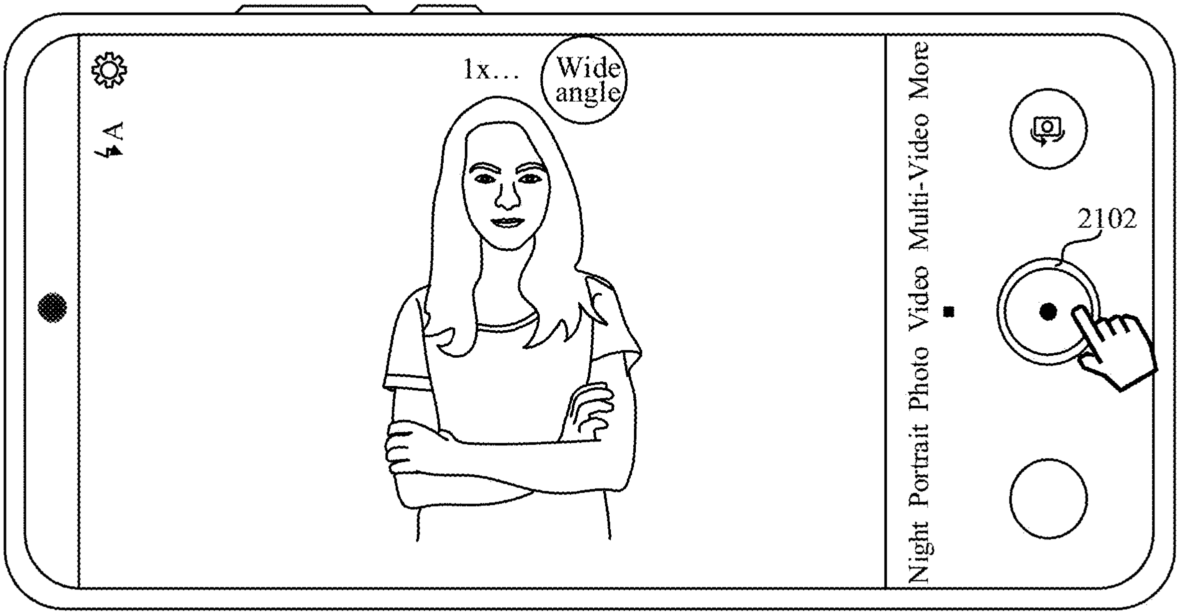
FIG. 21A(2)

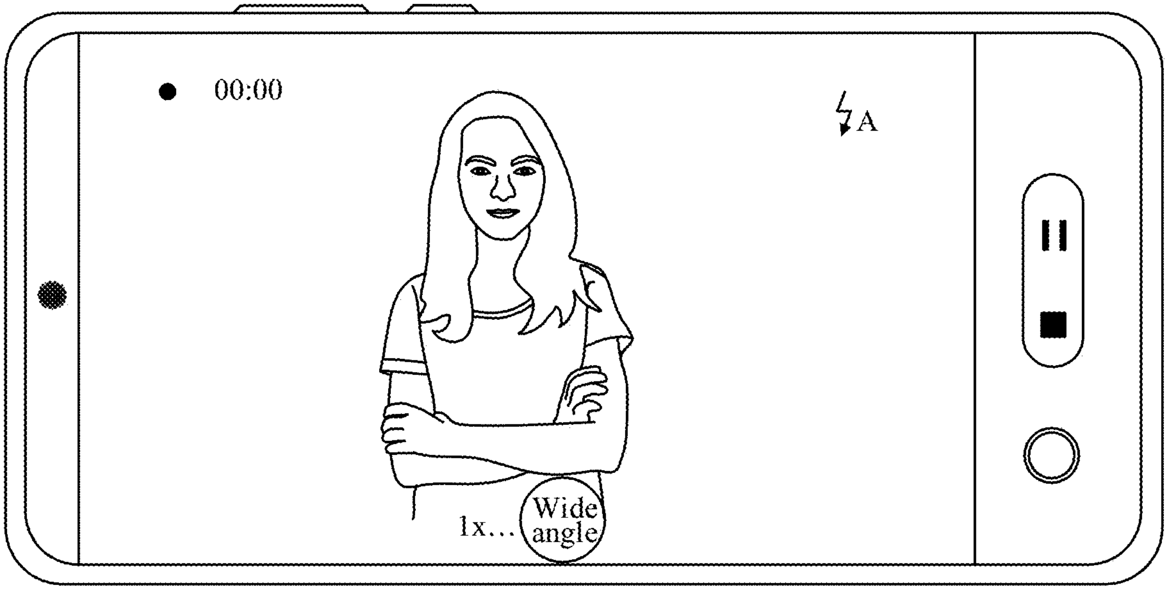
FIG. 21A(3)

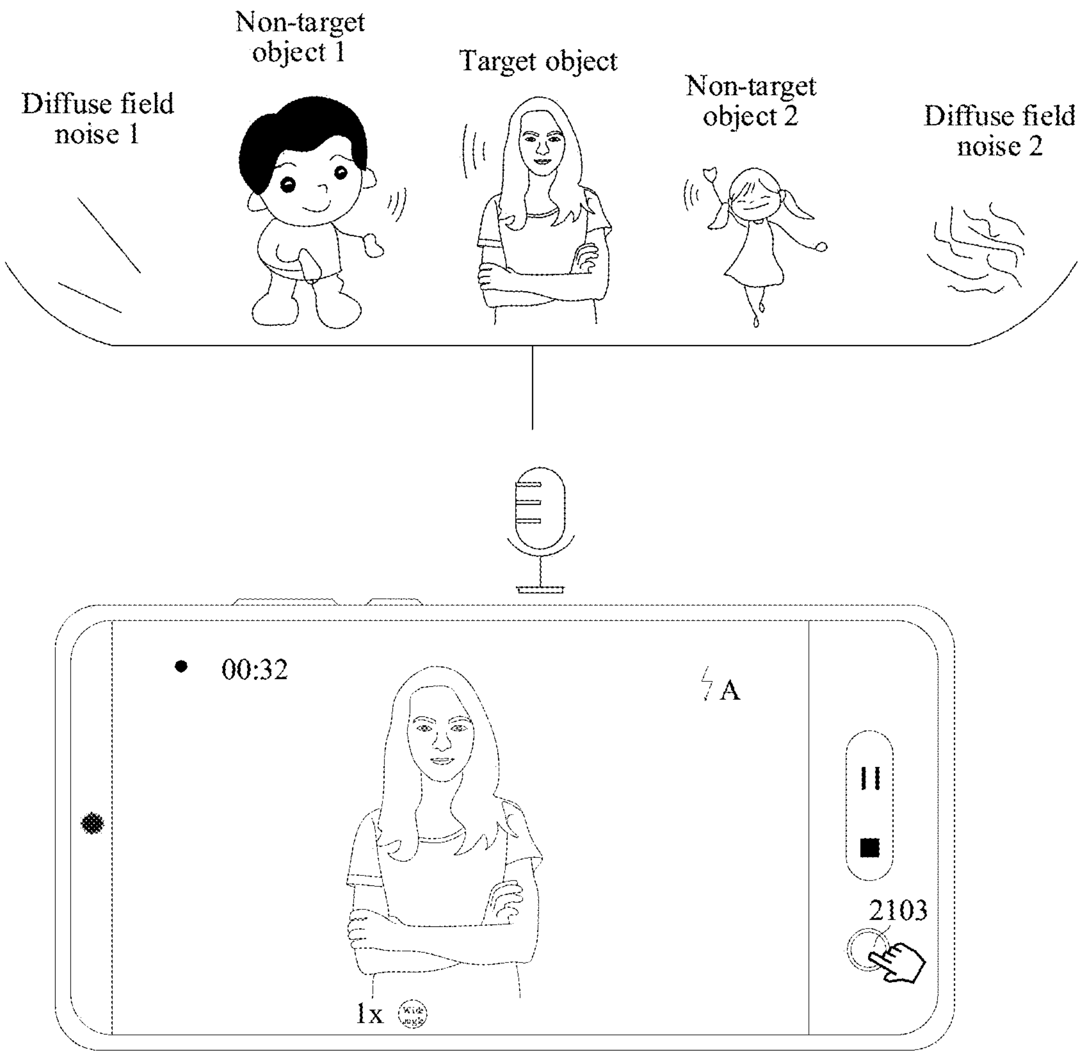
FIG. 21B(1)

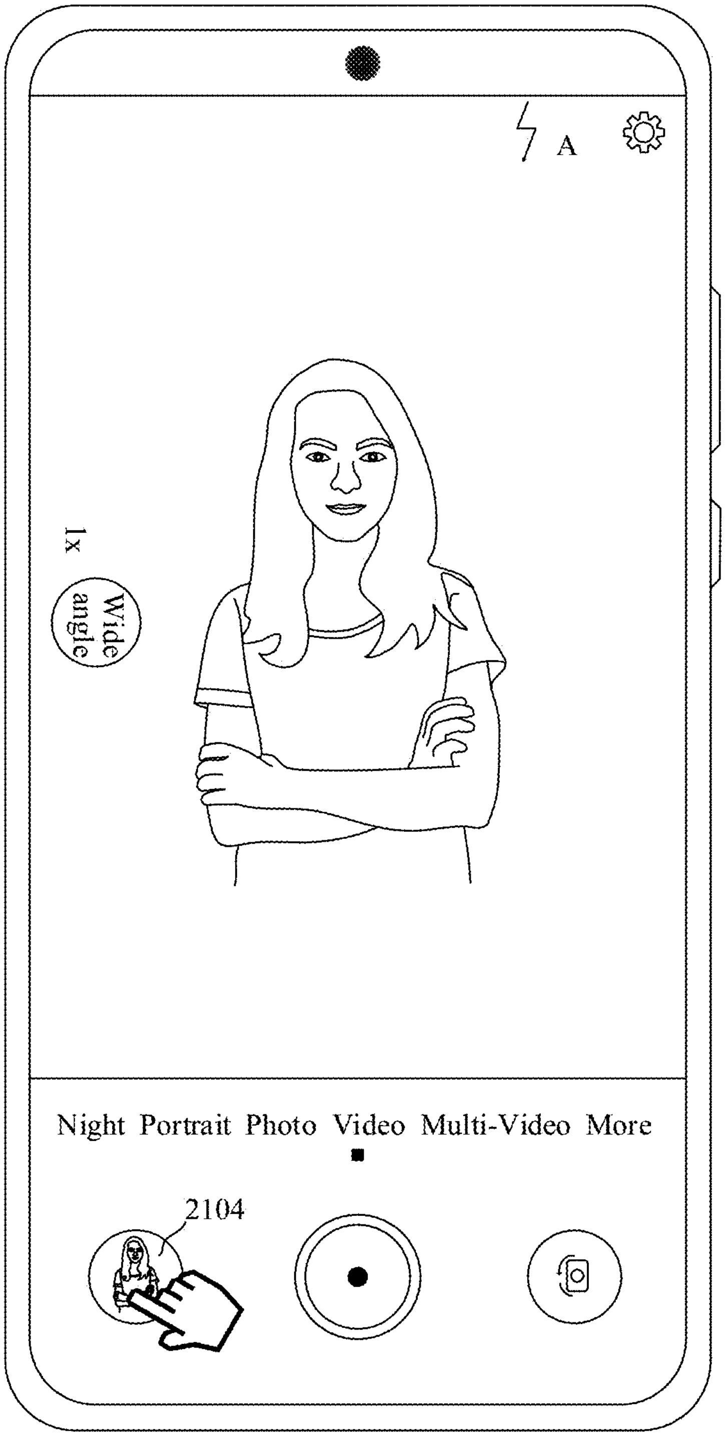
FIG. 21B(2)

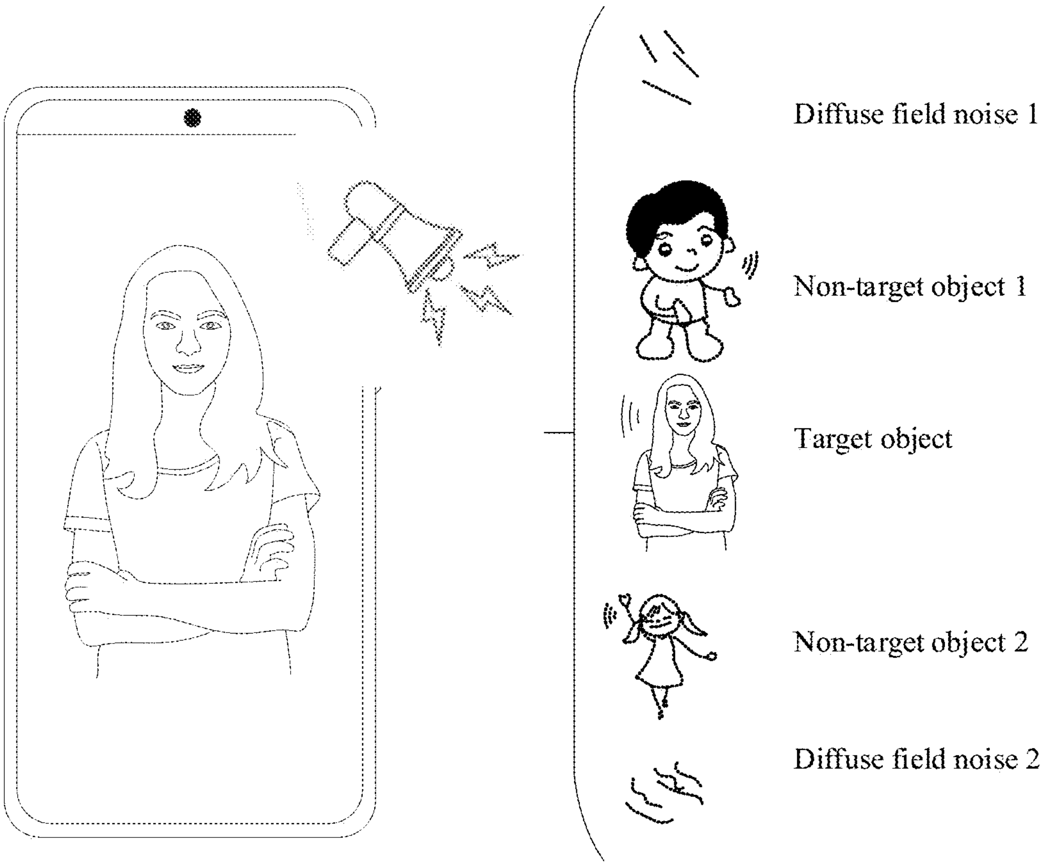
FIG. 21B(3)

CONT.FROM FIG. 25A

SOUND SIGNAL PROCESSING METHOD AND ELECTRONIC DEVICE

CROSS-REFERENCE TO RELATED APPLICATIONS

This application is a national stage of International Application No. PCT/CN2022/095354, filed on May 26, 2022, which claims priority to Chinese Patent Application No. 202110927121.0, filed on Aug. 12, 2021. The disclosures of both of the aforementioned applications are hereby incorporated by reference in their entireties.

TECHNICAL FIELD

This application relates to the field of electronic technologies, and in particular, to a sound signal processing method and an electronic device.

BACKGROUND

At present, a video recording function of an electronic device has become a function frequently used by people. With the development of short video and live streaming social software (applications such as Kuaishou and Douyin), recording high-quality video files is in demand.

An existing electronic device may collect sound signals around the electronic device during video recording, but some sound signals are interference signals, which are not desired by a user. Taking video recording by a front-facing camera as an example, when the electronic device records the user's selfie short video or live streaming, the electronic device may collect the user's own sound and sounds of surrounding environments. As a result, selfie sounds recorded by the electronic device are not clear enough, there is more interference, and quality of the sounds recorded by the electronic device is low.

SUMMARY

Embodiments of this application provide a sound signal processing method and an electronic device, which can reduce an interference sound signal in a sound during video recording and improve quality of a sound signal during the video recording.

To achieve the foregoing objective, this application provides the following technical solutions:

According to a first aspect, an embodiment of this application provides a sound signal processing method. The method is applied to an electronic device, the electronic device including a camera and a microphone. A first target object is within a shooting range of the camera, and a second target object is not within the shooting range of the camera. "A first target object is within a shooting range of the camera" may mean that the first target object is within a field of view range of the camera. The method includes: enabling, by the electronic device, the camera; displaying a preview interface, the preview interface including a first control; detecting a first operation on the first control; starting shooting in response to the first operation; displaying a shooting interface at a first moment, the shooting interface including a first image, the first image being an image captured by the camera in real time, the first image including the first target object, the first image not including the second target object; where the first moment may be any moment during the shooting; collecting, by the microphone, a first audio at the first moment, the first audio including a first audio signal and a second audio signal, the first audio signal corresponding to the first target object, the second audio signal corresponding to the second target object; detecting a second operation on a first control of the shooting interface; and stopping shooting and saving a first video in response to the second operation, where a first image and a second audio are included at the first moment of the first video, the second audio includes the first audio signal and a third audio signal, the third audio signal is obtained by the electronic device by processing the second audio signal, and energy of the third audio signal is lower than energy of the second audio signal.

Generally, when a user uses the electronic device for video recording, the electronic device collects sound signals around the electronic device through the microphone. For example, the electronic device may collect sound signals within the field of view range of the camera during video recording, the electronic device may also collect sound signals outside the field of view range of the camera during the video recording, and the electronic device may further collect ambient noise. In this case, the sound signals and the ambient noise outside the field of view range of the camera during the video recording may become interference signals.

Exemplarily, when the electronic device records a sound signal (that is, the second audio signal) of the second target object (such as a non-target object 1 or a non-target object), energy of the second audio signal may be reduced to obtain the third audio signal. In this way, in this embodiment of this application, the electronic device may process the sound signal (e.g., the sound signal collected by the microphone) during video recording and reduce energy of the interference signals (e.g., the energy of the second audio signal), so that the energy of the third audio signal outputted when a recorded video file is played back is lower than energy of a sound signal in the second audio signal in a non-target orientation, to reduce interference sound signals in the sound signal during the video recording and improve quality of the sound signal during the video recording.

In a possible implementation, the third audio signal being obtained by the electronic device by processing the second audio signal includes: configuring gain of the second audio signal to be less than 1; and obtaining the third audio signal according to the second audio signal and the gain of the second audio signal.

In a possible implementation, the third audio signal being obtained by the electronic device by processing the second audio signal includes: calculating, by the electronic device, a probability that the second audio signal is within a target orientation; where the target orientation is an orientation within a field of view range of the camera during video recording; and the first target object is within the target orientation, and the second target object is not within the target orientation; determining, by the electronic device, the gain of the second audio signal according to the probability that the second audio signal is within the target orientation; where the gain of the second audio signal is equal to 1 if the probability that the second audio signal is within the target orientation is greater than a preset probability threshold; and the gain of the second audio signal is less than 1 if the probability that the second audio signal is within the target orientation is less than or equal to the preset probability threshold; and obtaining, by the electronic device, the third audio signal according to the energy of the second audio signal and the gain of the second audio signal.

In the solution, the electronic device may determine the gain of the second audio signal according to the probability that the second audio signal is within the target orientation, so as to reduce the energy of the second audio signal to obtain the third audio signal.

In a possible implementation, the first audio further includes a fourth audio signal, the fourth audio signal being a diffuse field noise audio signal. The second audio further includes a fifth audio signal, the fifth audio signal being a diffuse field noise audio signal. The fifth audio signal is obtained by the electronic device by processing the fourth audio signal, and energy of the fifth audio signal is lower than energy of the fourth audio signal.

In a possible implementation, the fifth audio signal being obtained by the electronic device by processing the fourth audio signal includes: configuring gain of the fourth audio signal to be less than 1; and obtaining the fifth audio signal according to the fourth audio signal and the gain of the fourth audio signal.

In a possible implementation, the fifth audio signal being obtained by the electronic device by processing the fourth audio signal includes: performing suppression processing on the fourth audio signal to obtain a sixth audio signal; and performing compensation processing on the sixth audio signal to obtain the fifth audio signal. The sixth audio signal is a diffuse field noise audio signal, energy of the sixth audio signal is lower than the energy of the fourth audio signal, and the sixth audio signal is less than the fifth audio signal.

It should be noted that during the processing on the fourth audio signal, the energy of the sixth audio signal obtained by processing the fourth audio signal may be very low, thereby making diffuse field noise unstable. Therefore, through noise compensation on the sixth audio signal, the energy of the fifth audio signal obtained by processing the fourth audio signal can be more stable, so that the user has a better sense of hearing.

In a possible implementation, the method further includes: processing, by the electronic device, the first audio to obtain the second audio after the microphone collects the first audio at the first moment. In other words, the electronic device may process an audio signal in real time when the audio signal is collected.

In a possible implementation, the method further includes: processing, by the electronic device, the first audio to obtain the second audio after stopping shooting in response to the second operation. In other words, the electronic device may acquire a sound signal from a video file at the end of recording of the video file. Then, the sound signal is processed frame by frame in chronological order.

According to a second aspect, an embodiment of this application provides a sound signal processing method. The method is applied to an electronic device. The method includes: acquiring, by the electronic device, a first sound signal; the first sound signal being a sound signal during video recording; processing, by the electronic device, the first sound signal to obtain a second sound signal; and outputting, by the electronic device, the second sound signal when playing back a recorded video file. Energy of a sound signal in the second sound signal in a non-target orientation is lower than energy of a sound signal in the first sound signal in the non-target orientation. The non-target orientation is an orientation outside a field of view range of a camera during video recording.

Generally, when a user uses the electronic device for video recording, the electronic device collects sound signals around the electronic device through the microphone. For example, the electronic device may collect sound signals within the field of view range of the camera during video recording, the electronic device may also collect sound signals outside the field of view range of the camera during the video recording, and the electronic device may further collect ambient noise.

In this embodiment of this application, the electronic device may process the sound signal (e.g., the sound signal collected by the microphone) during video recording and suppress a sound signal in the sound signal in the non-target orientation, so that the energy of the sound signal in the second sound signal in the non-target orientation outputted when a recorded video file is played back is lower than energy of the sound signal in the first sound signal in the non-target orientation, to reduce interference sound signals in the sound signal during the video recording and improve quality of the sound signal during the video recording.

In a possible implementation, the acquiring, by the electronic device, a first sound signal includes: collecting, by the electronic device, the first sound signal in real time through a microphone in response to a first operation. The first operation is used for triggering the electronic device to start video recording or live streaming.

For example, the electronic device may collect the first sound signal in real time through the microphone when enabling a video recording function of the camera and starting the video recording. In another example, the electronic device may collect a sound signal in real time through the microphone when enabling a live streaming application (such as Douyin or Kuaishou) to start live video streaming. During video recording or live streaming, each time the electronic device collects a frame of sound signal, the electronic device processes the frame of sound signal.

In a possible implementation, before the acquiring, by the electronic device, a first sound signal, the method further includes: recording, by the electronic device, a video file. The acquiring, by the electronic device, a first sound signal includes: acquiring, by the electronic device, the first sound signal from the video file in response to ending of the recording of the video file.

For example, the electronic device may acquire a sound signal from the video file at the end of the recording of the video file. Then, the sound signal is processed frame by frame in chronological order.

In a possible implementation, the acquiring, by the electronic device, a first sound signal includes: acquiring, by the electronic device, the first sound signal from a video file saved by the electronic device in response to a second operation. The second operation is used for triggering the electronic device to process the video file to improve sound quality of the video file.

For example, the electronic device processes sound in a video file locally saved by the electronic device, and when the electronic device detects that the user indicates processing the above video file (e.g., click a "denoise" option button in a video file operation interface), the electronic device starts to acquire a sound signal of the video file. Moreover, the sound signal is processed frame by frame in chronological order.

In a possible implementation, the first sound signal includes a plurality of time-frequency voice signals. The processing, by the electronic device, the first sound signal to obtain a second sound signal includes: recognizing, by the electronic device, an orientation of each time-frequency voice signal in the first sound signal. If an orientation of a first time-frequency voice signal in the first sound signal is the non-target orientation, the electronic device reduces energy of the first time-frequency voice signal to obtain the second sound signal. The first time-frequency voice signal is any one of the plurality of time-frequency voice signals in the first sound signal.

In a possible implementation, the first sound signal includes a plurality of time-frequency voice signals. The processing, by the electronic device, the first sound signal to obtain a second sound signal includes: calculating, by the electronic device, a probability that each time-frequency voice signal in the first sound signal is within a target orientation; where the target orientation is an orientation within a field of view range of the camera during video recording; determining, by the electronic device, gain of a second time-frequency voice signal in the first sound signal according to a probability that the second time-frequency voice signal is within the target orientation; where the second time-frequency voice signal is any one of the plurality of time-frequency voice signals in the first sound signal; the gain of the second time-frequency voice signal is equal to 1 if the probability that the second time-frequency voice signal is within the target orientation is greater than a preset probability threshold; and the gain of the second time-frequency voice signal is less than 1 if the probability that the second time-frequency voice signal is within the target orientation is less than or equal to the preset probability threshold; and obtaining, by the electronic device, the second sound signal according to each time-frequency voice signal in the first sound signal and a corresponding gain.

In a possible implementation, energy of diffuse field noise in the second sound signal is lower than energy of diffuse field noise in the first sound signal. It should be understood that not all diffuse field noise can be reduced by reducing energy of sound signals in the first sound signal in the non-target orientation. To ensure quality of the sound signal during the video recording, the diffuse field noise further needs to be reduced to increase a signal-to-noise ratio of the sound signal during the video recording.

In a possible implementation, the first sound signal includes a plurality of time-frequency voice signals. The processing, by the electronic device, the first sound signal to obtain a second sound signal includes: recognizing, by the electronic device, whether each time-frequency voice signal in the first sound signal is diffuse field noise; and if a third time-frequency voice signal in the first sound signal is diffuse field noise, reducing, by the electronic device, energy of the third time-frequency voice signal to obtain the second sound signal. The third time-frequency voice signal is any one of the plurality of time-frequency voice signals in the first sound signal.

In a possible implementation, the first sound signal includes a plurality of time-frequency voice signals. The processing, by the electronic device, the first sound signal to obtain a second sound signal further includes: recognizing, by the electronic device, whether each time-frequency voice signal in the first sound signal is diffuse field noise; determining, by the electronic device, gain of a fourth time-frequency voice signal in the first sound signal according to whether the fourth time-frequency voice signal is diffuse field noise; where the fourth time-frequency voice signal is any one of the plurality of time-frequency voice signals in the first sound signal; the gain of the fourth time-frequency voice signal is less than 1 if the fourth time-frequency voice signal is diffuse field noise; and the gain of the fourth time-frequency voice signal is equal to 1 if the fourth time-frequency voice signal is a coherent signal; and obtaining, by the electronic device, the second sound signal according to each time-frequency voice signal in the first sound signal and a corresponding gain.

In a possible implementation, the first sound signal includes a plurality of time-frequency voice signals; and the processing, by the electronic device, the first sound signal to obtain a second sound signal further includes: calculating, by the electronic device, a probability that each time-frequency voice signal in the first sound signal is within a target orientation; where the target orientation is an orientation within a field of view range of the camera during video recording; recognizing, by the electronic device, whether each time-frequency voice signal in the first sound signal is diffuse field noise; determining, by the electronic device, gain of a fifth time-frequency voice signal in the first sound signal according to whether the fifth time-frequency voice signal is within the target orientation and whether the fifth time-frequency voice signal is diffuse field noise; where the fifth time-frequency voice signal is any one of the plurality of time-frequency voice signals in the first sound signal; the gain of the fifth time-frequency voice signal is equal to 1 if the probability that the fifth time-frequency voice signal is within the target orientation is greater than a preset probability threshold and the fifth time-frequency voice signal is a coherent signal; and the gain of the fifth time-frequency voice signal is less than 1 if the probability that the fifth time-frequency voice signal is within the target orientation is greater than the preset probability threshold and the fifth time-frequency voice signal is diffuse field noise; the gain of the fifth time-frequency voice signal is less than 1 if the probability that the fifth time-frequency voice signal is within the target orientation is less than or equal to the preset probability threshold; and obtaining, by the electronic device, the second sound signal according to each time-frequency voice signal in the first sound signal and a corresponding gain.

In a possible implementation, the determining, by the electronic device, gain of a fifth time-frequency voice signal in the first sound signal according to whether the fifth time-frequency voice signal is within the target orientation and whether the fifth time-frequency voice signal is diffuse field noise includes: determining, by the electronic device, first gain of the fifth time-frequency voice signal according to the probability that the fifth time-frequency voice signal is within the target orientation; where the first gain of the fifth time-frequency voice signal is equal to 1 if the probability that the fifth time-frequency voice signal is within the target orientation is greater than the preset probability threshold; and the first gain of the fifth time-frequency voice signal is less than 1 if the probability that the fifth time-frequency voice signal is within the target orientation is less than or equal to the preset probability threshold; determining, by the electronic device, second gain of the fifth time-frequency voice signal according to whether the fifth time-frequency voice signal is diffuse field noise; where the second gain of the fifth time-frequency voice signal is less than 1 if the fifth time-frequency voice signal is diffuse field noise; and the second gain of the fourth time-frequency voice signal is equal to 1 if the fifth time-frequency voice signal is a coherent signal; and determining, by the electronic device, the gain of the fifth time-frequency voice signal according to the first gain and the second gain of the fifth time-frequency voice signal; where the gain of the fifth time-frequency voice signal is a product of the first gain and the second gain of the fifth time-frequency voice signal.

In a possible implementation, if the fifth time-frequency voice signal is diffuse field noise and the product of the first gain and the second gain of the fifth time-frequency voice signal is less than a preset gain value, the gain of the fifth time-frequency voice signal is equal to the preset gain value.

In a third aspect, an embodiment of this application provides an electronic device. The electronic device includes: a microphone; a camera; one or more processors; a memory; and a communication module; where the microphone is configured to collect a sound signal during video recording or live streaming; the camera is configured to collect an image signal during the video recording or live streaming; the communication module is configured to communicate with an external device; and the memory stores one or more computer programs, the one or more computer programs including instructions, where the instructions, when executed by the processor, cause the electronic device to perform the method as described in the first aspect and any possible implementation thereof.

According to a fourth aspect, an embodiment of this application provides a chip system, the chip system being applied to an electronic device. The chip system includes one or more interface circuits and one or more processors. The interface circuit is connected to the processor through a line. The interface circuit is configured to receive a signal from the memory of the electronic device and send the signal to the processor, where the signal includes computer instructions stored in the memory. When the processor executes the computer instructions, the electronic device performs the method as described in the first aspect and any possible implementation thereof.

According to a fifth aspect, an embodiment of this application provides a computer storage medium, the computer storage medium including computer instructions, where the computer instructions, when run on a foldable electronic device, cause the electronic device to perform the method as described in the first aspect and any possible implementation thereof.

According to a sixth aspect, an embodiment of this application provides a computer program product, where the computer program product, when run on a computer, causes the computer to perform the method as described in the first aspect and any possible design manner thereof.

It may be understood that, for beneficial effects that can be achieved by the electronic device described in the third aspect, the chip system described in the fourth aspect, the computer storage medium described in the fifth aspect, and the computer program product described in the sixth aspect provided above, reference may be made to the beneficial effects in the first aspect and any possible implementation thereof. Details are not described herein again.

BRIEF DESCRIPTION OF DRAWINGS

FIG. 11 shows speech spectrograms before and after execution of the method shown in FIG. 7 according to an embodiment of this application;

FIG. 21A(1), FIG. 21A(2), and FIG. 21A(3) are a first interface diagram involved in a sound signal processing method according to an embodiment of this application;

FIG. 21B(1), FIG. 21B(2), and FIG. 21B(3) are a first scene diagram of a sound signal processing method according to an embodiment of this application;

DESCRIPTION OF EMBODIMENTS

For ease of understanding, some descriptions of concepts related to the embodiments of this application are provided as examples for reference, which are shown as follows:

A target object is an object within a field of view range of a camera (such as a front-facing camera), such as a person or an animal. The field of view range of the camera is determined by a field of view (field of vie, FOV) of the camera. If the FOV of the camera is larger, the field of view range of the camera is larger.

A non-target object is an object not within the field of view range of the camera. Taking the front-facing camera as an example, an object on the back of a mobile phone is a non-target object.

Diffuse field noise is a sound formed by reflection of a sound from the target object or the non-target object by a wall, floor, or ceiling during video recording or audio recording.

Technical solutions in the embodiments of this application are described below with reference to the accompanying drawings in the embodiments of this application. In the descriptions of the embodiments of this application, "/" means "or" unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of the embodiments of this application, "a plurality of" represents two or more.

The terms "first" and "second" below are used merely for the purpose of description, and shall not be construed as indicating or implying relative importance or implying a quantity of indicated technical features. Therefore, a feature limited by "first" or "second" may explicitly or implicitly include one or more of the features. In descriptions of this embodiment, unless otherwise stated, "a plurality of" means two or more.

At present, with the development of short video and live streaming social software (applications such as Kuaishou and Douyin), a video recording function of an electronic device has become a function frequently used by people, and electronic devices capable of recording high-quality video files are in demand.

An existing electronic device may collect sound signals around the electronic device during video recording, but some sound signals are interference signals, which are not desired by a user. For example, when the electronic device uses a camera (e.g., a front-facing camera or a rear-facing camera) for video recording, the electronic device may collect a sound of a target object within a FOV of the camera, may collect a sound of a non-target object outside the FOV of the camera, and may further collect some ambient noise. In this case, the sound of the non-target object may become an interference object, affecting sound quality of a video recorded by the electronic device.

Figure 1:
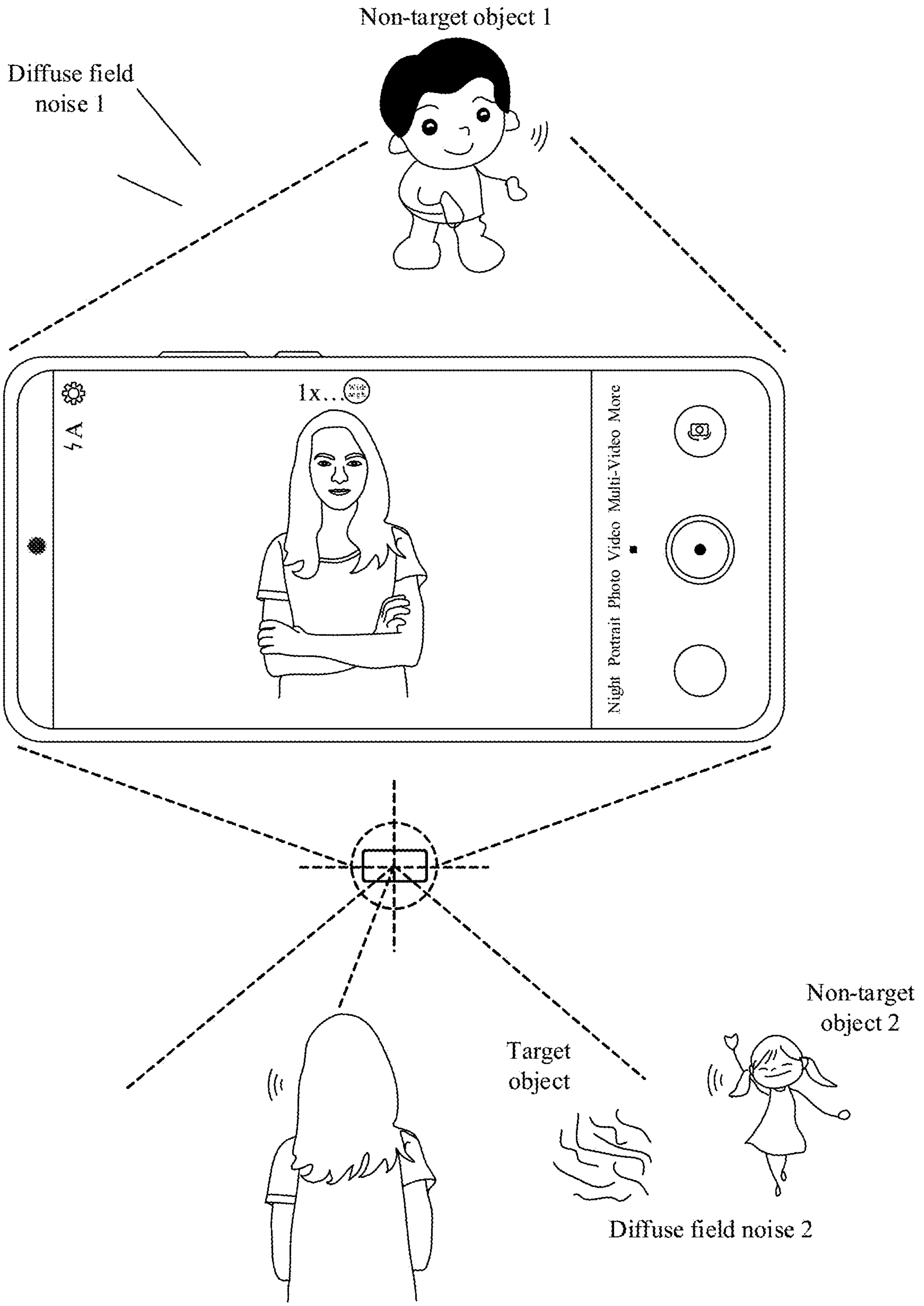
FIG. 1 is an application scene diagram of a sound signal processing method according to an embodiment of this application.

Taking video recording by the front-facing camera as an example, generally, the front-facing camera of the electronic device is configured to facilitate the user to take a selfie to record a short video or a small video. As shown in FIG. 1, when the user uses the front-facing camera of the electronic device to take a selfie to record a short video, a child may be playing on the back of the electronic device (i.e., a non-target object 1 in FIG. 1). On a same side of the user (i.e., a target object in FIG. 1), there may also be another object, for example, a dog that is barking, or a little girl who is singing and dancing (i.e., a non-target object 2 in FIG. 1). Therefore, during the recording and shooting, the electronic device may inevitably record the sound of the non-target object 1 or the non-target object 2. However, for the user, the user more expects that the recorded short video can highlight his/her own sound (that is, the sound of the target object) and suppress a non-own sound, such as the sounds made by the non-target object 1 and the non-target object 2 in FIG. 1.

In addition, due to the influence of a shooting environment, during the shooting by the electronic device, there may be a lot of noise caused by the environment in the short video recorded by the electronic device, such as diffuse field noise 1 and diffuse field noise 2 as shown in FIG. 1, so that the short video recorded by the electronic device has high and harsh noise, which interferes with the sound of the target object and affects sound quality of the recorded short video.

To address the above problems, an embodiment of this application provides a sound signal processing method, which is applicable to an electronic device, and can suppress voices not in the camera during selfie recording and increase a signal-to-noise ratio of selfie voices. Taking a video shooting scene shown in FIG. 1 as an example, according to the sound signal processing method provided in this embodiment of this application, the sounds of the non-target object 1 and the non-target object 2 may be removed, the sound of the target object may be retained, and the influence of the diffuse field noise 1 and the diffuse field noise 2 on the sound of the target object may also be reduced, thereby increasing a signal-to-noise ratio of an audio signal of the target object after the video recording, smoothing background noise, and making a sense of hearing of the user better.

The sound signal processing method provided in this embodiment of this application may be used for video shooting by the front-facing camera of the electronic device and may also be used for video shooting by the rear-facing camera of the electronic device. The electronic device may be a mobile terminal such as a mobile phone, a tablet computer, a wearable device (such as a smart watch), an in-vehicle device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), may be a dedicated camera, or the like. A specific type of the electronic device is not limited in this embodiment of this application.

Figure 2:
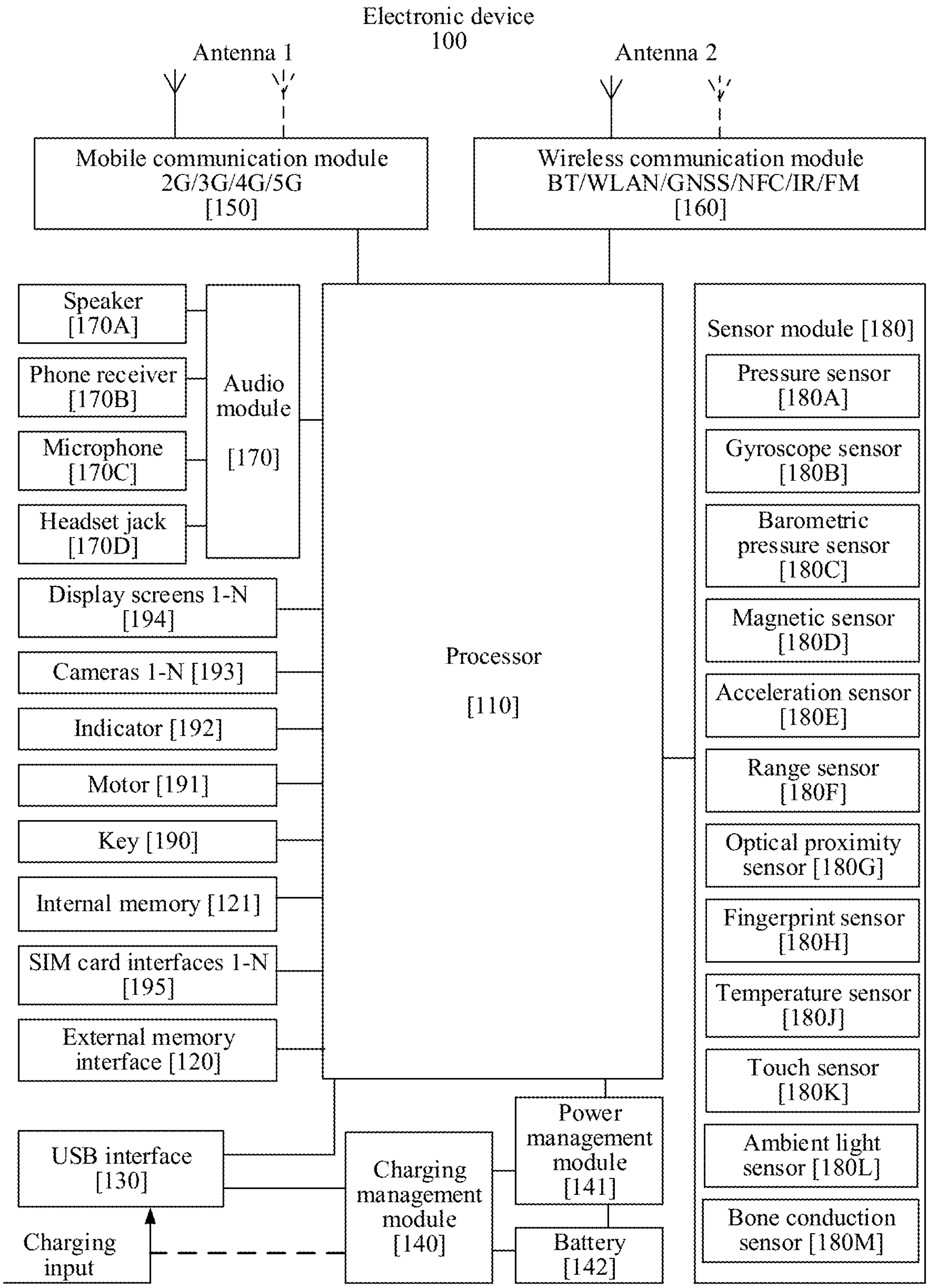
FIG. 2 is a schematic structural diagram of an electronic device according to an embodiment of this application.

Exemplarily, FIG. 2 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may be a nerve center and a command center of the electronic device 100. The controller may generate an operation control signal according to instruction operation code and a time-sequence signal, and control obtaining and executing of instructions.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instructions or the data again, the processor may directly invoke the instructions or the data from the memory. Repeated access is avoided, and waiting time of the processor 110 is reduced, thereby improving system efficiency.

The electronic device 100 implements a display function by using the GPU, the display screen 194, the application processor, and the like. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. The display panel may use a liquid crystal touchscreen (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the electronic device 100 may include 1 or N display screens 194. N is a positive integer greater than 1. In this embodiment of this application, the display screen 194 may be configured to display a preview interface, a shooting interface, and the like in a shooting mode.

The electronic device 100 may implement a shooting function by using the ISP, the camera 193, the video codec, the GPU, the display screen 194, the application processor, and the like.

The ISP is configured to process data fed back by the camera 193. For example, during photographing, a shutter is opened, light is transferred to a camera photosensitive element by using a lens, an optical signal is converted into an electrical signal, and the camera photosensitive element transfers the electrical signal to the ISP for processing, to convert the electrical signal into an image visible to a naked eye. The ISP may also optimize noise, brightness, and skin tone algorithms. The ISP may also optimize parameters such as exposure and a color temperature of a shooting scene. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard RGB and YUV formats. In some embodiments, the electronic device 100 may include 1 or N cameras 193. N is a positive integer greater than 1.

In addition, the camera 193 may further include a depth camera configured to measure an object distance of a to-be-shot object, and other cameras. For example, the depth camera may include a three-dimensional (3 dimensions, 3D) depth camera, a time of flight (TOF) depth camera, a binocular depth camera, and the like.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play back or record videos in a plurality of encoding formats, for example, moving picture experts group (moving picture experts group, MPEG) 1, MPEG 2, MPEG 3, MPEG 4, and the like.

The internal memory 121 may be configured to store computer-executable program code, where the executable program code includes instructions. The processor 110 runs the instructions stored in the internal memory 121, to implement various functional applications and data processing of the electronic device 100. The internal memory 121 may include a program storage area and a data storage area. The program storage area may store an operating system, an application required by at least one function (such as a sound playback function and an image playback function), and the like. The data storage region may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS). In some other embodiments, the processor 110 runs the instructions stored in the internal memory 121 and/or the instructions stored in the memory disposed in the processor, so that the electronic device 100 performs the method provided in this embodiment of this application, and various functional applications and data processing.

The electronic device 100 may implement an audio function such as music playing or recording by using the audio module 170, the speaker 170A, the telephone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some function modules in the audio module 170 are disposed in the processor 110.

The speaker 170A, also referred to as "horn", is configured to convert an electrical audio signal into a sound signal. Music may be listened to or a hands-free call may be answered by using the speaker 170A in the electronic device 100.

The telephone receiver 170B, also referred to as "handset", is configured to convert an electrical audio signal into a sound signal. When the electronic device 100 is configured to answer a call or receive voice information, the phone receiver 170B may be put close to a human ear to receive a voice.

The microphone 170C, also referred to as "voice tube" or "mike", is configured to convert a sound signal into an electrical signal. When making a call, sending voice information, or recording audio and video files, the user may speak with the mouth approaching the microphone 170C, to input a sound signal to the microphone 170C. One or more microphones 170C may be disposed in the electronic device 100. For example, three, four, or more microphones 170C may be disposed in the electronic device 100, to collect a sound signal, implement denoising, recognize a direction of a sound source, implement a directional recording function, suppress a sound in a non-target direction, and the like.

The headset jack 170D is configured to be connected to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The touch sensor 180K is also referred to as a "touch panel". The touch sensor 180K may be disposed on the display screen 194. The touch sensor 180K and the display screen 194 form a touchscreen, which is also referred to as a "touch control screen". The touch sensor 180K is configured to detect a touch operation on or near the touch sensor 180K. The touch sensor may transfer the detected touch operation to the application processor to determine a type of a touch event. The touch sensor 180K may provide a visual output related to the touch operation by using the display screen 194. In some other embodiments, the touch sensor 180K may alternatively be disposed on a surface of the electronic device 100 at a position different from that of the display screen 194.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The sound signal processing method provided in this embodiment of this application is described in detail below based on an example in which the electronic device is a mobile phone 300 and the front-facing camera of the electronic device is used for recording and shooting.

Figure 3:
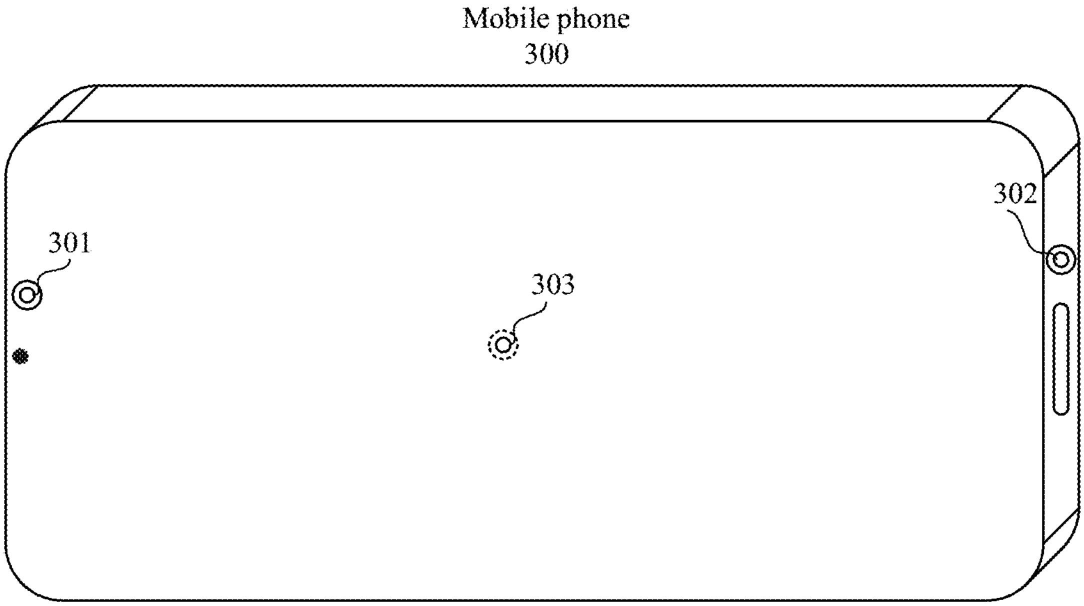
FIG. 3 is a schematic diagram of a position of a microphone of an electronic device according to an embodiment of this application.

Exemplarily, as shown in FIG. 3, three microphones are disposed in the mobile phone 300, which are respectively a top microphone 301, a bottom microphone 302, and a back microphone 303 configured to collect sound signals of the user when the user makes a call or records audio and video files. During sound recording or video recording by the mobile phone, the top microphone 301, the bottom microphone 302, and the back microphone 303 collect sound signals of a recording environment where the user is located (including a sound of a target object, a sound of a non-target object, and noise generated by the environment). For example, when the mobile phone 300 records a video and collects an audio in a direction shown in FIG. 3, the top microphone 301 may collect a left-channel sound signal, and the bottom microphone 302 may collect a right-channel sound signal. Conversely, when the mobile phone 300 is rotated by 180 degrees in the direction shown in FIG. 3 to record a video and collect an audio, the top microphone 301 may collect a right-channel voice signal, and the bottom microphone 302 may collect a left-channel voice signal. In this regard, voice signals of channels respectively collected by the three microphones in the mobile phone 300 may vary according to different usage scenes. The above descriptions in this embodiment of this application are merely for illustration and not for limitation.

In addition, the sound signal collected by the back microphone 303 may be combined with the sound signals collected by the top microphone 301 and the bottom microphone 302 to determine an orientation of a sound signal collected by the mobile phone.

Taking the video shooting scene shown in FIG. 1 as an example, the mobile phone 300 can collect, through the three microphones (i.e., the top microphone 301, the bottom microphone 302, and the back microphone 303) shown in FIG. 3, the sound of a target object, the sound of the non-target object 1, the sound of the non-target object 2, and diffuse field noise 1 and diffuse field noise 2 formed by the sounds of the target object and the non-target objects through ambient reflection.

It should be understood that, in the video shooting scene shown in FIG. 1, a main shooting object of the user is himself (for example, the target object shown in FIG. 1), so the user does not want to collect the sound of the non-target object (the non-target object 1 and the non-target object 2 shown in FIG. 1) during the video recording. According to the sound signal processing method in this embodiment of this application, the mobile phone can process the collected sound signal, suppress the sound signal of the non-target object, highlight the sound of the target object, and improve quality of a sound in the shot video.

Figure 4:
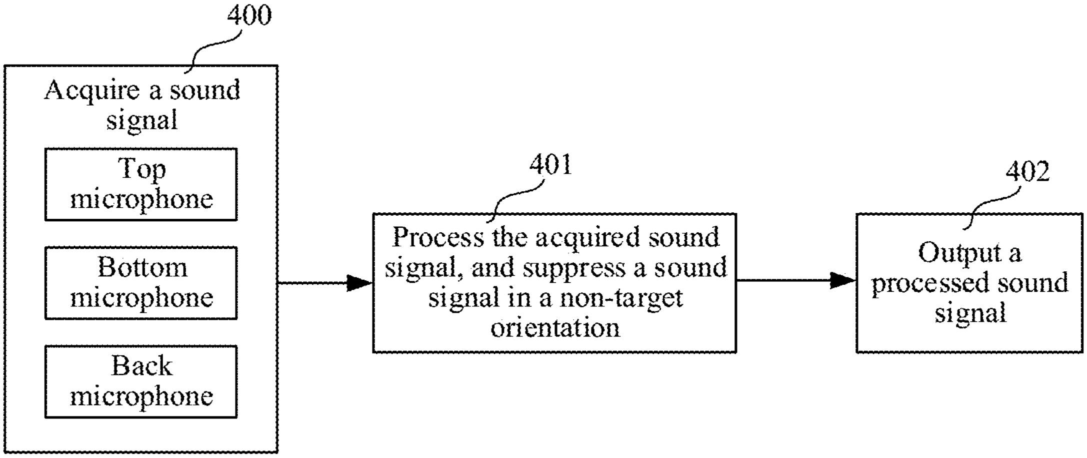
FIG. 4 is a first flowchart of a sound signal processing method according to an embodiment of this application.

In some embodiments, as shown in FIG. 4, a sound signal processing method according to an embodiment of this application includes the following steps:

400: A mobile phone acquires a sound signal.

Exemplarily, during the video shooting by the user, the mobile phone may collect a sound signal through the three microphones (i.e., the top microphone 301, the bottom microphone 302, and the back microphone 303) as shown in FIG. 3. In the following embodiments, the sound signal may also be referred to as an audio signal.

Figure 5:
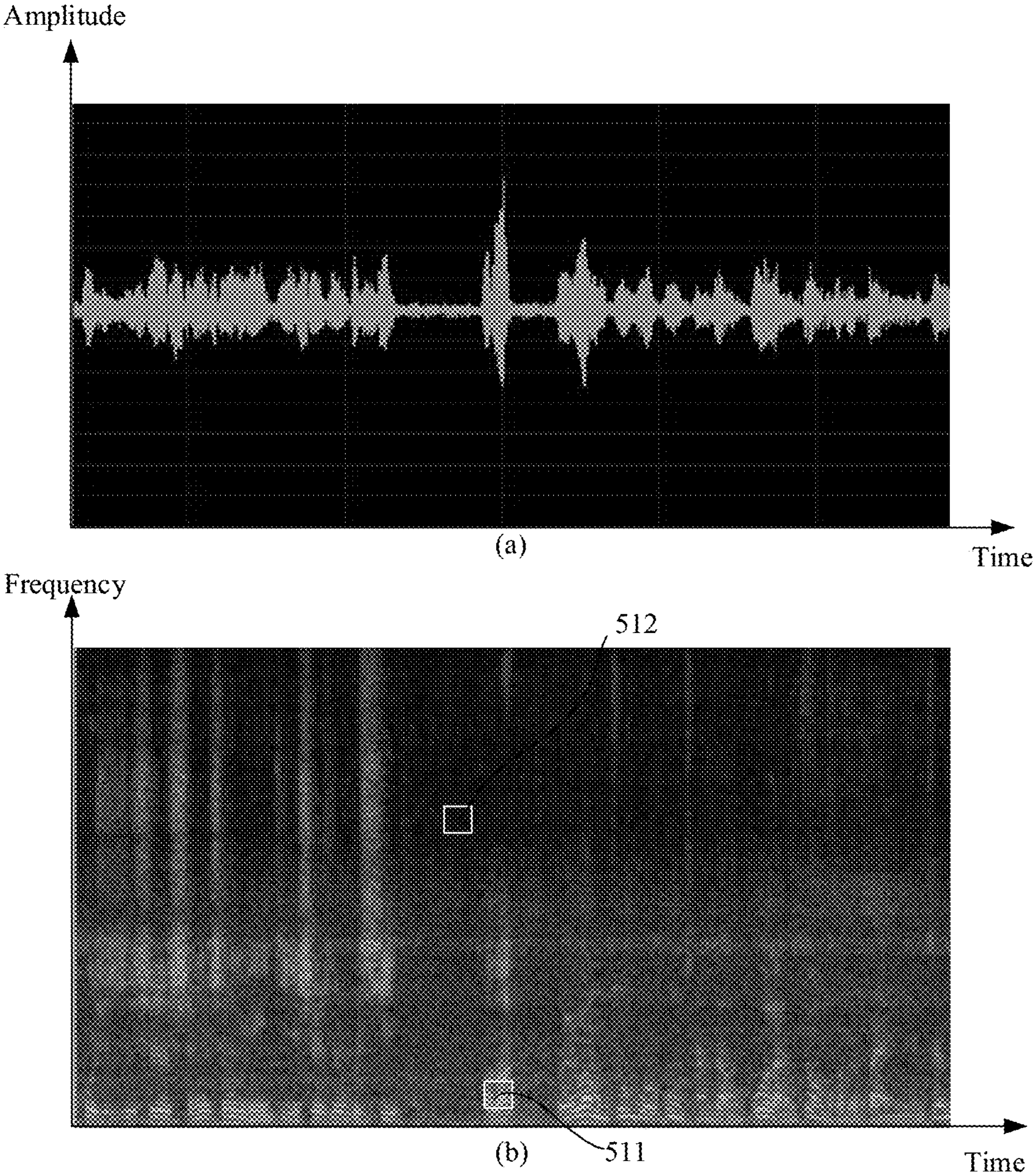
FIG. 5 is a schematic comparison diagram of conversion of a time-domain sound signal collected by a microphone of an electronic device into a frequency-domain sound signal according to an embodiment of this application.

Generally, as shown in (a) in FIG. 5, the sound signal collected by the microphone is a time-domain signal, and is configured to represent changes in amplitude of the sound signal over time. To facilitate analysis and processing of the sound signal collected by the microphone, the sound signal collected by the microphone may be converted into a frequency-domain signal through Fourier transform such as fast Fourier transform (fast Fourier transform, FFT) or discrete Fourier transform (discrete Fourier transform, DFT), as shown in (b) in FIG. 5 for example. In (a) in FIG. 5, the time-domain signal is represented by time/amplitude, where the abscissa is sampling time and the ordinate is amplitude of the sound signal. The sound signal shown in (a) in FIG. 5 after FFT or DFT may be converted into a frequency-domain signal corresponding to a speech spectrogram shown in (b) in FIG. 5. In the speech spectrogram, the abscissa is time, the ordinate is frequency, and coordinate point values of the abscissa and the ordinate are energy of the sound signal. For example, in (b) in FIG. 5, sound data energy at a time-frequency signal position 511 is higher, while sound data energy at a time-frequency signal position 512 (the white box on the top, which cannot be clearly shown in the figure and is hereby explained) is lower.

It should be understood that, if the amplitude of the sound signal is greater, the energy of the sound signal is higher, and a sound decibel is also higher.

Figure 6:
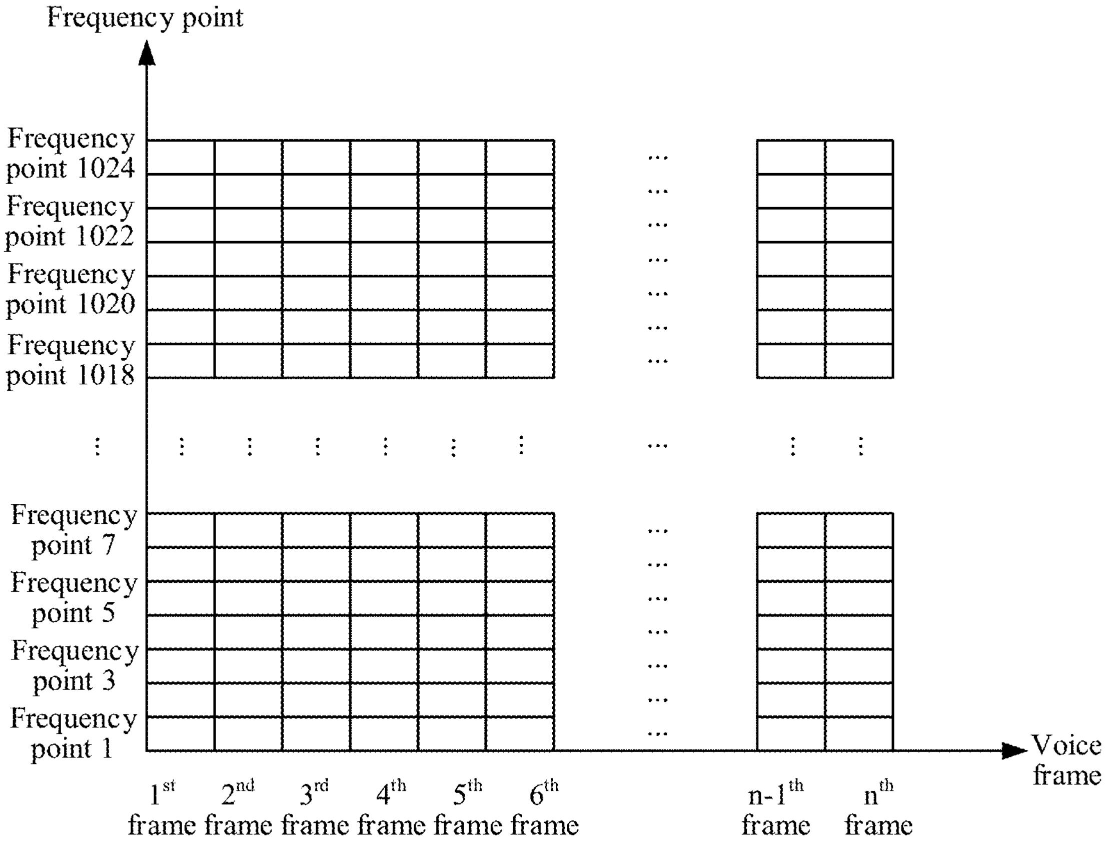
FIG. 6 is a diagram of a corresponding relationship between voice frames and frequency points of a frequency-domain sound signal involved in an embodiment of this application.

It should be noted that when the sound signal collected by the microphone is transformed into a frequency-domain signal by FFT or DFT, the sound signal may be divided into frames, and each frame of the sound signal is processed separately. One frame of the sound signal may be transformed into a frequency-domain signal including a plurality of (such as 1024 or 512) frequency-domain sampling points (i.e., frequency points) by FFT or DFT. As shown in FIG. 6, after the sound signal collected by the microphone is converted into a frequency-domain signal with 1024 frequency points, the sound signal collected by the microphone above may be represented with a plurality of time-frequency points. For example, a box in FIG. 6 represents a time-frequency point. The abscissa in FIG. 6 represents a quantity of frames of the sound signal (which may be called a voice frame), and the ordinate represents frequency points of the sound signal.

After the sound signals collected by the above three microphones, namely, the top microphone 301, the bottom microphone 302, and the back microphone 303, are converted into frequency-domain signals, $X_L(t,f)$ may be used for representing a left-channel time-frequency voice signal, that is, representing sound signals corresponding to different time-frequency points in the left-channel sound signal collected by the top microphone 301. Similarly, $X_R(t,f)$ may be used for representing a right-channel time-frequency voice signal, that is, representing energy of sound signals corresponding to different time-frequency points in the right-channel sound signal collected by the bottom microphone 302. $X_{back}(t,f)$ may be used for representing a left-and-right-channel time-frequency voice signal, that is, representing sound signals corresponding to different time-frequency points in a left-and-right-channel surround sound signal collected by the back microphone 303. t denotes a quantity of frames of the sound signal (which may be called a voice frame), and f denotes a frequency point of the sound signal.

401: The mobile phone processes the collected sound signal and suppresses a sound signal in a non-target orientation.

As can be seen from the above description, the sound signal collected by the mobile phone includes the sound of the target object and the sound of the non-target object. However, the sound of the non-target object is not desired by the user and needs to be suppressed. Generally, the target object is within the field of view of the camera (e.g., the front-facing camera), the field of view of the camera may be used as a target orientation in this embodiment of this application. Therefore, the above non-target orientation is an orientation not within the field of view of the camera (e.g., the front-facing camera).

Figure 7:
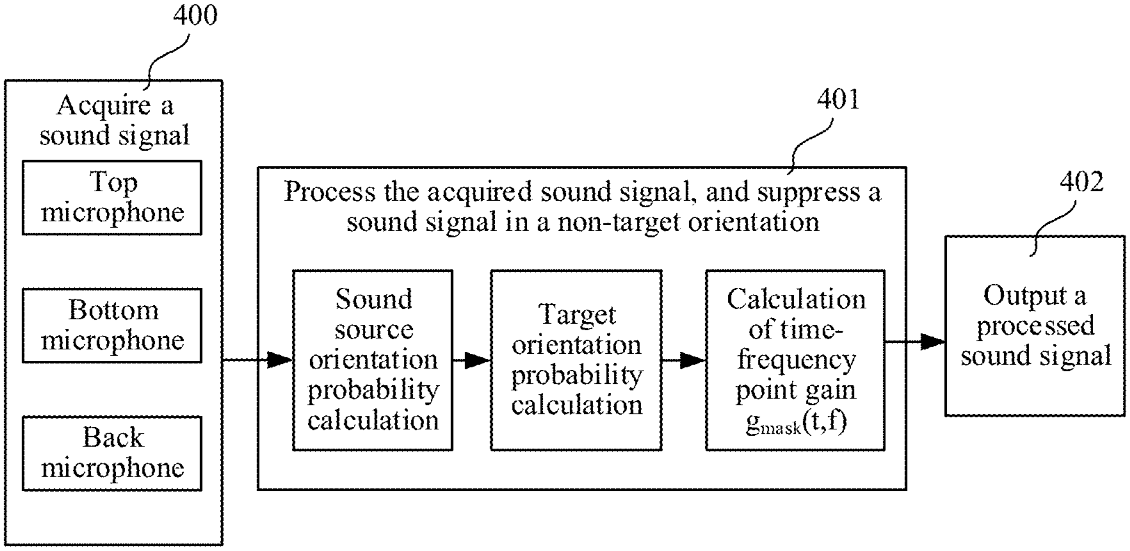
FIG. 7 is a second flowchart of a sound signal processing method according to an embodiment of this application.

Exemplarily, to suppress the sound signal in the non-target orientation, calculation of time-frequency point gain of the sound signal can be realized successively through calculation of a sound source direction probability and calculation of a target orientation probability. The sound signal in the target orientation and the sound signal in the non-target orientation can be differentiated by a difference in the time-frequency point gain of the sound signal. As shown in FIG. 7, suppressing the sound signal in the non-target orientation may include three calculation processes: calculation of a sound source orientation probability, calculation of a target orientation probability, and calculation of time-frequency point gain $g_{mask}(t,f)$, which are specifically as follows:

(1) Calculation of Sound Source Orientation Probability

Exemplarily, in this embodiment of this application, it is assumed that, during video recording and shooting by the mobile phone, a direction directly in front of a screen of the mobile phone is a 0° direction, a direction directly behind the screen of the mobile phone is a 180° direction, a direction directly to the right of the screen of the mobile phone is a 90° direction, and a direction directly to the left of the screen of the mobile phone is a 270° direction.

In this embodiment of this application, a 360° spatial orientation formed around the screen of the mobile phone may be divided into a plurality of spatial orientations. For example, the 360° spatial orientation may be divided into 36 spatial orientations at intervals of 10°, as shown in Table 1 below.

TABLE 1

Comparison table of directions of the 360° spatial orientation divided into 36 spatial orientations

| Number | 1 | 2 | 3 | 4 | 5 | 6 | . . . | 32 | 33 | 34 | 35 | 36 |
|---|---|---|---|---|---|---|---|---|---|---|---|---|
| Spatial orientation | 0° direction | 10° direction | 20° direction | 30° direction | 40° direction | 50° direction | . . . | 310° direction | 320° direction | 330° direction | 340° direction | 350° direction |

Taking the video recording by the front-facing camera of the mobile phone as an example, assuming that the FOV of the front-facing camera of the mobile phone is an angle of [310°, 50°], the target orientation is the [310°, 50°] orientation in the 360° spatial orientation formed around the screen of the mobile phone. A target object shot by the mobile phone is generally located within an angle range of the FOV of the front-facing camera, that is, within the target orientation. Suppressing the sound signal in the non-target orientations means suppressing a sound of an object outside the angle range of the FOV of the front-facing camera, such as the non-target object 1 and the non-target object 2 shown in FIG. 1.

For ambient noise (e.g., the diffuse field noise 1 and the diffuse field noise 2), the ambient noise may be within the target orientation or within the non-target orientation. It should be noted that the diffuse field noise 1 and the diffuse field noise 2 may essentially be identical noise. In this embodiment of this application, for the sake of distinction, the diffuse field noise 1 is taken as the ambient noise within the non-target orientation, and the diffuse field noise 2 is taken as the ambient noise within the target orientation.

Figure 8:
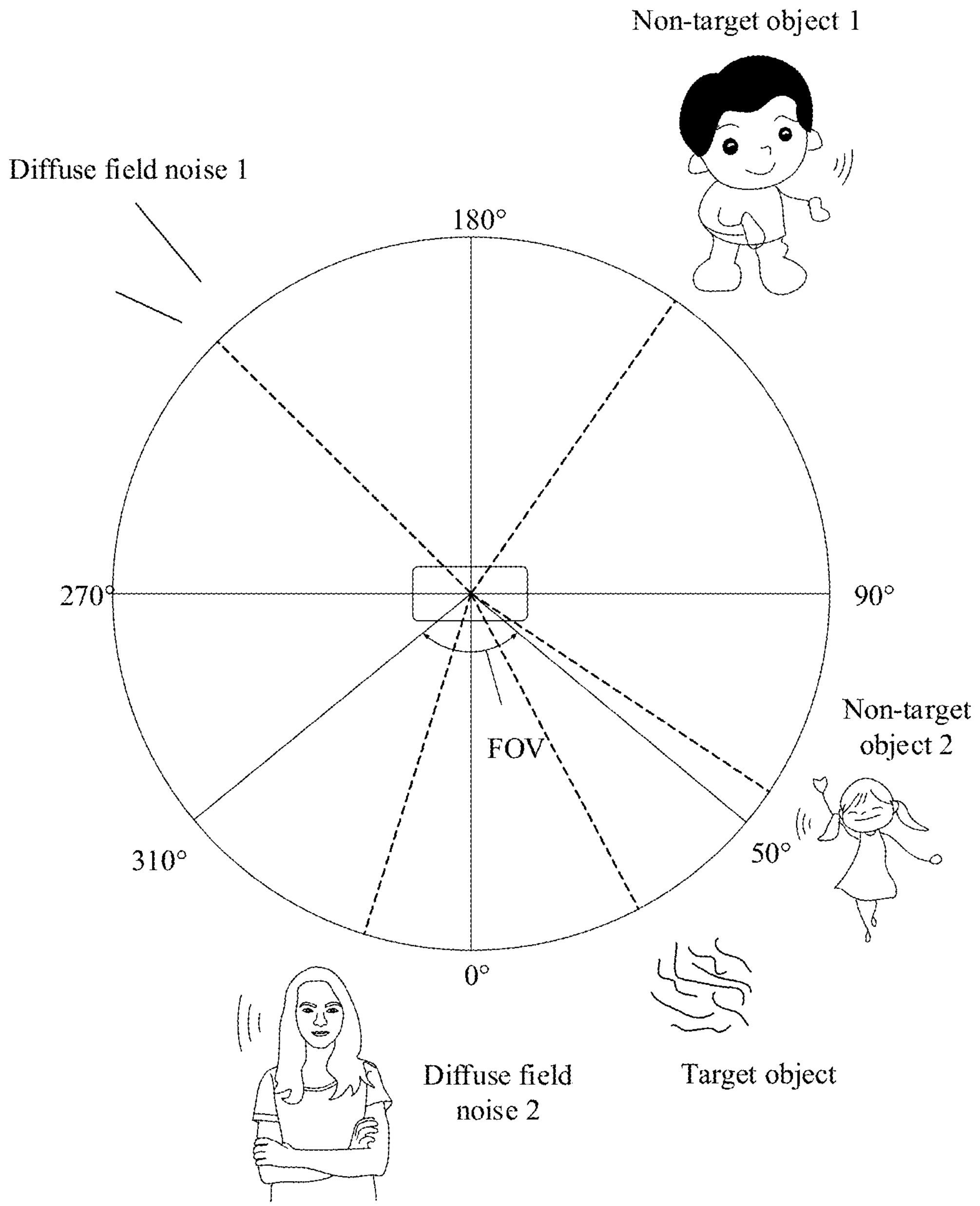
FIG. 8 is a first scene diagram of sound signals involved in a sound signal processing method according to an embodiment of this application.
Figure 9:
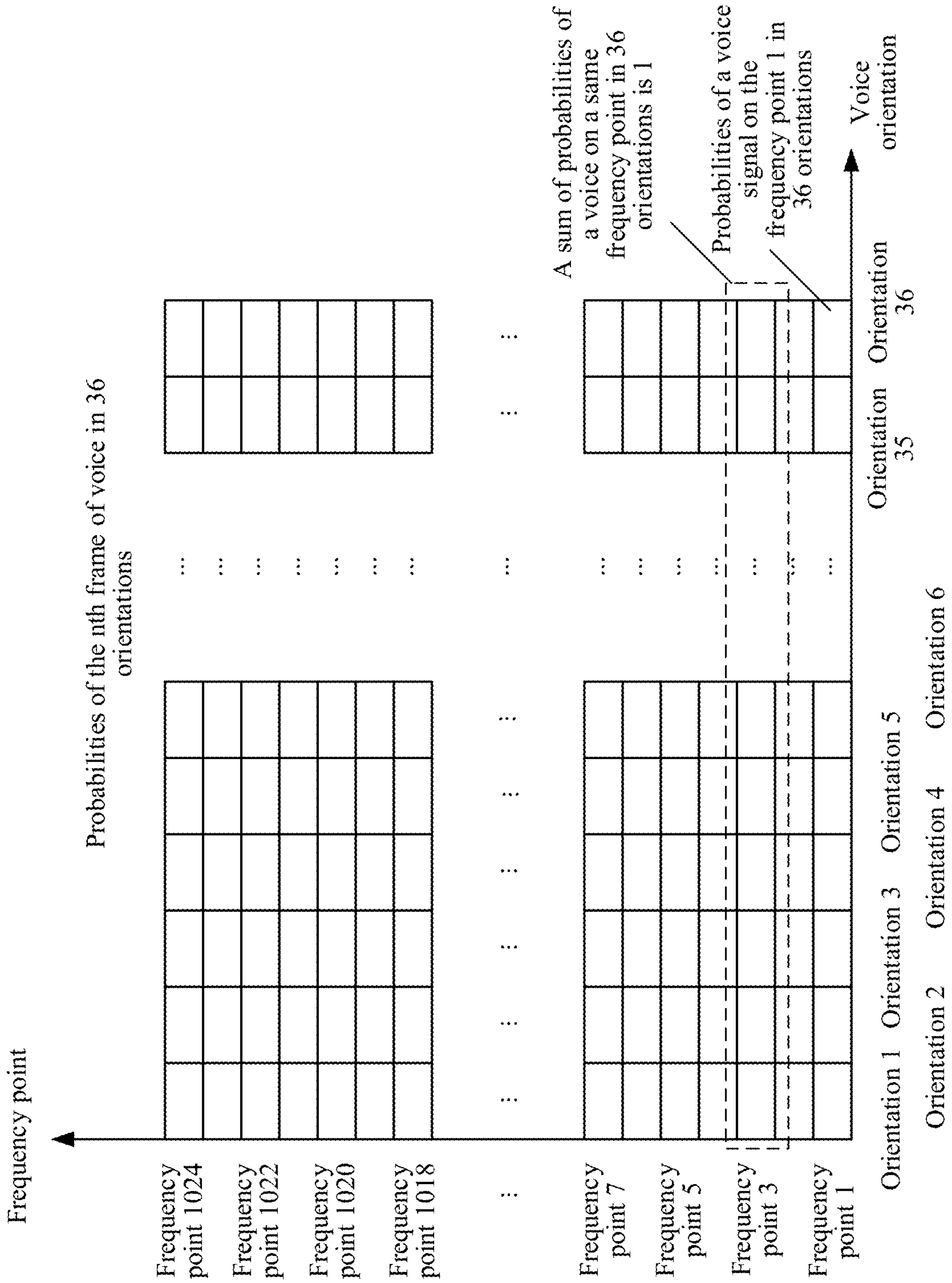
FIG. 9 is a distribution diagram of probabilities of an nth frame of voice in 36 orientations according to an embodiment of this application.

Exemplarily, taking the shooting scene shown in FIG. 1 as an example, FIG. 8 is a schematic diagram of spatial orientations where the target object, the non-target object 1, the non-target object 2, the diffuse field noise 1, and the diffuse field noise 2 are located. For example, the spatial orientation of the target object is approximately the 340° direction, the spatial orientation of the non-target object 1 is approximately the 150° direction, the spatial orientation of the non-target object 2 is approximately the 60° direction, the spatial orientation of the diffuse field noise 1 is approximately the 230° direction, and the spatial orientation of the diffuse field noise 2 is approximately the 30° direction.

frequency point is 1. Refer to FIG. 9 which is a schematic diagram of probabilities of existence of sound signals corresponding to 1024 frequency points in an $n^{th}$ frame of sound signal in 36 spatial orientations. In FIG. 9, each small box represents a probability of a sound signal corresponding to a certain frequency point in an $n^{th}$ frame of voice signal in a certain spatial orientation. A dotted box in FIG. 9 indicates that a sum of probabilities of the sound signal corresponding to a frequency point 3 in the $n^{th}$ frame of voice signal in 36 spatial orientations is 1.

Exemplarily, assuming that the FOV of the front-facing camera of the mobile phone is [310°, 50°], since the target object belongs to an object that the mobile phone wants to record and shoot, the target object is generally located within the FOV of the front-facing camera. In this way, the sound signal of the target object has the highest probability of coming from the [310°, 50°] orientation, and specific distribution of probabilities may be exemplified in Table 2.

TABLE 2

Distribution of probabilities of a sound source of the target object in 36 spatial orientations

| Number | 1 | 2 | 3 | 4 | 5 | 6 | . . . | 32 | 33 | 34 | 35 | 36 |
|---|---|---|---|---|---|---|---|---|---|---|---|---|
| Spatial orientation | 0° direction | 10° direction | 20° direction | 30° direction | 40° direction | 50° direction | . . . | 310° direction | 320° direction | 330° direction | 340° direction | 350° direction |
| Probability | 0.3 | 0 | 0 | 0 | 0 | 0 | 0 | 0 | 0 | 0 | 0.4 | 0.3 |

When the mobile phone is recording and shooting the target object, the microphone (e.g., the top microphone 301, the bottom microphone 302, and the back microphone 303 in FIG. 3) may collect the sound of the target object, the non-target object (e.g., the non-target object 1 and the non-target object 2), and the ambient noise (e.g., the diffuse field noise 1 and the diffuse field noise 2). The collected sound signals may be converted into frequency-domain signals (collectively referred to as time-frequency voice signals hereinafter) by FFT or DFT, which are a left-channel time-frequency voice signal $X_L(t,f)$, a right-channel time-frequency voice signal $X_R(t,f)$, and a back hybrid-channel time-frequency voice signal $X_{back}(t,f)$.

The time-frequency voice signals $X_L(t,f)$, $X_R(t,f)$, and $X_{back}(t,f)$ collected by the three microphones may be synthesized into a time-frequency voice signal X(t,f). The time-frequency voice signal X(t,f) may be inputted to a sound source orientation probability calculation model to calculate a probability $P_k(t,f)$ of existence of the inputted time-frequency voice signal in each orientation. t denotes a quantity of frames of a sound (that is, a voice frame), f denotes a frequency point, and k denotes the number of a spatial orientation. The sound source orientation probability calculation model is configured to calculate a sound source orientation probability. For example, the sound source orientation probability calculation model may be a Complex Angular Central Gaussian Mixture Model (Complex Angular Central Gaussian Mixture Model, cACGMM). For example, a quantity K of the spatial orientation is 36, 1≤k≤36, and $$\sum_{k=1}^{K} P_k(t, f) = 1.$$

In other words, a sum of probabilities of existence of sound signals in 36 orientations in a same frame and a same For the non-target object (e.g., the non-target object 1 or the non-target object 2), generally, the probability of appearance of the non-target object in the FOV of the front-facing camera is low, which may be lower than 0.5, or even be 0.

For the ambient noise (e.g., the diffuse field noise 1 and the diffuse field noise 2), since the diffuse field noise 1 is the ambient noise within the non-target orientation, the probability of appearance of the diffuse field noise 1 in the FOV of the front-facing camera is low, which may be lower than 0.5, or even be 0. Since the diffuse field noise 2 is the ambient noise within the target orientation, the probability of appearance of the diffuse field noise 2 in the FOV of the front-facing camera is high, which may be higher than 0.8, or even be 1.

It should be understood that the above probabilities of appearance of the target object, the non-target object, and the ambient noise in the target orientation are examples and do not limit this embodiment of this application.

(2) Calculation of Target Orientation Probability

The target orientation probability calculation means a sum of probabilities of existence of the above time-frequency voice signal in each orientation within the target orientation, which may also be called a spatial clustering probability of the target orientation. Therefore, the spatial clustering probability P(t,f) of the above time-frequency voice signal in the target orientation may be calculated through the following Formula (I):

$$P(t, f) = \sum_{k=k1}^{k2} P_k(t, f) \quad \text{Formula (I)}$$

where k1 to k2 denote angle indexes of the target orientation, and may alternatively denote spatial orientation numbers of the target orientation. $P_k(t,f)$ denotes a probability of existence of a current time-frequency voice signal in an orientation k. P(t,f) denotes a sum of probabilities of existence of the current time-frequency voice signal in the target orientation.

For example, the direction directly in front of the screen of the mobile phone is still a 0° direction, and the FOV of the front-facing camera is [310°, 50°]. That is, the target orientation is [310°, 50°].

Regarding the target object, taking the distribution of probabilities of the sound of the target object shown in Table 2 above in 36 spatial orientations as an example, k1 to k2 respectively denote probabilities corresponding to numbers 32, 33, 34, 35, 36, 1, 2, 3, 4, 5, and 6. Therefore, a sum of probabilities P(t,f) of existence of the time-frequency voice signal of the target object in the target orientation is 0.4+0.3+0.3=1.

According to a similar calculation method, a sum of probabilities P(t,f) of existence of the time-frequency voice signal of the non-target object in the target orientation may be calculated, and a sum of probabilities P(t,f) of existence of the video voice signal of the ambient noise (e.g., the diffuse field noise 1 and the diffuse field noise 2) in the target orientation may also be calculated.

Regarding the non-target object, the sum of probabilities P(t,f) of existence of the time-frequency voice signal of the non-target object in the target orientation may be less than 0.5, or even be 0.

Regarding the ambient noise, for example, the diffuse field noise 1, the diffuse field noise 1 is the ambient noise within the non-target orientation, and the probability of existence of the time-frequency voice signal of the diffuse field noise 1 within the target orientation is low. Therefore, a sum of probabilities P(t,f) of existence of the time-frequency voice signal of the diffuse field noise 1 in the target orientation may be less than 0.5, or even be 0.

Regarding the ambient noise, for example, the diffuse field noise 2, the diffuse field noise 2 is the ambient noise within the target orientation, and the probability of existence of the time-frequency voice signal of the diffuse field noise 2 in the target orientation is high. Therefore, a sum of probabilities P(t,f) of existence of the time-frequency voice signal of the diffuse field noise 2 in the target orientation may be greater than 0.8, or even be 1.

(3) Calculation of Time-Frequency Point Gain $g_{mask}(t,f)$

As can be known from the above description, a main purpose of suppressing the sound signal in the non-target orientation is to retain the sound signal of the target object and suppress the sound signal of the non-target object. Generally, the target object is within the FOV of the front-facing camera. Therefore, most of the sound signals of the target object are from the target orientation. That is, the probability of appearance of the sound of the target object in the target orientation is generally relatively high. Conversely, for the non-target object, the non-target object is generally not within the FOV of the front-facing camera. Therefore, most of the sound signals of the non-target object are from the non-target orientation. That is, the probability of appearance of the sound of the non-target object in the target orientation is generally relatively low.

Based on this, current time-frequency point gain $g_{mask}(t,f)$ may be calculated through the above target orientation clustering probability P(t,f). Refer to the following Formula (II) for details:

$$g_{mask}(t,f)=\begin{cases}1, & \text{if } P(t,f)>P_{th}\\ g_{mask-min}, & \text{if } P(t,f)\le P_{th}\end{cases} \quad \text{Formula (II)}$$

where $P_{th}$ denotes a preset probability threshold, which may be configured through a parameter. For example, $P_{th}$ is set to 0.8. $g_{mask-min}$ denotes time-frequency point gain when the current time-frequency voice signal is in the non-target orientation, which may be configured through a parameter. For example, $g_{mask-min}$ is set to 0.2.

When the sum of probabilities P(t,f) of existence of the current time-frequency voice signal in the target orientation is greater than the probability threshold $P_{th}$, it may be considered that the current time-frequency voice signal is within the target orientation. That is, the time-frequency point gain of the current time-frequency voice signal is $g_{mask}(t,f)=1$. Correspondingly, when the sum of probabilities P(t,f) of existence of the current time-frequency voice signal in the target orientation is less than or equal to the probability threshold $P_{th}$, it may be considered that the current time-frequency voice signal is not within the target orientation. In this case, the set parameter $g_{mask-min}$ may be taken as the time-frequency point gain $g_{mask}(t,f)$ when the current time-frequency voice signal is not in the target orientation, for example, $g_{mask}(t,f)=g_{mask-min}=0.2$.

In this way, if the current time-frequency voice signal is within the target orientation, the current time-frequency voice signal is most likely to come from the target object. Therefore, the sound of the target object can be retained to the greatest extent if the time-frequency point gain $g_{mask}(t,f)$ of the current time-frequency voice signal is configured to be 1 when the current time-frequency voice signal is within the target orientation. If the current time-frequency voice signal is not within the target orientation, the current time-frequency voice signal is most likely to come from the non-target object (e.g., the non-target object 1 or the non-target object 2). Therefore, the sound of the non-target object (e.g., the non-target object 1 or the non-target object 2) can be effectively suppressed if the time-frequency point gain $g_{mask}(t,f)$ is configured to be 0.2 when the current time-frequency voice signal is not within the target orientation.

It should be understood that a time-frequency voice signal of the ambient noise may exist in the target orientation, such as the diffuse field noise 2; or may exist in the non-target orientation, such as the diffuse field noise 1. Therefore, the time-frequency point gain $g_{mask}(t,f)$ of the time-frequency voice signal of the ambient noise, such as the diffuse field noise 2, is more likely to be 1. The time-frequency point gain $g_{mask}(t,f)$ of the time-frequency voice signal of the ambient noise, such as the diffuse field noise 1, is more likely to be $g_{mask-min}$, for example, 0.2. In other words, a level of the energy of the ambient noise cannot be suppressed by suppressing the sound of the non-target object as described above.

402: Output a processed sound signal.

Generally, the mobile phone has two speakers, which are respectively a speaker at the top of the screen of the mobile phone (hereinafter called a speaker 1) and a speaker at the bottom of the mobile phone (hereinafter called a speaker 2). When the mobile phone outputs an audio (that is, a sound signal), the speaker 1 may be configured to output a left-channel audio signal, and the speaker 2 may be configured to output a right-channel audio signal. Certainly, when the mobile phone outputs the audio, the speaker 1 may alternatively be configured to output a right-channel audio signal, and the speaker 2 may be configured to output a left-channel audio signal. This is not specially limited in this embodiment of this application. It may be understood that, when the electronic device has only one speaker, (the left-channel audio signal+the right-channel audio signal)/2 may be outputted, the left-channel audio signal+the right-channel audio signal may be outputted, or the left-channel audio signal and the right-channel audio signal are fused and then outputted, which is not limited in this application.

To enable an audio signal recorded and shot by the mobile phone to be outputted by the speaker 1 and the speaker 2, after the sound signal is processed with the above method, the outputted sound signal may be divided into a left-channel audio output signal $Y_L$(t,f) and a right-channel audio output signal $Y_R$(t,f).

Exemplarily, sound signals after the sound of the non-target object is suppressed, such as $Y_L$(t,f) and $Y_R$(t,f), may be obtained according to the above calculated time-frequency point gain $g_{mask}$(t,f) of various sound signals and in combination with a sound input signal collected by the microphone, such as the left-channel time-frequency voice signal $X_L$(t,f) or the right-channel time-frequency voice signal $X_R$(t,f). Specifically, the sound signals $Y_L$(t,f) and $Y_R$(t,f) outputted after processing may be respectively calculated through the following Formula (III) and Formula (IV):

$$Y_L(t,f) = X_L(t,f) * g_{mask}(t,f); \quad \text{Formula (III)}$$

$$Y_R(t,f) = X_R(t,f) * g_{mask}(t,f). \quad \text{Formula (IV)}$$

Figure 10:
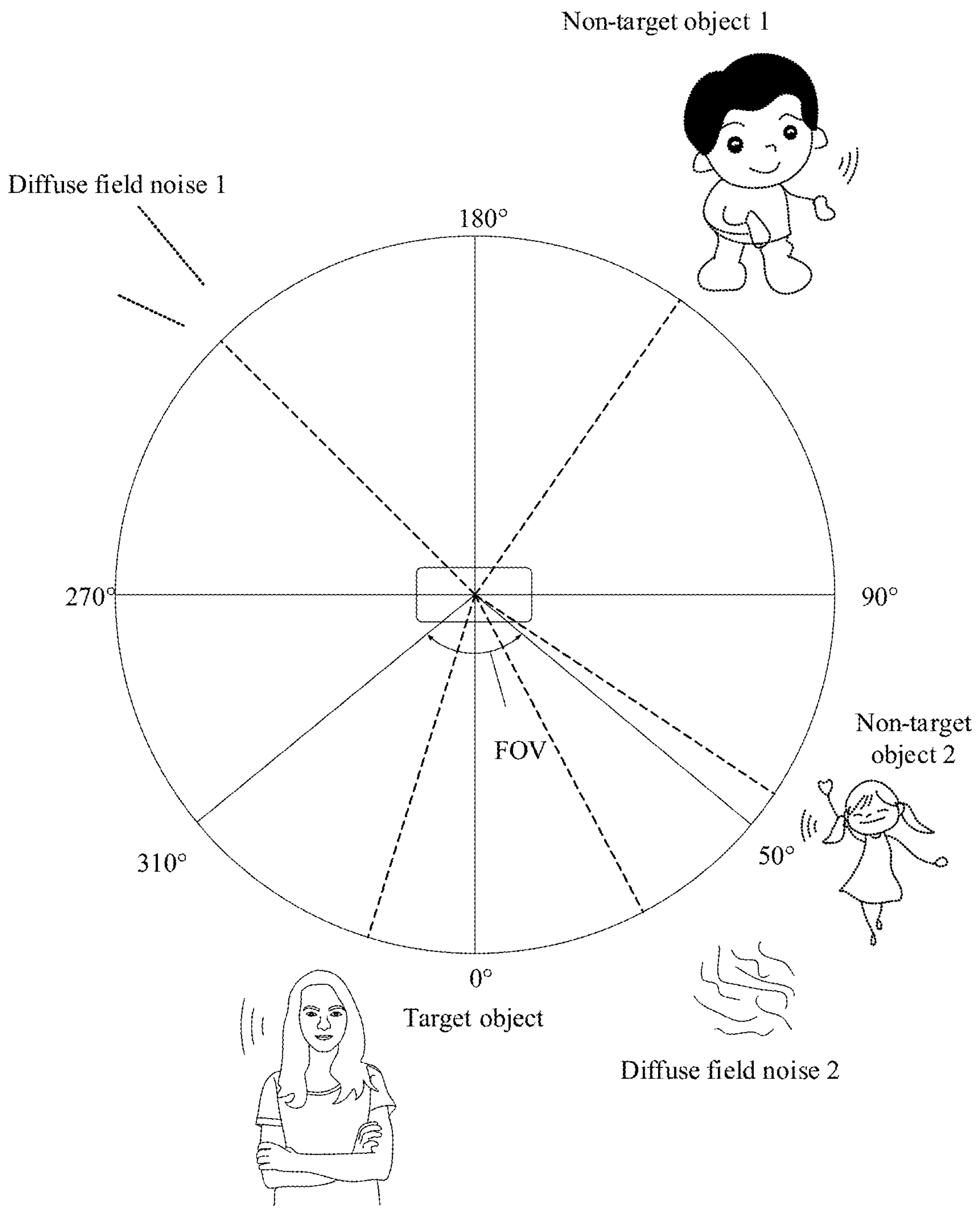
FIG. 10 is a second scene diagram of sound signals involved in a sound signal processing method according to an embodiment of this application.

For example, for the target object, if energy of the left-channel audio output signal $Y_L$(t,f) is equal to energy of the left-channel time-frequency voice signal $X_L$(t,f), and energy of the right-channel audio output signal $Y_R$(t,f) is equal to energy of the right-channel time-frequency voice signal $X_R$(t,f), the sound signal of the target object as shown in FIG. 10 is intactly retained.

For the non-target object, if the energy of the left-channel audio output signal $Y_L$(t,f) is equal to 0.2 times the energy of the left-channel time-frequency voice signal $X_L$(t,f), and the energy of the right-channel audio output signal $Y_R$(t,f) is equal to 0.2 times the energy of the right-channel time-frequency voice signal $X_R$(t,f), the sound signal of the non-target object as shown in FIG. 10 is effectively suppressed.

For the ambient noise, such as the diffuse field noise 2 within the target orientation, if the energy of the left-channel audio output signal $Y_L$(t,f) is equal to the energy of the left-channel time-frequency voice signal $X_L$(t,f), and the energy of the right-channel audio output signal $Y_R$(t,f) is equal to the energy of the right-channel time-frequency voice signal $X_R$(t,f), the sound signal of the diffuse field noise 2 as shown in FIG. 10 is not suppressed.

For the ambient noise, such as the diffuse field noise 1 within the non-target orientation, if the energy of the left-channel audio output signal $Y_L$(t,f) is equal to 0.2 times the energy of the left-channel time-frequency voice signal $X_L$(t, f), and the energy of the right-channel audio output signal $Y_R$(t,f) is equal to 0.2 times the energy of the right-channel time-frequency voice signal $X_R$(t,f), the sound signal of the diffuse field noise 1 as shown in FIG. 10 is effectively suppressed.

To sum up, as shown in FIG. 10, after the calculation of the time-frequency point gain $g_{mask}$(t,f) in the suppressed sound signal in the non-target orientation, the time-frequency voice signals within the target orientation (e.g., the time-frequency voice signal of the target object and the time-frequency voice signal of the diffuse field noise 2) are all retained intactly, and the time-frequency voice signals not within the target orientation (e.g., the time-frequency voice signal of the non-target object 1, the time-frequency voice signal of the non-target object 2, and the time-frequency voice signal of the diffuse field noise 1) are effectively suppressed. For example, (a) in FIG. 11 is the time-frequency voice signal before the above processing in 401, and (b) in FIG. 11 is the time-frequency voice signal after the above processing in 401. The time-frequency voice signal in the non-target orientation is at boxes in (a) in FIG. 11 and (b) in FIG. 11. As can be seen from the comparison between (a) in FIG. 11 and (b) in FIG. 11, after the sound signal in the non-target orientation is suppressed through 401 above, the time-frequency voice signal in the non-target orientation is suppressed. That is, the energy of the time-frequency voice signal in the box is significantly reduced.

It should be understood that the time-frequency voice signal outputted through the above calculation of the time-frequency point gain $g_{mask}$(t,f) suppresses only the time-frequency voice signal in the non-target orientation, but the ambient noise (e.g., the diffuse field noise 2) may still exist in the target orientation, so that the ambient noise of the outputted time-frequency voice signal is still relatively high, the signal-to-noise ratio of the outputted sound signal is small, and the quality of the voice signal is low.

Figure 12:
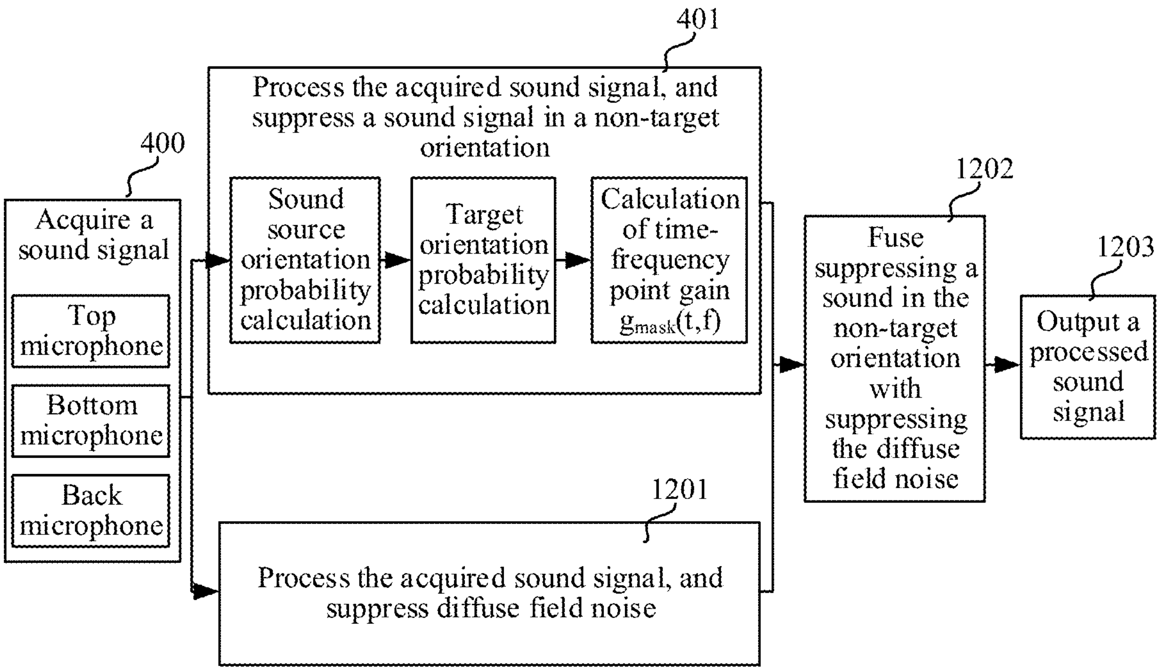
FIG. 12 is a third flowchart of a sound signal processing method according to an embodiment of this application.

Based on this, in some other embodiments, through the sound signal processing method provided in this embodiment of this application, alternatively, by suppressing the diffuse field noise, the signal-to-noise ratio of the outputted voice signal can be increased, and clarity of the voice signal can be improved. As shown in FIG. 12, a sound signal processing method according to an embodiment of this application may include 400 to 401 and 1201 to 1203.

1201: The collected sound signal is processed to suppress diffuse field noise.

Figure 13:
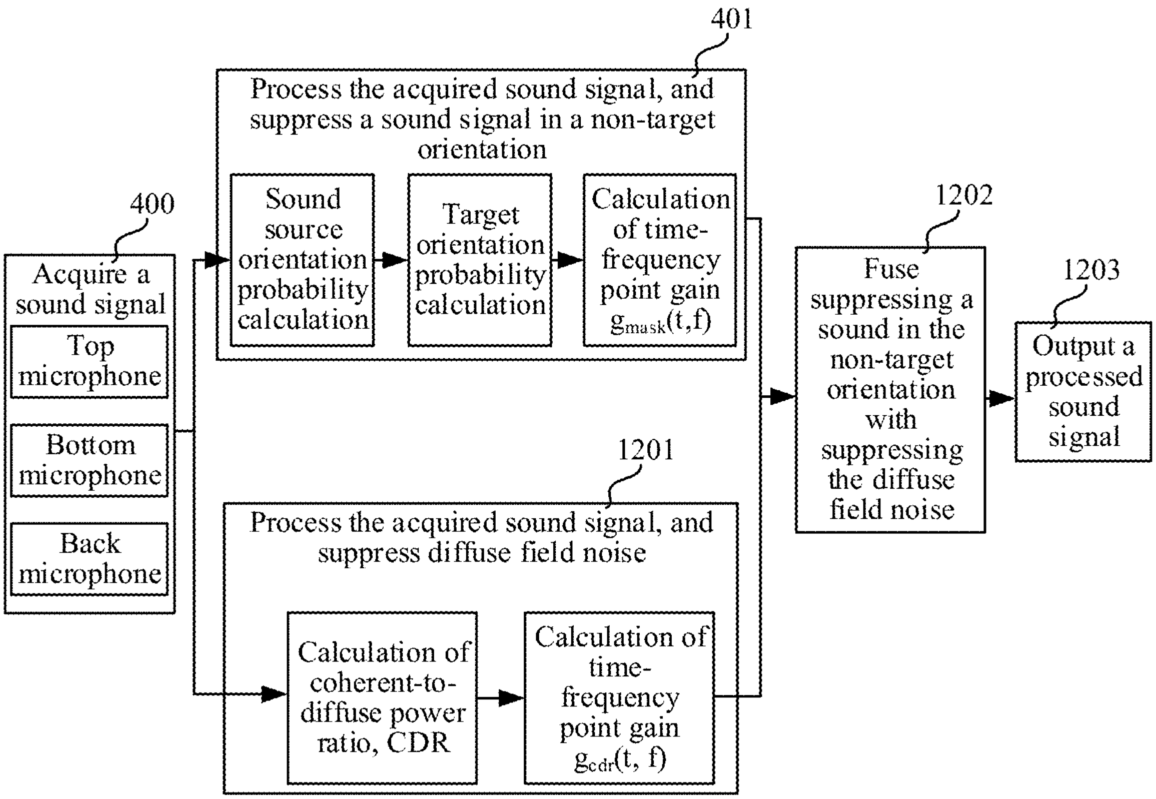
FIG. 13 is a fourth flowchart of a sound signal processing method according to an embodiment of this application.

After the sound signal is collected in 400 above, 1201 may be performed to process the collected sound signal to suppress the diffuse field noise. Exemplarily, the suppressing diffuse field noise may successively go through calculation of a coherent-to-diffuse power ratio (coherent-to-diffuse power ratio, CDR) to realize calculation of time-frequency point gain $g_{cdr}$(t,f) when the diffuse field noise is suppressed. Coherent signals (e.g., the sound signal of the target object and the sound signal of the non-target object) and the diffuse field noise in the sound signal are differentiated through a difference in the time-frequency point gain $g_{cdr}$(t,f). As shown in FIG. 13, the suppressing diffuse field noise may include two calculation processes: calculation of a CDR and calculation of time-frequency point gain $g_{cdr}$(t,f), which are specifically as follows:

(1) Calculation of CDR

The coherent-to-diffuse power ratio (coherent-to-diffuse power ratio, CDR) is a ratio of power of the coherent signal (that is, the voice signal of the target object or the non-target object) to power of the diffuse field noise. The calculation of the coherent-to-diffuse power ratio $\widehat{CDR}$(t,f) is realized by using an existing technology such as Coherent-to-Diffuse Power Ratio Estimation for Dereverberation (Coherent-to-Diffuse Power Ratio Estimation for Dereverberation) for the left-channel time-frequency voice signal $X_L$(t,f), the right-channel time-frequency voice signal $X_R$(t,f), and the back hybrid-channel time-frequency voice signal $X_{back}$(t,f).

Exemplarily, in the shooting scene shown in FIG. 1 above, for the sound signal of the target object, a coherent-to-diffuse power ratio $\widehat{CDR}$(t,f) of the sound signal of the target object is infinite ∞. For the sound signal of the non-target object (e.g., the non-target object 1 or the non-target object 2), a coherent-to-diffuse power ratio of the sound signal of the non-target object is also infinite ∞. For the diffuse field noise (e.g., the diffuse field noise 1 or the diffuse field noise 2), a coherent-to-diffuse power ratio of the diffuse field noise is 0.

(2) Calculation of Time-Frequency Point Gain $g_{cdr}$(t,f)

As can be seen from the above description, a main purpose of suppressing the diffuse field noise is to retain a sound of the coherent signal (e.g., the target object) and reduce energy of the diffuse field noise.

Exemplarily, a time-frequency point gain $g_{cdr}$(t,f) of the coherent signal (i.e., the sound signal of the target object and the sound signal of the non-target object) and time-frequency point gain $g_{cdr}$(t,f) of a non-coherent signal (i.e., the diffuse field noise) may be determined through the coherent-to-diffuse power ratio $\widehat{CDR}$(t,f). That is, the coherent signal and the non-coherent signal are differentiated through the time-frequency point gain $g_{cdr}$(t,f).

Exemplarily, the time-frequency gain $g_{cdr}$(t,f) of the coherent signal may be retained to 1, and the time-frequency gain $g_{cdr}$(t,f) of the non-coherent signal may be reduced, for example, set to 0.3. In this way, the sound signal of the target object can be retained, and the diffuse field noise can be suppressed, so as to reduce capability of the diffuse field noise.

For example, the time-frequency point gain $g_{cdr}$(t,f): may be calculated by using the following Formula (V):

$$g_{cdr}(t, f) = \max\left\{g_{cdr-min}, 1 - \sqrt{\frac{\mu}{\widehat{CDR}(t, f) + 1}}\right\}; \quad \text{Formula (V)}$$

where $g_{cdr-min}$ denotes minimum gain after the diffuse field noise is suppressed, which may be configured through a parameter, and $g_{cdr-min}$ may be set to, for example, 0.3. $g_{cdr}$(t,f) denotes time-frequency point gain after the diffuse field noise is suppressed. μ denotes an overestimation factor, which may be configured through a parameter, and μ is set to, for example, 1.

In this way, for the target object, since the coherent-to-diffuse power ratio $\widehat{CDR}$(t,f) of the sound signal of the target object is infinite ∞, which is substituted into the above Formula (V), the time-frequency point gain $g_{cdr}$(t,f) of the sound signal of the target object after the diffuse field noise is suppressed is 1.

For the non-target object (e.g., the non-target object 1 and the non-target object 2), since the coherent-to-diffuse power ratio $\widehat{CDR}$(t,f) of the sound signal of the non-target object is also infinite ∞, which is substituted into the above Formula (V), the time-frequency point gain $g_{cdr}$(t,f) of the sound signal of the non-target object after the diffuse field noise is suppressed is 1.

For the diffuse field noise (e.g., the diffuse field noise 1 and the diffuse field noise 2), since the coherent-to-diffuse power ratio $\widehat{CDR}$(t,f) of the diffuse field noise is 0, which is substituted into the above Formula (V), the time-frequency point gain $g_{cdr}$(t,f) of the diffuse field noise is 0.3.

Figure 14:
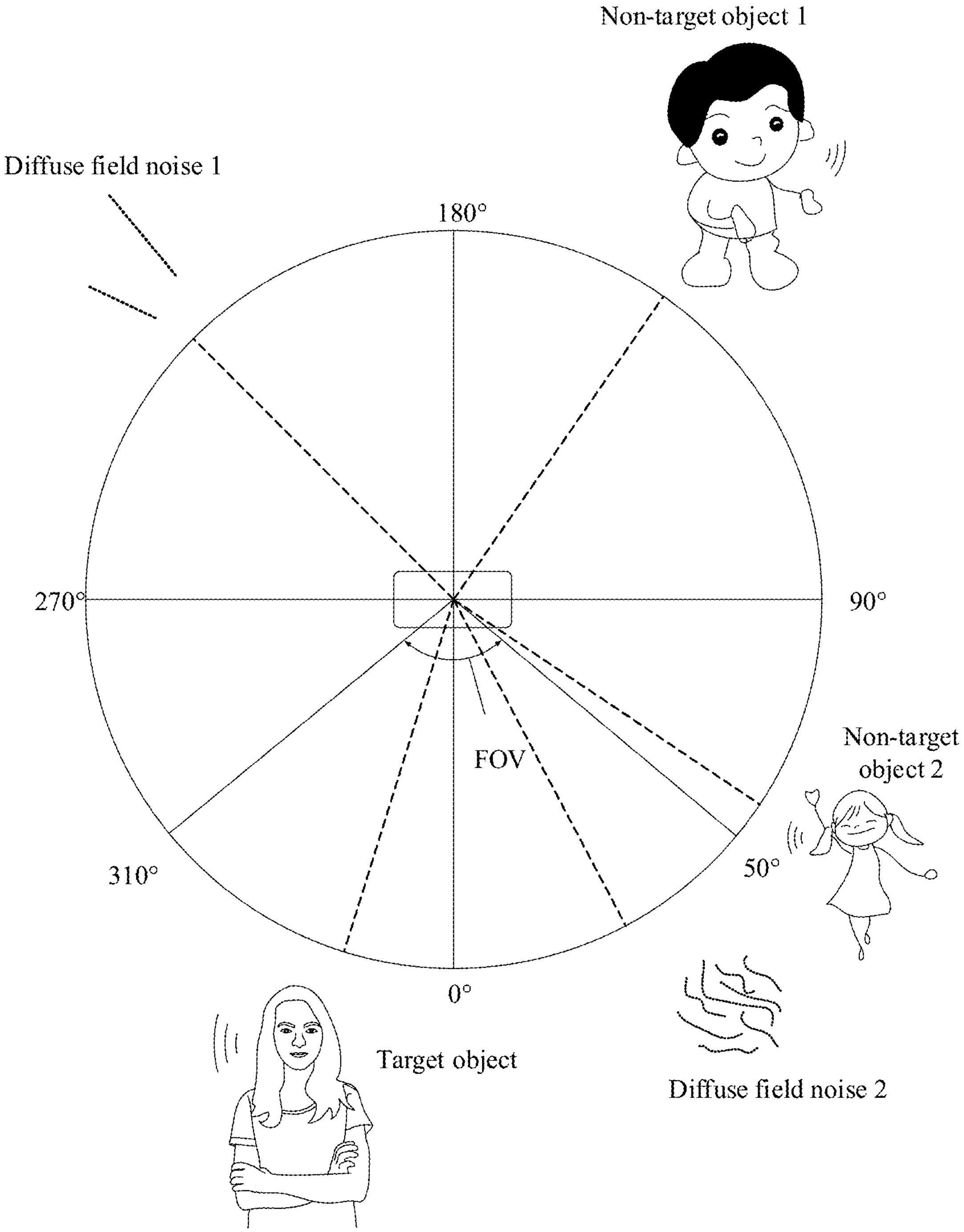
FIG. 14 is a third scene diagram of sound signals involved in a sound signal processing method according to an embodiment of this application.

As can be seen, as shown in FIG. 14, through the calculation of the time-frequency point gain $g_{cdr}$(t,f), the time-frequency point gain $g_{cdr}$(t,f) of the coherent signal (e.g., the sound signal of the target object and the sound signal of the non-target object) is 1, and the coherent signal can be intactly retained. However, through the calculation of the time-frequency point gain $g_{cdr}$(t,f), the time-frequency point gain $g_{cdr}$(t,f) of the diffuse field noise (e.g., the diffuse field noise 1 and the diffuse field noise 2) is 0.3. Therefore, the diffuse field noise is effectively suppressed. That is, the energy of the diffuse field noise is significantly reduced than that before the processing.

1202: Fuse suppressing a sound in the non-target orientation with suppressing the diffuse field noise.

It should be understood that a main purpose of suppressing the sound signal in the non-target orientation in 401 above is to retain the sound signal of the target object and suppress the sound signal of the non-target object. A main purpose of suppressing the diffuse field noise in 1201 above is to suppress the diffuse field noise and protect the coherent signal (i.e., the sound signal of the target object or the non-target object). Therefore, in the sound signal processing method as shown in FIG. 12 or FIG. 13, after 1201 is performed to suppress the diffuse field noise, the time-frequency point gain $g_{mask}$(t,f) obtained by suppressing the sound signal in the non-target orientation in 401 above and the time-frequency point gain $g_{cdr}$(t,f) obtained by suppressing the diffuse field noise in 1201 above may be fused and calculated, and fused gain $g_{mix}$(t,f) may be obtained. The time-frequency voice signal inputted is processed according to the fused gain $g_{mix}$(t,f), and a clear time-frequency voice signal of the target object can be obtained, thereby reducing the energy of the diffuse field noise and increasing the signal-to-noise ratio of the audio (sound) signal.

Exemplarily, the fused gain $g_{mix}$(t,f) may be calculated by using the following Formula (VI):

$$g_{mix}(t, f) = g_{mask}(t, f) * g_{cdr}(t, f); \quad \text{Formula (VI)}$$

$g_{mix}$(t,f) denotes mixed gain after fusion and calculation of the gain.

Exemplarily, still taking the shooting scene shown in FIG. 1 above as an example, the fused gain $g_{mix}$(t,f) is calculated respectively after gain fusion on the time-frequency point signal of the target object, the time-frequency voice signal of the non-target object (e.g., the non-target object 1 and the non-target object 2), the time-frequency voice signal of the diffuse field noise 1, and the time-frequency voice signal of the diffuse field noise 2.

For example, for the time-frequency voice signal of the target object: if $g_{mask}$(t,f)=1 and $g_{cdr}$(t,f)=1, $g_{mix}$(t,f)=1;

for the time-frequency voice signal of the non-target object: if $g_{mask}$(t,f)=0.2 and $g_{cdr}$(t,f)=1, $g_{mix}$(t,f)=0.2;

for the time-frequency voice signal of the diffuse field noise 1: if $g_{mask}$(t,f)=0.2 and $g_{cdr}$(t,f)=0.3, $g_{mix}$(t,f)=0.06; and for the time-frequency voice signal of the diffuse field noise 2: if $g_{mask}$(t,f)=1 and $g_{cdr}$(t,f)=0.3, $g_{mix}$(t,f)=0.3.

As can be seen from the calculation of the fused gain $g_{mix}$(t,f) above, the diffuse field noise with high energy, such as the diffuse field noise 2, can be suppressed by fusing the time-frequency point gain $g_{mask}$(t,f) obtained by suppressing the sound signal in the non-target orientation with the time-frequency point gain $g_{cdr}$(t,f) obtained by suppressing the diffuse field noise.

1203: Output a processed sound signal.

Exemplarily, after the calculation of the fused gain $g_{mix}$(t,f) in 1202 above is performed, the sound signals after fusion of suppressing the sound of the non-target object with suppressing the diffuse field noise, such as $Y_L$(t,f) and $Y_R$(t,f), may be obtained according to the calculated fused gain $g_{mix}(t,f)$ of various sound signals and in combination with a sound input signal collected by the microphone, such as the left-channel time-frequency voice signal $X_L(t,f)$ or the right-channel time-frequency voice signal $X_R(t,f)$. Specifically, the sound signals $Y_L(t,f)$ and $Y_R(t,f)$ outputted after processing may be respectively calculated through the following Formula (VII) and Formula (VIII):

$$Y_L(t, f) = X_L(t, f) * g_{mix}(t, f); \quad \text{Formula (VII)}$$

$$Y_R(t, f) = X_R(t, f) * g_{mix}(t, f). \quad \text{Formula (VIII)}$$

Figure 15:
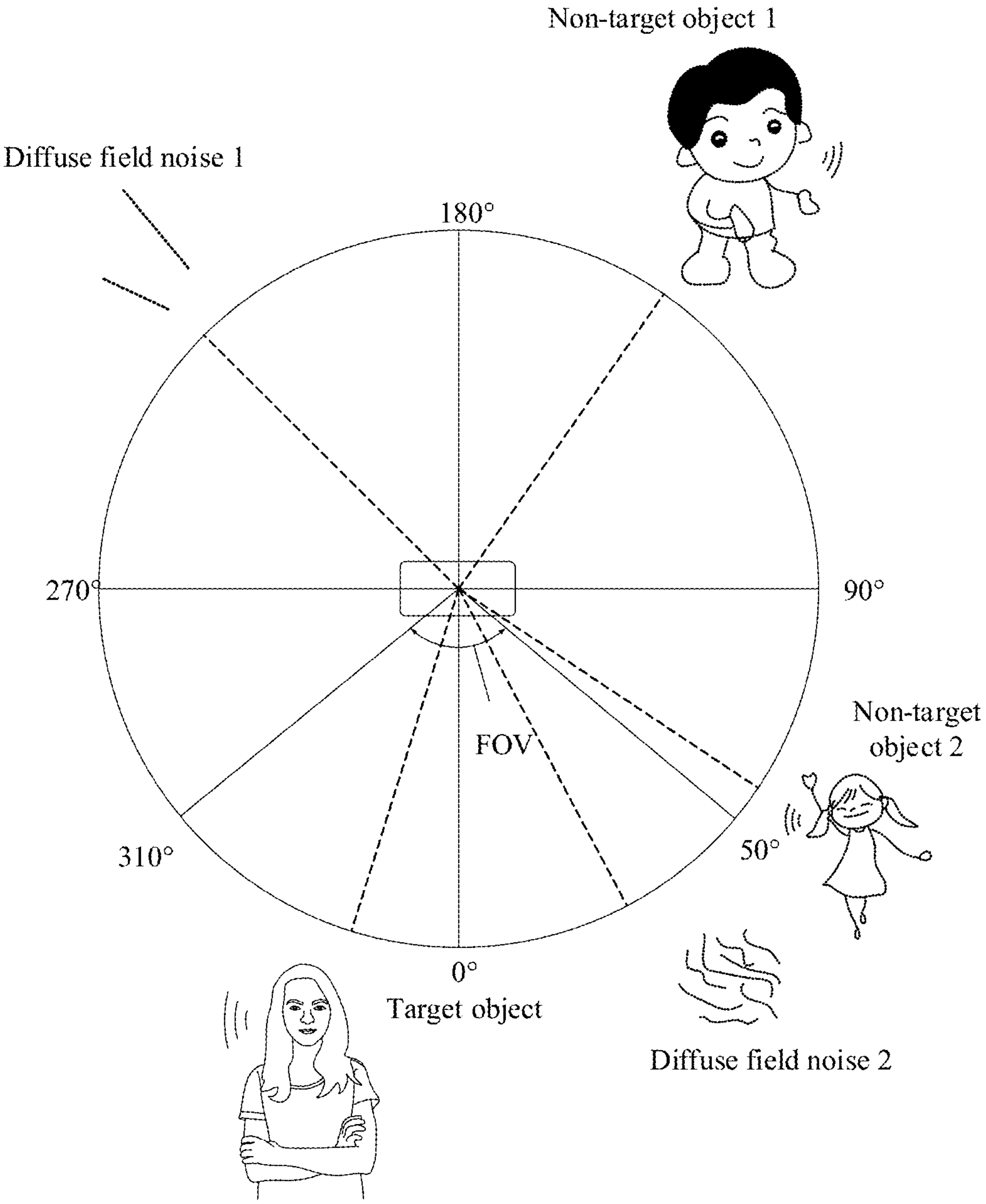
FIG. 15 is a fourth scene diagram of sound signals involved in a sound signal processing method according to an embodiment of this application.

For example, for the target object, if energy of the left-channel audio output signal $Y_L(t,f)$ is equal to energy of the left-channel time-frequency voice signal $X_L(t,f)$, and energy of the right-channel audio output signal $Y_R(t,f)$ is equal to energy of the right-channel time-frequency voice signal $X_R(t,f)$, the sound signal of the target object as shown in FIG. 15 is intactly retained.

For the non-target object, if the energy of the left-channel audio output signal $Y_L(t,f)$ is equal to 0.2 times the energy of the left-channel time-frequency voice signal $X_L(t,f)$, and the energy of the right-channel audio output signal $Y_R(t,f)$ is equal to 0.2 times the energy of the right-channel time-frequency voice signal $X_R(t,f)$, the sound signal of the non-target object as shown in FIG. 15 is effectively suppressed.

For the ambient noise, such as the diffuse field noise 2 within the target orientation, if the energy of the left-channel audio output signal $Y_L(t,f)$ is equal to 0.3 times the energy of the left-channel time-frequency voice signal $X_L(t,f)$, and the energy of the right-channel audio output signal $Y_R(t,f)$ is equal to 0.3 times the energy of the right-channel time-frequency voice signal $X_R(t,f)$, the sound signal of the diffuse field noise 2 as shown in FIG. 15 is effectively suppressed.

For the ambient noise, such as the diffuse field noise 1 within the non-target orientation, if the energy of the left-channel audio output signal $Y_L(t,f)$ is equal to 0.06 times the energy of the left-channel time-frequency voice signal $X_L(t, f)$, and the energy of the right-channel audio output signal $Y_R(t,f)$ is equal to 0.06 times the energy of the right-channel time-frequency voice signal $X_R(t,f)$, the sound signal of the diffuse field noise 1 as shown in FIG. 15 is effectively suppressed.

Figure 16:
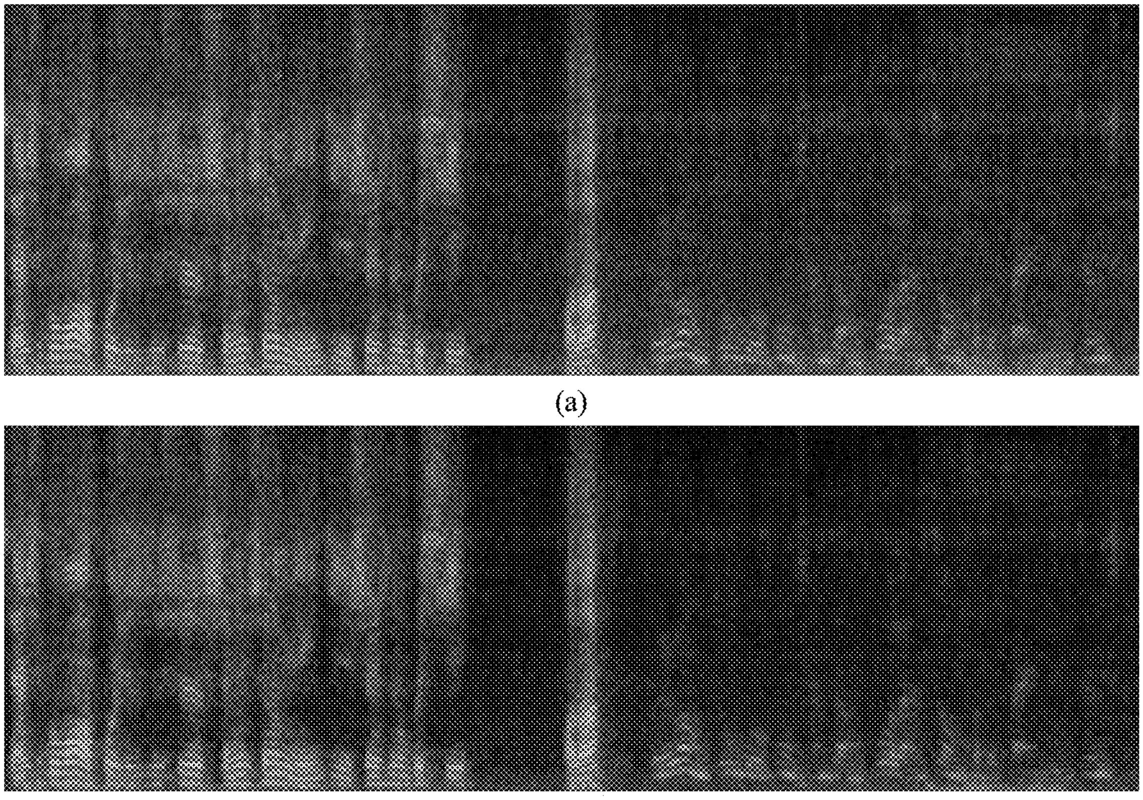
FIG. 16 shows comparative speech spectrograms of execution of the methods shown in FIG. 7 and FIG. 13 according to an embodiment of this application.

To sum up, as shown in FIG. 15, after the calculation of the time-frequency point gain $g_{mask}(t,f)$ in the suppressed sound signal in the non-target orientation, the time-frequency voice signal of the target object within the target orientation is retained intactly, and the time-frequency voice signals not within the target orientation (e.g., the time-frequency voice signal of the non-target object 1, the time-frequency voice signal of the non-target object 2, and the time-frequency voice signal of the diffuse field noise 1) are effectively suppressed. Moreover, the time-frequency voice signal of the diffuse field noise 2 within the target orientation is also effectively suppressed, thereby increasing the signal-to-noise ratio of the voice signal and improving clarity of a selfie sound. For example, (a) in FIG. 16 shows a time-frequency voice signal only after the sound signal in the non-target orientation is suppressed, and (b) in FIG. 16 shows a time-frequency voice signal obtained after fusion of suppressing the sound signal in the non-target orientation with suppressing the diffuse field noise. Upon comparison between (a) in FIG. 16 and (b) in FIG. 16, it can be seen that a background color in a speech spectrogram shown in (a) in FIG. 16 is lighter, and energy of background noise of a corresponding time-frequency voice signal in the speech spectrogram shown in (a) in FIG. 16 is higher, while a background color in a speech spectrogram shown in (b) in FIG. 16 is deeper, a background color of a corresponding time-frequency voice signal in the speech spectrogram shown in (b) in FIG. 16 is deeper, and background noise (i.e., the diffuse field noise) has lower energy. Therefore, it can be determined that, after the fusion of suppressing the sound signal in the non-target orientation with suppressing the diffuse field noise, noise energy of the outputted sound signal is reduced, and the signal-to-noise ratio of the sound signal is significantly increased.

It should be noted that in a noisy environment, if the sound of the target object is separated from the sound of the non-target object only relying on the calculation of the fused gain $g_{mix}(t,f)$ in 1202 above, a problem may arise that the background noise (i.e., the ambient noise) is not stable. For example, after the calculation of the fused gain $g_{mix}(t,f)$ in 1202 above, the fused gain $g_{mix}(t,f)$ of the time-frequency voice signals of the diffuse field noise 1 and the diffuse field noise 2 has a large difference, so that the background noise of the outputted audio signal is not stable.

Figure 17:
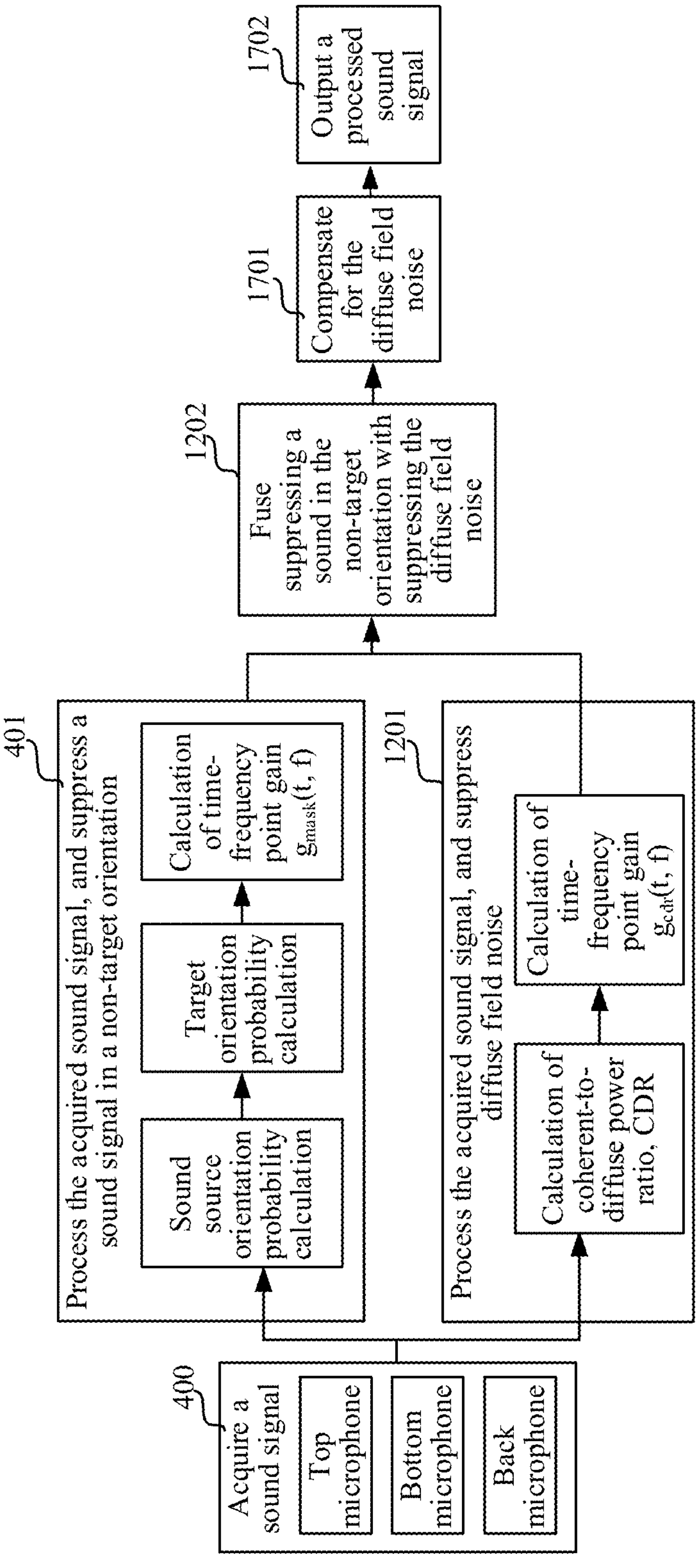
FIG. 17 is a fifth flowchart of a sound signal processing method according to an embodiment of this application.

To address the problem that the background noise of the audio signal after the above processing is not stable, in some other embodiments, noise compensation may be performed on the diffuse field noise, and then secondary noise reduction is performed, so that the background noise of the audio signal is more stable. As shown in FIG. 17, the above sound signal processing method may include 400 to 401, 1201 to 1202, and 1701 to 1702.

1701: Compensate for the diffuse field noise.

Exemplarily, at a stage of diffuse field noise compensation, the diffuse field noise may be compensated for through the following Formula (IX):

$$g_{out}(t, f) = \text{MAX}(g_{mix}(t, f), \text{MIN}(1\text{-}g_{cdr}(t, f), g_{min})) \quad \text{Formula (IX)}$$

$g_{min}$ denotes minimum gain (i.e., a preset gain value) of the diffuse field noise, which may be configured through a parameter, and $g_{min}$ may be set to, for example, 0.3. $g_{out}(t,f)$ denotes the time-frequency point gain of the time-frequency voice signal after the diffuse field noise compensation.

Exemplarily, still taking the shooting scene shown in FIG. 1 above as an example, diffuse field noise compensation calculation is performed respectively on the time-frequency voice signal of the target object, the time-frequency voice signal of the non-target object (e.g., the non-target object 1 and the non-target object 2), the time-frequency voice signal of the diffuse field noise 1, and the time-frequency voice signal of the diffuse field noise 2, to obtain the time-frequency point gain $g_{out}(t,f)$.

For example, for the time-frequency voice signal of the target object: if $g_{mask}(t,f)=1$, $g_{cdr}(t,f)=1$, and $g_{mix}(t,f)=1$, $g_{out}(t,f)=1$;

for the time-frequency voice signal of the non-target object: if $g_{mask}(t,f)=0.2$, $g_{cdr}(0)=1$, and $g_{mix}(t,f)=0.2$, $g_{out}(t,f)=0.2$;

for the time-frequency voice signal of the diffuse field noise 1: if $g_{mask}(t,f)=0.2$, $g_{cdr}(t,f)=0.3$, and $g_{mix}(t,f)=0.06$, $g_{out}(t,f)=0.3$; and for the time-frequency voice signal of the diffuse field noise 2: if $g_{mask}(t,f)=1$, $g_{cdr}(t,f)=0.3$, and $g_{mix}(t,f)=0.3$, $g_{out}(t,f)=0.3$.

As can be seen, after the diffuse field noise compensation, the time-frequency point gain of the diffuse field noise 1 is increased from 0.06 to 0.3, and the time-frequency point gain of the diffuse field noise 2 is kept at 0.3, so that the background noise (e.g., the diffuse field noise 1 and the diffuse field noise 2) of the outputted sound signal is more stable and the user has a better sense of hearing.

1702: Output a processed sound signal.

Different from 1203 above, the processed sound signal, such as the left-channel audio output signal $Y_L$(t,f) and the right-channel audio output signal $Y_R$(t,f), is calculated according to the time-frequency point gain $g_{out}$(t,f) of the time-frequency voice signal after the diffuse field noise compensation. The calculation may specifically be performed through the following Formula (X) and Formula (XI):

$$Y_R(t, f) = X_R(t, f) * g_{out}(t, f); \quad \text{Formula (X)}$$

$$Y_L(t, f) = X_L(t, f) * g_{out}(t, f); \quad \text{Formula (XI)}$$

$X_R$(t,f) denotes a right-channel time-frequency voice signal collected by the microphone, and $X_L$(t,f) denotes a left-channel time-frequency voice signal collected by the microphone.

Figure 18:
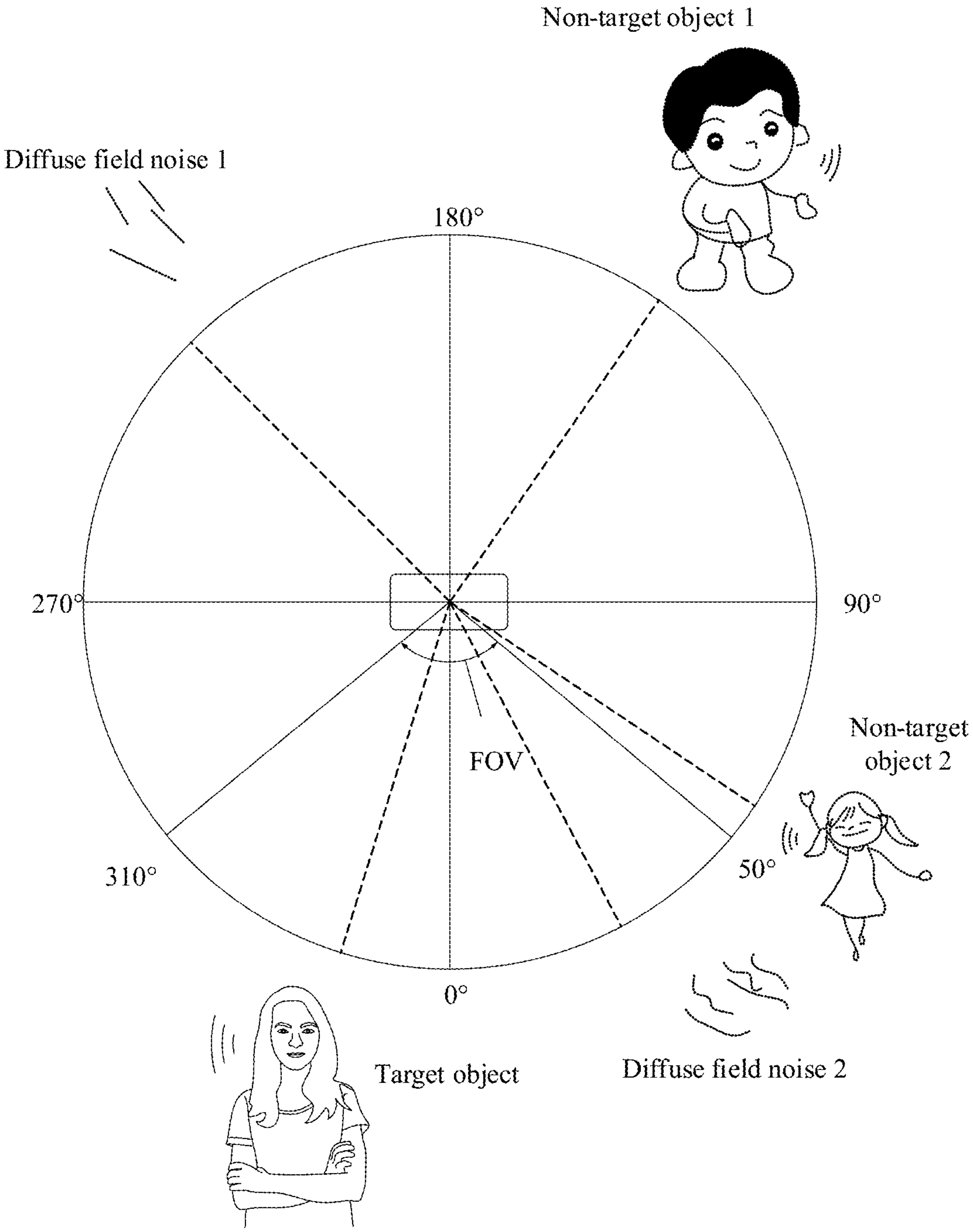
FIG. 18 is a fifth scene diagram of sound signals involved in a sound signal processing method according to an embodiment of this application.

For example, for the target object, if energy of the left-channel audio output signal $Y_L$(t,f) is equal to energy of the left-channel time-frequency voice signal $X_L$(t,f), and energy of the right-channel audio output signal $Y_R$(t,f) is equal to energy of the right-channel time-frequency voice signal $X_R$(t,f), the sound signal of the target object as shown in FIG. 18 is intactly retained.

For the non-target object, if the energy of the left-channel audio output signal $Y_L$(t,f) is equal to 0.2 times the energy of the left-channel time-frequency voice signal $X_L$(t,f), and the energy of the right-channel audio output signal $Y_R$(t,f) is equal to 0.2 times the energy of the right-channel time-frequency voice signal $X_R$(t,f), the sound signal of the non-target object as shown in FIG. 18 is effectively suppressed.

For the ambient noise, such as the diffuse field noise 2 within the target orientation, if the energy of the left-channel audio output signal $Y_L$(t,f) is equal to 0.3 times the energy of the left-channel time-frequency voice signal $X_L$(t,f), and the energy of the right-channel audio output signal $Y_R$(t,f) is equal to 0.3 times the energy of the right-channel time-frequency voice signal $X_R$(t,f), the sound signal of the diffuse field noise 2 as shown in FIG. 18 is effectively suppressed.

For the ambient noise, such as the diffuse field noise 1 within the non-target orientation, if the energy of the left-channel audio output signal $Y_L$(t,f) is equal to 0.3 times the energy of the left-channel time-frequency voice signal $X_L$(t, f), and the energy of the right-channel audio output signal $Y_R$(t,f) is equal to 0.3 times the energy of the right-channel time-frequency voice signal $X_R$(t,f), the sound signal of the diffuse field noise 1 as shown in FIG. 18 is effectively suppressed.

Figure 19:
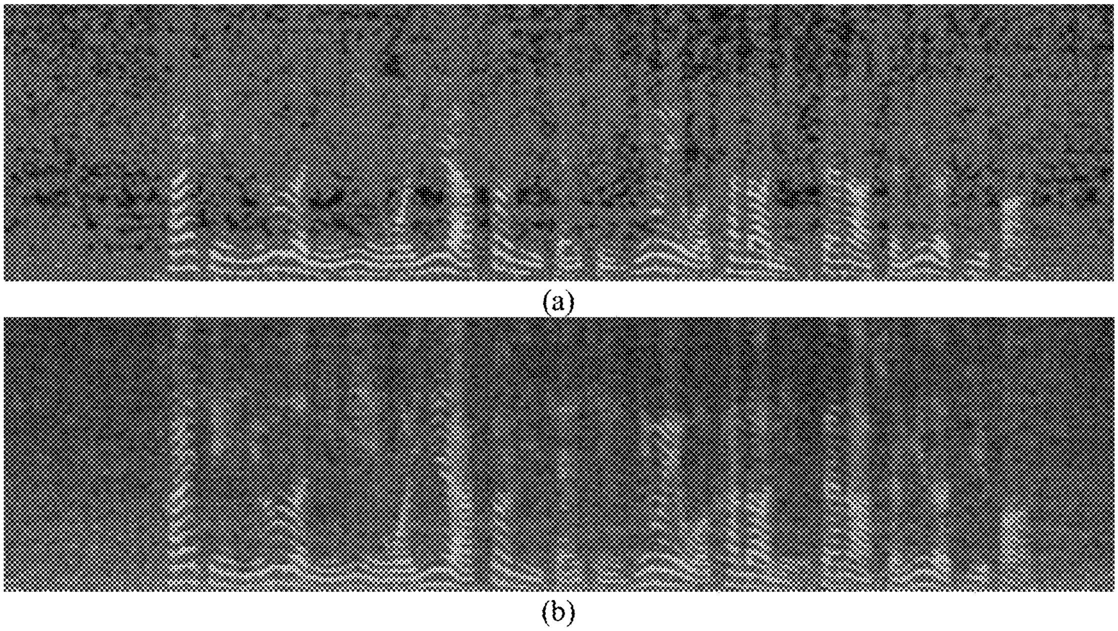
FIG. 19 shows comparative speech spectrograms of execution of the methods shown in FIG. 13 and FIG. 17 according to an embodiment of this application.

To sum up, as shown in FIG. 18, through the calculation of the time-frequency point gain $g_{out}$(t,f) after the diffuse field noise compensation, a difference between the time-frequency point gain $g_{out}$(t,f) of the diffuse field noise 1 and the diffuse field noise 2 is reduced, so that the background noise (e.g., the diffuse field noise 1 and the diffuse field noise 2) of the outputted sound signal is more stable and the user has a better sense of hearing. For example, (a) in FIG. 19 shows a time-frequency voice signal outputted without diffuse field noise compensation, and (b) in FIG. 19 shows a time-frequency voice signal outputted after diffuse field noise compensation. Upon comparison between (a) in FIG. 19 and (b) in FIG. 19, it can be seen that a background color of a speech spectrogram shown in (b) in FIG. 19 is more uniform, indicating that energy of the background noise is more uniform. Therefore, it can be determined that the background noise (e.g., the diffuse field noise) of the outputted sound signal after the diffuse field noise compensation is more uniform and smooth, so that the user has a better sense of hearing.

It should be noted that after the processing with the sound signal processing method shown in FIG. 7, FIG. 13, and FIG. 17 above, all left-channel audio output signals $Y_L$(t,f) and right-channel audio output signals $Y_R$(t,f) are obtained, and the outputted time-frequency voice signal is changed into a time-domain amplitude signal through inverse Fast Fourier Transform (inverse Fast Fourier Transform, IFFT) or (inverse discrete Fourier transform, IDFT), which may be outputted through the speaker 1 and the speaker 2 of the mobile phone.

The above is an introduction to the specific process of the sound signal processing method provided in this embodiment of this application, and how to use the above sound signal processing method is described below in conjunction with different application scenes.

Scene I: A scene where the user uses the front-facing camera for video recording.

Figure 20:
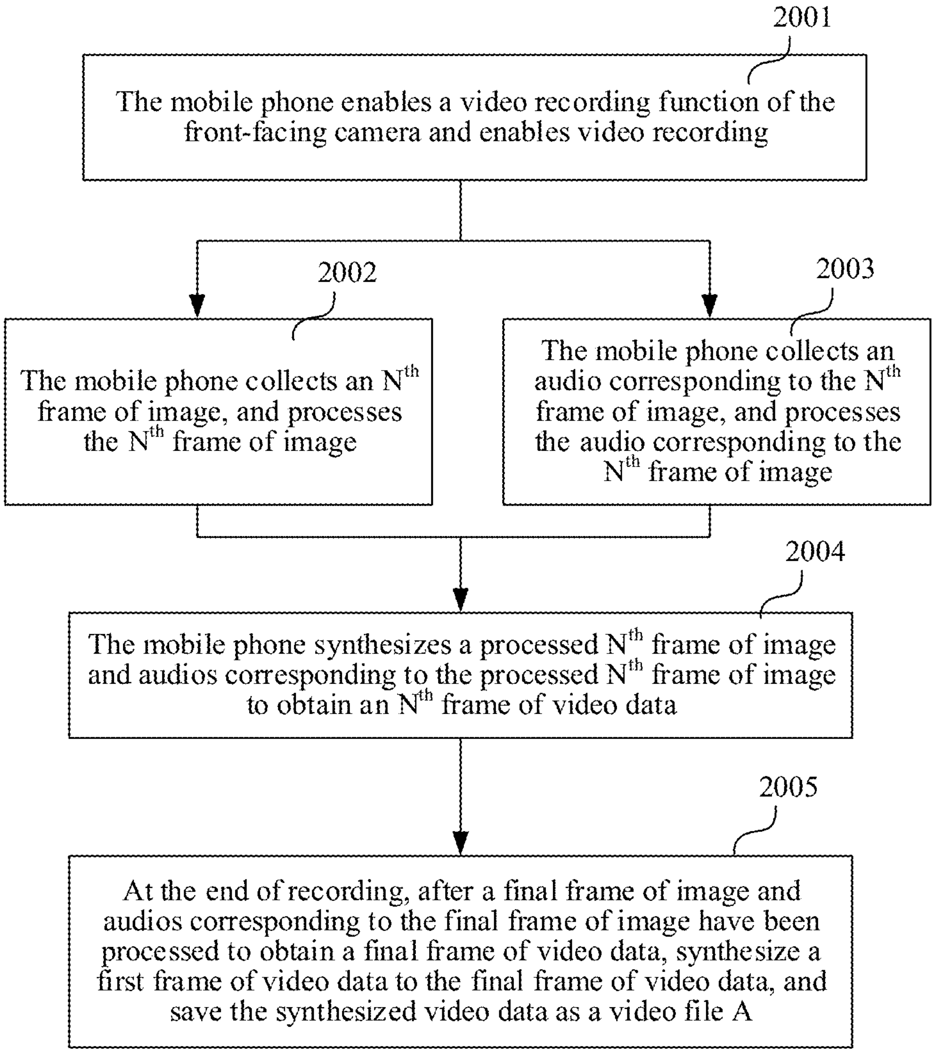
FIG. 20 is a fifth flowchart of a sound signal processing method according to an embodiment of this application.

In some embodiments, regarding Scene I above, each time the mobile phone collects a frame of image data, the mobile phone processes the collected frame of image data, or each time audio data corresponding to a frame of image data is collected, the collected audio data is processed. Exemplarily, as shown in FIG. 20, a sound signal processing method according to an embodiment of this application may include the following steps:

2001: The mobile phone enables a video recording function of the front-facing camera and enables video recording.

In this embodiment of this application, the user may enable the video recording function of the mobile phone when wanting to use the mobile phone for video recording. For example, the mobile phone may enable a camera application or enable another application with a video recording function (an AR application such as Douyin or Kuaishou), so as to enable the video recording function of the application.

For example, the mobile phone, after detecting the user's operation of clicking a camera icon 2101 shown in FIG. 21A(1), enables the video recording function of the camera application, and displays a preview interface for video recording by the front-facing camera as shown in FIG. 21A(2). In another example, the mobile phone displays a desktop or an interface of a non-camera application, enables a video recording function after detecting the user's voice instruction to open the camera application, and displays the preview interface for video recording by the front-facing camera as shown in FIG. 21A(2).

It should be noted that the mobile phone may alternatively enable the video recording function in response to the user's another touch operation, voice instruction, or shortcut gesture. An operation of triggering the mobile phone to enable the video recording function is not limited in this embodiment of this application.

When the mobile phone displays the preview interface for video recording by the front-facing camera as shown in FIG. 21A(2), the mobile phone, after detecting the user's operation of clicking a video recording button 2102 shown in FIG. 21A(2), enables the front-facing camera for video recording, displays a video recording interface for video recording by the front-facing camera as shown in FIG. 21A(3), and starts timing of the video recording.

2002: The mobile phone collects an $N^{th}$ frame of image, and processes the $N^{th}$ frame of image.

Exemplarily, an image stream and an audio stream may be obtained by classification during the video recording by the mobile phone. The image stream is used for collecting image data and performing an image processing operation on each frame of image. The audio stream is used for collecting audio data and performing sound pickup and denoising on each frame of audio data.

Exemplarily, taking a $1^{st}$ frame of image as an example, after the mobile phone collects the $1^{st}$ frame of image, the mobile phone may process the $1^{st}$ frame of image, such as image denoising and tone mapping. After the mobile phone collects a $2^{nd}$ frame of image, the mobile phone may process the $2^{nd}$ frame of image. By analog, after the mobile phone collects the $N^{th}$ frame of image, the mobile phone may process the $N^{th}$ frame of image. N is a positive integer.

2003: The mobile phone collects an audio corresponding to the $N^{th}$ frame of image, and processes the audio corresponding to the $N^{th}$ frame of image.

Taking the shooting environment and the shooting object shown in FIG. 1 above as an example, during the video recording by the mobile phone displayed on a video recording interface as shown in FIG. 21B(1), image data collected by the mobile phone is an image of the target object, and audio data collected by the mobile phone may include a sound of the target object and may also include a sound of the non-target object (e.g., the non-target object 1 and the non-target object 2) and the ambient noise (e.g., the diffuse field noise 1 and the diffuse field noise 2).

If a frame of image is 30 milliseconds (ms) and a frame of audio is 10 milliseconds, by counting a quantity of frames from the enabling of the video recording, audios corresponding to the $N^{th}$ frame of image are a $3N-2^{th}$ frame of audio, a $3N-1^{th}$ frame of audio, and a $3N^{th}$ frame of audio. For example, audios corresponding to a $1^{st}$ frame of image are a $1^{st}$ frame of audio, a $2^{nd}$ frame of audio, and a $3^{rd}$ frame of audio. In another example, audios corresponding to a $2^{nd}$ frame of image are a $4^{th}$ frame of audio, a $5^{th}$ frame of audio, and a $6^{th}$ frame of audio. In still another example, audios corresponding to a $10^{th}$ frame of image are a $28^{th}$ frame of audio, a $29^{th}$ frame of audio, and a $30^{th}$ frame of audio.

Taking the audios corresponding to the $1^{st}$ frame of image as an example, the mobile phone, when processing the audios corresponding to the $1^{st}$ frame of image, is required to process the $1^{st}$ frame of audio, the $2^{nd}$ frame of audio, and the $3^{rd}$ frame of audio respectively.

Exemplarily, when the $1^{st}$ frame of audio has been collected, the mobile phone may perform the sound signal processing method shown in FIG. 7 above to process the $1^{st}$ frame of audio and suppress the sound of the non-target object to highlight the sound of the target object. Alternatively, the mobile phone may perform the sound signal processing method shown in FIG. 13 above to suppress the sound of the non-target object to highlight the sound of the target object and suppress the diffuse field noise to reduce noise energy in the audio signal and increase the signal-to-noise ratio of the audio signal. Alternatively, the mobile phone may perform the sound signal processing method shown in FIG. 17 above to suppress the sound of the non-target object to highlight the sound of the target object and suppress the diffuse field noise to reduce noise energy in the audio signal and increase the signal-to-noise ratio of the audio signal, and can further smooth the background noise (i.e., the ambient noise), so that the user has a better sense of hearing.

Similarly, when the $2^{nd}$ frame of audio or the $3^{rd}$ frame of audio has been collected, the mobile phone may also perform the sound signal processing method shown in FIG. 7 or FIG. 13 or FIG. 17 above to process the audio signal. It should be understood that 2003 above may correspond to step 400 in FIG. 7 or FIG. 13 or FIG. 17.

It should be understood that audios corresponding to any subsequent frame of image may be processed according to the audio processing process corresponding to the $1^{st}$ frame of image above. Details are not described one by one herein again. Certainly, in this embodiment of this application, when the audios corresponding to the $N^{th}$ frame of image are processed, the above method may be performed for processing each time a frame of audio is collected, or after 3 frames of audios corresponding to the $N^{th}$ frame of image have been collected and then each frame of audio of the 3 frames of audios is processed separately, which is not specially limited in this embodiment of this application.

2004: The mobile phone synthesizes a processed $N^{th}$ frame of image and audios corresponding to the processed $N^{th}$ frame of image to obtain an $N^{th}$ frame of video data.

Exemplarily, after the $N^{th}$ frame of image has been processed and the audios corresponding to the $N^{th}$ frame of image, e.g., the $3N-2^{th}$ frame of audio, the $3N-1^{th}$ frame of audio, and the $3N^{th}$ frame of audio, have also been processed, the mobile phone may acquire the $N^{th}$ frame of image from the image stream and acquire the $3N-2^{th}$ frame of audio, the $3N-1^{th}$ frame of audio, and the $3N^{th}$ frame of audio from the audio stream, and then synthesize the $3N-2^{th}$ frame of audio, the $3N-1^{th}$ frame of audio, and the $3N^{th}$ frame of audio with the $N^{th}$ frame of image in order of timestamps into the $N^{th}$ frame of video data.

2005: At the end of recording, after a final frame of image and audios corresponding to the final frame of image have been processed to obtain a final frame of video data, synthesize a first frame of video data to the final frame of video data, and save the synthesized video data as a video file A.

For example, after the mobile phone detects the user's operation of clicking a recording end button 2103 shown in FIG. 21B(1), the mobile phone ends the recording in response to the user's clicking operation, and displays a preview interface for video recording by the front-facing camera as shown in FIG. 21B(2).

In this process, the mobile phone stops collecting images and audios in response to the user's operation of clicking the recording end button 2103, and after the final frame of image and audios corresponding to the final frame of image have been processed to obtain the final frame of time-frequency data, the first frame of video data to the final frame of video data are synthesized in order of timestamps, and are saved as the video file A. In this case, a preview file displayed in a preview window 2104 in the preview interface for video recording by the front-facing camera as shown in FIG. 21B(2) is the video file A.

After the mobile phone detects the user's operation of clicking the preview window 2104 shown in FIG. 21B(2), the mobile phone may display, in response to the user's operation of clicking the preview window 2104, a video file playback interface as shown in FIG. 21B(3) to play back the video file A.

When the mobile phone plays back the video file A, a sound signal of the video file A played back does not include the sound signal of the non-target object (e.g., the non-target object 1 and the non-target object 2), and the background noise (e.g., the diffuse field noise 1 and the diffuse field noise 2) in the sound signal of the video file A played back is low and smooth, which can bring a good sense of hearing of the user.

It should be understood that the scene shown in FIG. 21B(1), FIG. 21B(2), and FIG. 21B(3) is a scene where the sound signal processing method shown in FIG. 17 above is performed, which does not show a scene where the sound signal processing method shown in FIG. 7 or FIG. 13 is performed.

It should be noted that in the method shown in FIG. 20 above, after the mobile phone completes collection and processing on the $N^{th}$ frame of image and collection and processing on the audios corresponding to the $N^{th}$ frame of image, the $N^{th}$ frame of image and the audios corresponding to the $N^{th}$ frame of image are not synthesized into the $N^{th}$ frame of video data, and all images and all audios may be synthesized into the video file A in order of timestamps after the recording ends and the final frame of image and the audios corresponding to the final frame of image have been processed.

In some other embodiments, regarding Scene I above, alternatively, sound pickup and denoising operations may be performed on audio data in the video file after the video file has been recorded.

Figure 22:
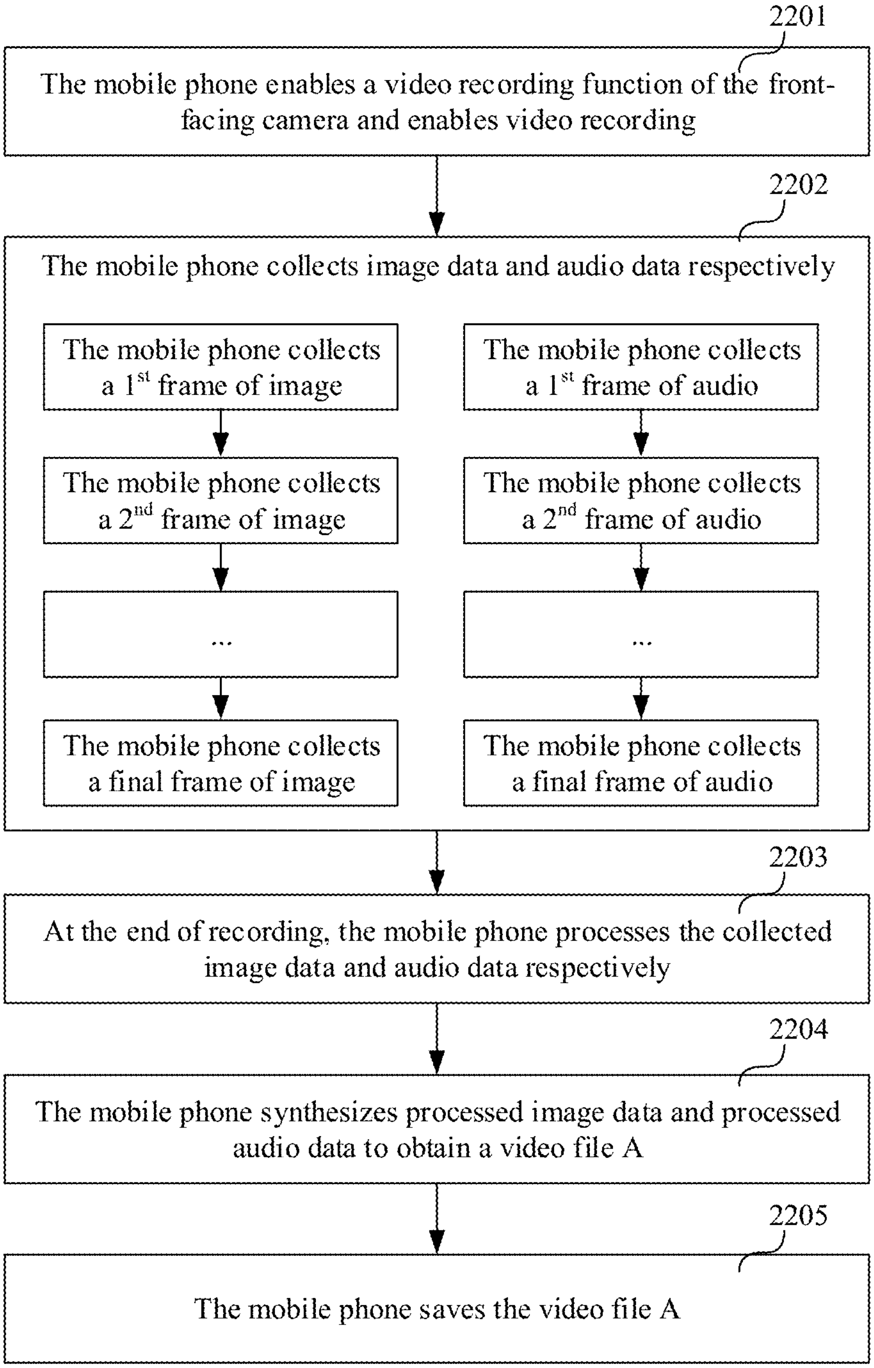
FIG. 22 is a sixth flowchart of a sound signal processing method according to an embodiment of this application.

Exemplarily, as shown in FIG. 22, the video shooting method provided in this embodiment of this application is different from the video shooting method shown in FIG. 20 above in that: the mobile phone, after enabling the video recording, first collects all image data and audio data, then processes and synthesizes the image data and the audio data, and finally saves the image data and the audio data as a synthesized video file. Specifically, the method includes the following steps:

2201: The mobile phone enables a video recording function of the front-facing camera and enables video recording.

Exemplarily, the mobile phone enables the video recording function of the front-facing camera, and the method for enabling video recording may be obtained with reference to the description in 2001 above. Details are not described herein again.

2202: The mobile phone collects image data and audio data respectively.

Exemplarily, an image stream and an audio stream may be obtained by classification during the video recording by the mobile phone. The image stream is used for collecting a plurality of frames of image data during the video recording. The audio stream is used for collecting a plurality of frames of audio data during the video recording.

For example, in the image stream, the mobile phone successively collects a $1^{st}$ frame of image, a $2^{nd}$ frame of image, . . . and a final frame of image. In the audio stream, the mobile phone successively collects a $1^{st}$ frame of audio, a $2^{nd}$ frame of audio, . . . and a final frame of audio.

Taking the shooting environment and the shooting object shown in FIG. 1 above as an example, during the video recording by the mobile phone displayed on a video recording interface as shown in FIG. 21B(1), image data collected by the mobile phone is an image of the target object, and audio data collected by the mobile phone may include a sound of the target object and may also include a sound of the non-target object (e.g., the non-target object 1 and the non-target object 2) and the ambient noise (e.g., the diffuse field noise 1 and the diffuse field noise 2).

2203: At the end of recording, the mobile phone processes the collected image data and audio data respectively.

For example, after the mobile phone detects the user's operation of clicking a recording end button 2103 shown in FIG. 21B(1), the mobile phone ends the recording in response to the user's clicking operation, and displays a preview interface for video recording by the front-facing camera as shown in FIG. 21B(2).

In this process, the mobile phone responds to the user's operation of clicking the recording end button 2103, and the mobile phone processes the collected image data and the collected audio data respectively.

Exemplarily, the mobile phone may process each frame of image in the collected image data separately, such as image denoising and tone mapping, to obtain processed image data.

Exemplarily, the mobile phone may also process each frame of audio in the collected audio data. For example, the sound signal processing method shown in FIG. 7 above is performed to process each frame of audio in first audio data and suppress the sound of the non-target object to highlight the sound of the target object. In another example, the sound signal processing method shown in FIG. 13 above may be performed to process each frame of audio in the collected audio data to suppress the sound of the non-target object to highlight the sound of the target object and suppress the diffuse field noise to reduce noise energy in the audio signal and increase the signal-to-noise ratio of the audio signal. In still another example, the sound signal processing method shown in FIG. 17 above is performed to process each frame of audio in the collected audio data to suppress the sound of the non-target object to highlight the sound of the target object and suppress the diffuse field noise to reduce noise energy in the audio signal and increase the signal-to-noise ratio of the audio signal, and can further smooth the background noise (i.e., the ambient noise), so that the user has a better sense of hearing.

After the mobile phone has processed each frame of audio in the collected audio data, processed audio data can be obtained.

It should be understood that 2202 and 2203 above may correspond to step 400 in FIG. 7 or FIG. 13 or FIG. 17.

2204: The mobile phone synthesizes processed image data and processed audio data to obtain a video file A.

It should be understood that the processed image data and the processed audio data need to be synthesized into a video file before they can be shared or played back by the user. Therefore, after the mobile phone performs 2203 above to obtain the processed image data and the processed audio data, the processed image data and the processed audio data may be synthesized to form the video file A.

2205: The mobile phone saves the video file A.

In this case, the mobile phone can save the video file A. Exemplarily, after the mobile phone detects the user's operation of clicking the preview window 2104 shown in FIG. 21B(2), the mobile phone may display, in response to the user's operation of clicking the preview window 2104, the video file playback interface as shown in FIG. 21B(3) to play back the video file A.

When the mobile phone plays back the video file A, a sound signal of the video file A played back does not include the sound signal of the non-target object (e.g., the non-target object 1 and the non-target object 2), and the background noise (e.g., the diffuse field noise 1 and the diffuse field noise 2) in the sound signal of the video file A played back is low and smooth, which can bring a good sense of hearing of the user.

Scene II: A scene where the user uses the front-facing camera for live streaming.

In the scene, data collected by the live streaming may be displayed in real time for the user to watch. Therefore, images and audio collected by the live streaming may be processed in real time, and processed image and audio data may be displayed to the user in time. At least a mobile phone A, a server, and a mobile phone B are included in the scene. Both the mobile phone A and the mobile phone B communicate with the server. The mobile phone A may be a live streaming recording device and configured to record audio and video files and transmit the audio and video files to the server. The mobile phone B may be a live streaming display device and configured to acquire the audio and video files from the server and display content of the audio and video files on a live streaming interface for the user to watch.

Figure 23:
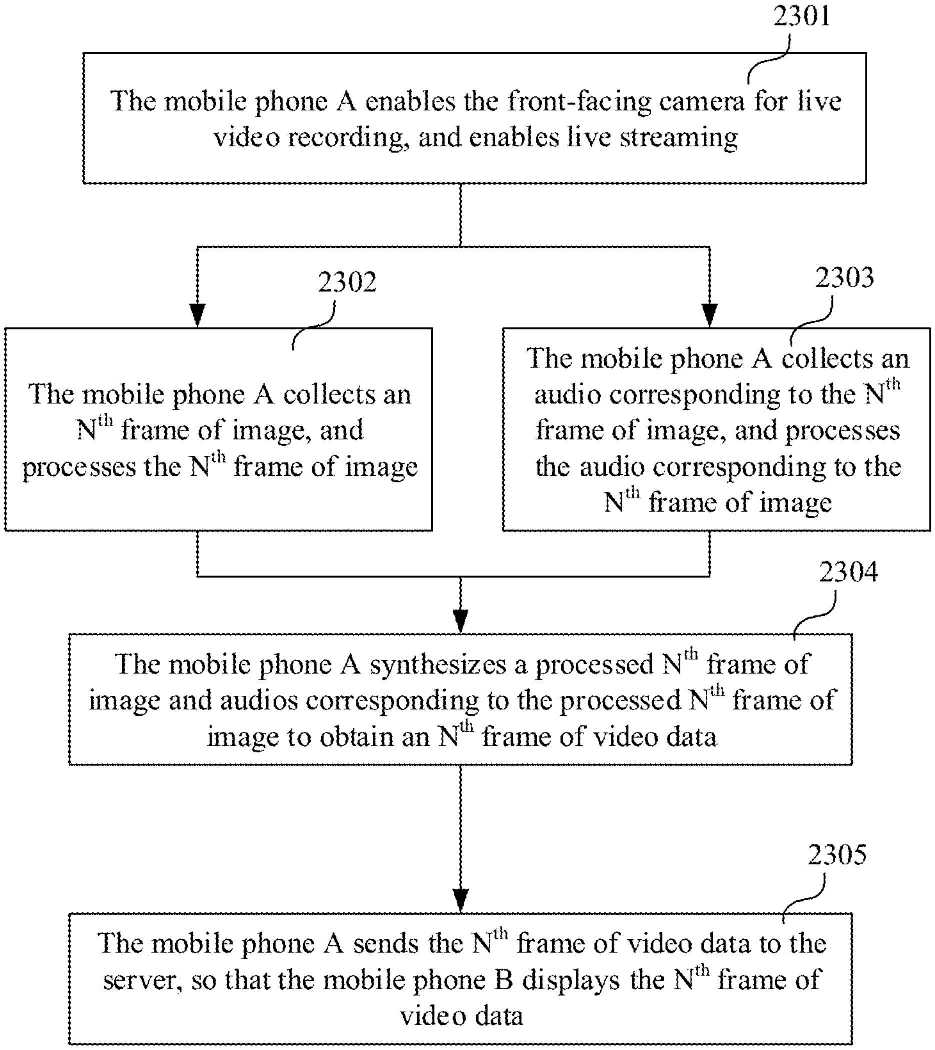
FIG. 23 is a seventh flowchart of a sound signal processing method according to an embodiment of this application.

Exemplarily, regarding Scene II above, as shown in FIG. 23, a video shooting method provided in this embodiment of this application is applied to the mobile phone A. The method may include the following steps:

2301: The mobile phone A enables the front-facing camera for live video recording, and enables live streaming.

In this embodiment of this application, the user, when wanting to use the mobile phone for live video recording, may enable a live streaming application in the mobile phone, such as Douyin or Kuaishou, and enable live video recording.

Figure 24A:
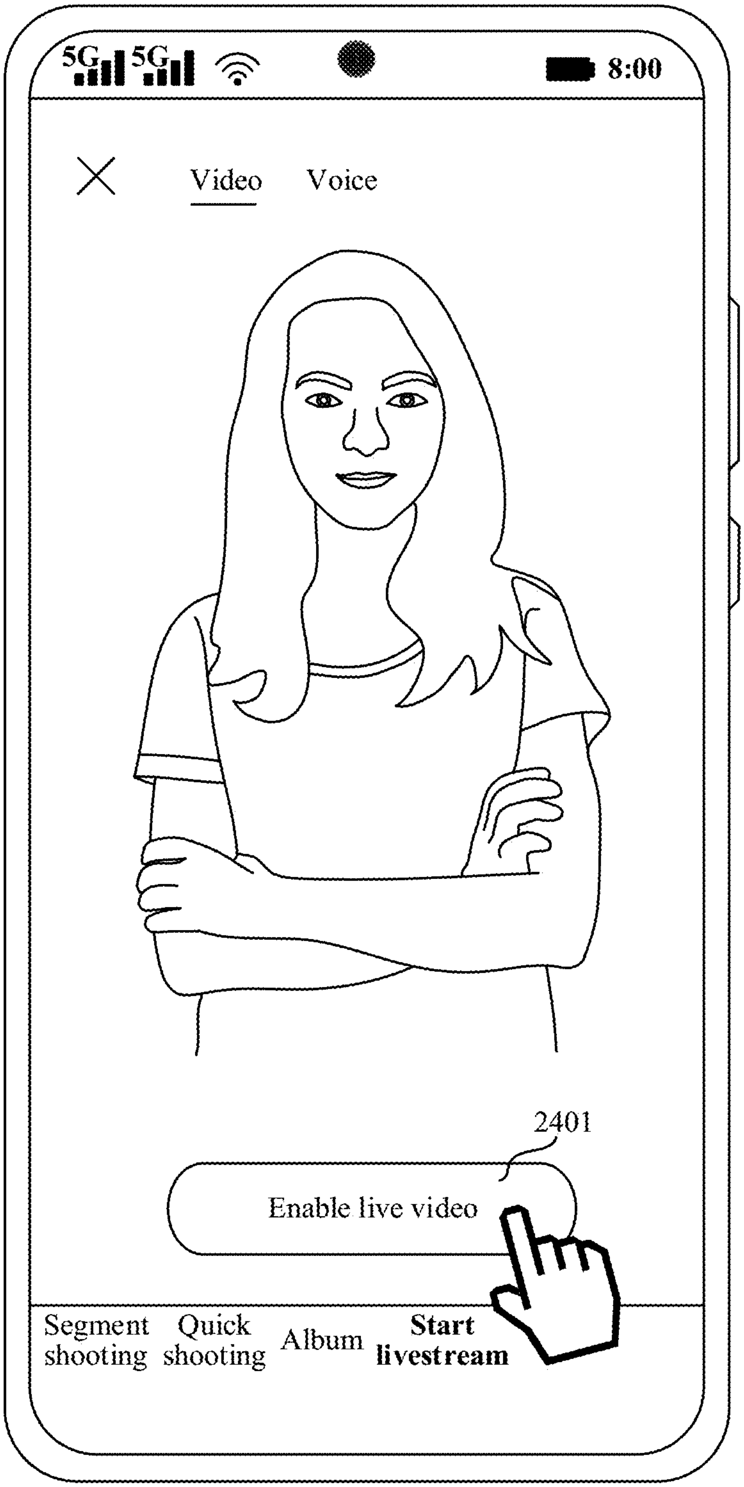
FIG. 24A and FIG. 24B are a second interface diagram involved in a sound signal processing method according to an embodiment of this application.
Figure 24B:

Exemplarily, taking the Douyin application as an example, after the mobile phone detects the user's operation of clicking a video live enable button 2401 shown in FIG. 24A, a live video function of the Douyin application is enabled, and a live video collection interface as shown in FIG. 24B is displayed. In this case, the Douyin application may collect image data and sound data.

2302: The mobile phone A collects an $N^{th}$ frame of image, and processes the $N^{th}$ frame of image.

This processing process is similar to 2202 shown in FIG. 20 above. Details are not described herein again.

2303: The mobile phone A collects an audio corresponding to the $N^{th}$ frame of image, and processes the audio corresponding to the $N^{th}$ frame of image.

Figure 25A:
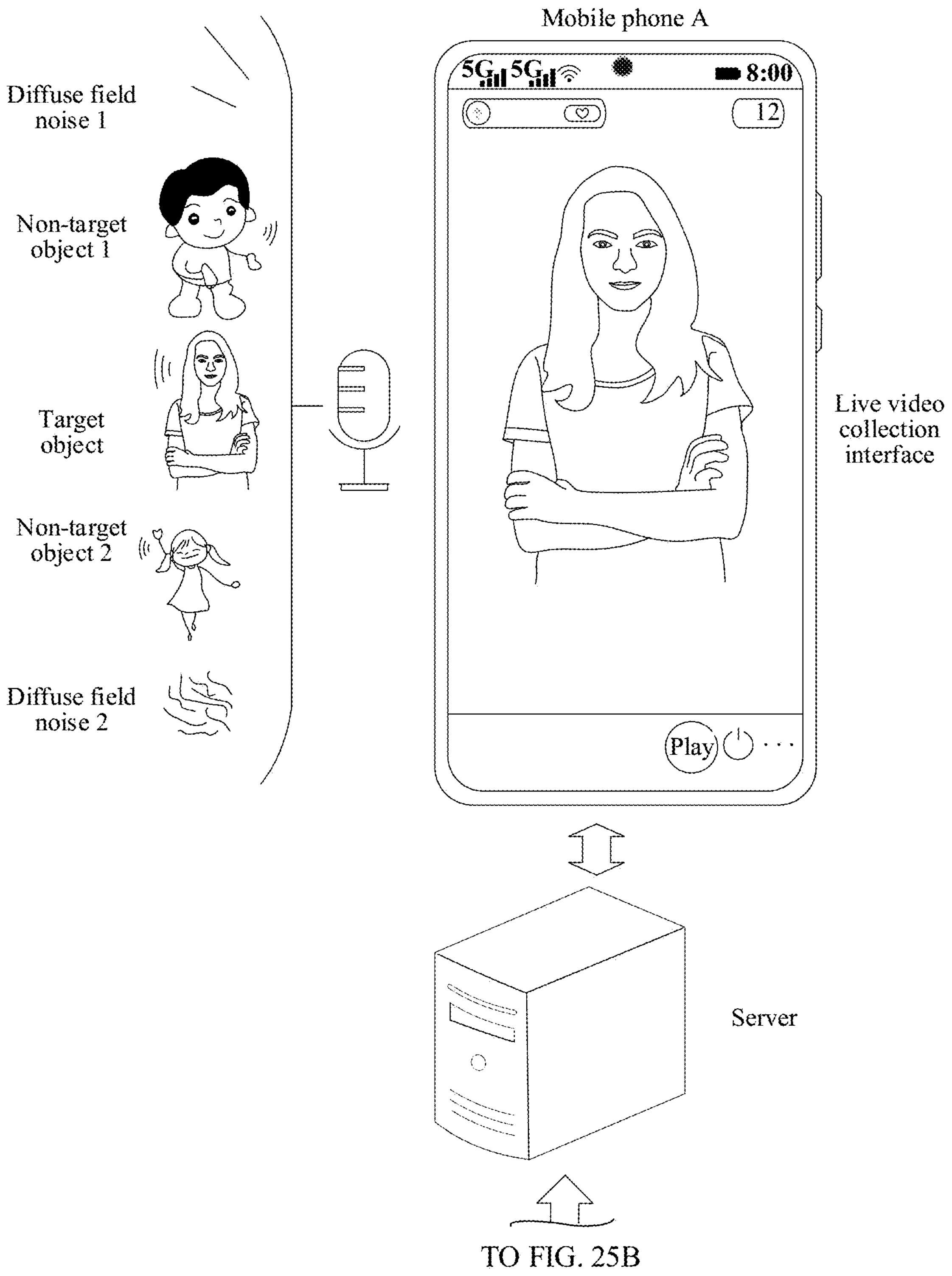
FIG. 25A and FIG. 25B are a second scene diagram of a sound signal processing method according to an embodiment of this application.

Taking the shooting environment and the shooting object shown in FIG. 1 above as an example, as shown in FIG. 25A, on the live video collection interface, the $N^{th}$ frame of image collected by the mobile phone is an image of the target object, and audios corresponding to the $N^{th}$ frame of image collected by the mobile phone may include a sound of the target object and may also include a sound of the non-target object (e.g., the non-target object 1 and the non-target object 2) and the ambient noise (e.g., the diffuse field noise 1 and the diffuse field noise 2).

This processing process is similar to 2203 shown in FIG. 20 above. Details are not described herein again.

2304: The mobile phone A synthesizes a processed $N^{th}$ frame of image and audios corresponding to the processed $N^{th}$ frame of image to obtain an $N^{th}$ frame of video data.

This processing process is similar to 2203 shown in FIG. 20 above. Details are not described herein again. It should be understood that the $N^{th}$ frame of image and the audios corresponding to the processed $N^{th}$ frame of image can be displayed to the user for watching when synthesized into the $N^{th}$ frame of video data.

2305: The mobile phone A sends the $N^{th}$ frame of video data to the server, so that the mobile phone B displays the $N^{th}$ frame of video data.

Exemplarily, after the $N^{th}$ frame of video data is obtained, the mobile phone A may send the $N^{th}$ frame of video data to the server. It should be understood that the server is generally a server of a live streaming application, such as a server of the Douyin application. When a user watching live streaming opens a live streaming application of the mobile phone B, such as the Douyin application, the mobile phone B may display an $N^{th}$ frame of video on a live streamlining display interface for the user to watch.

Figure 25B:
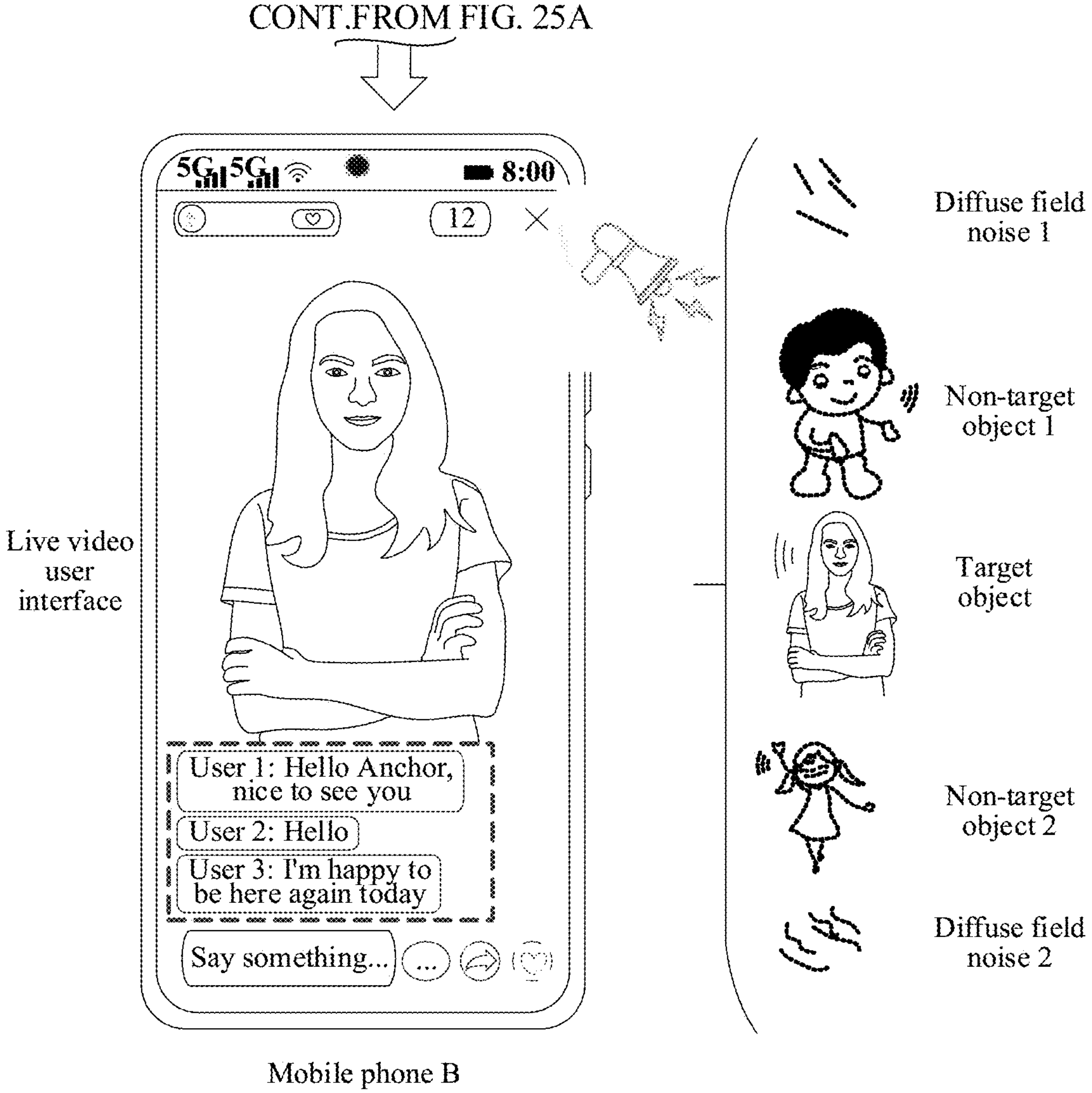

It should be noted that after the audios corresponding to the $N^{th}$ frame of image, e.g., the $3N-2^{th}$ frame of audio, the $3N-1^{th}$ frame of audio, and the $3N^{th}$ frame of audio, have been processed in 2303 above, as shown in FIG. 25B, an audio signal in an $N^{th}$ frame of video data outputted by the mobile phone B is a processed audio signal, and only a sound of a target object (i.e., a live shooting object) is retained.

It should be understood that the scene shown in FIG. 25A and FIG. 25B is a scene where the sound signal processing method shown in FIG. 17 above is performed, which does not show a scene where the sound signal processing method shown in FIG. 7 or FIG. 13 is performed.

Scene III: A scene where sound pickup is performed on a video file in an album of the mobile phone.

In some cases, the electronic device (e.g., the mobile phone) does not support processing on recorded sound data during recording of the video file. To improve clarity of sound data of the video file, suppress a noise signal, and increase a signal ratio, the electronic device may perform the sound signal processing method in FIG. 7 or FIG. 13 or FIG. 17 above on the video file saved in the album of the mobile phone and saved original sound data to remove the sound of the non-target object or remove diffuse field noise, so that noise is more stable and the user has a better sense of hearing. The saved original sound data refers to sound data collected by the microphone of the mobile phone during the recording of the video file in the album of the mobile phone.

Figure 26:
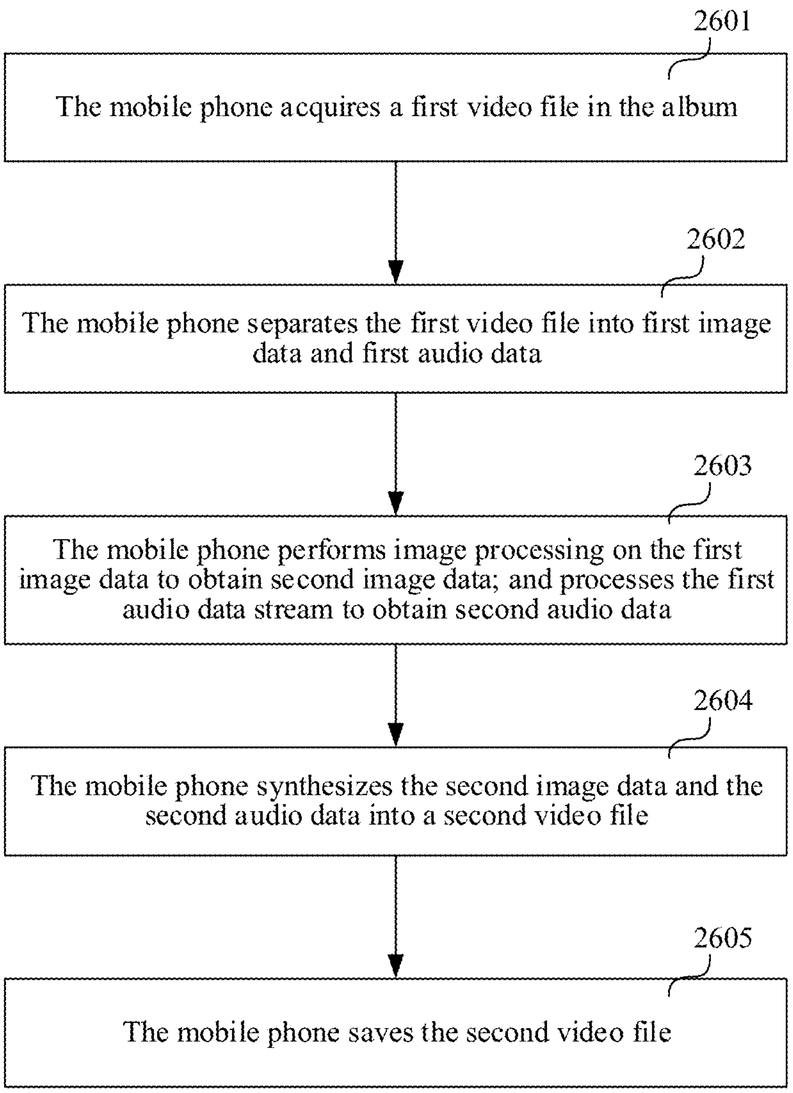
FIG. 26 is an eighth flowchart of a sound signal processing method according to an embodiment of this application.

Exemplarily, an embodiment of this application further provides a sound pickup processing method, which is used for performing sound pickup processing on the video file in the album of the mobile phone. For example, as shown in FIG. 26, the sound pickup processing method includes the following steps:

2601: The mobile phone acquires a first video file in the album.

In this embodiment of this application, the user wants to perform sound pickup processing on the video file in the album of the mobile phone to remove the sound of the non-target object or remove the diffuse field noise. A video file desired to be processed may be selected from the album of the mobile phone, so as to perform sound pickup processing.

Figure 27A:
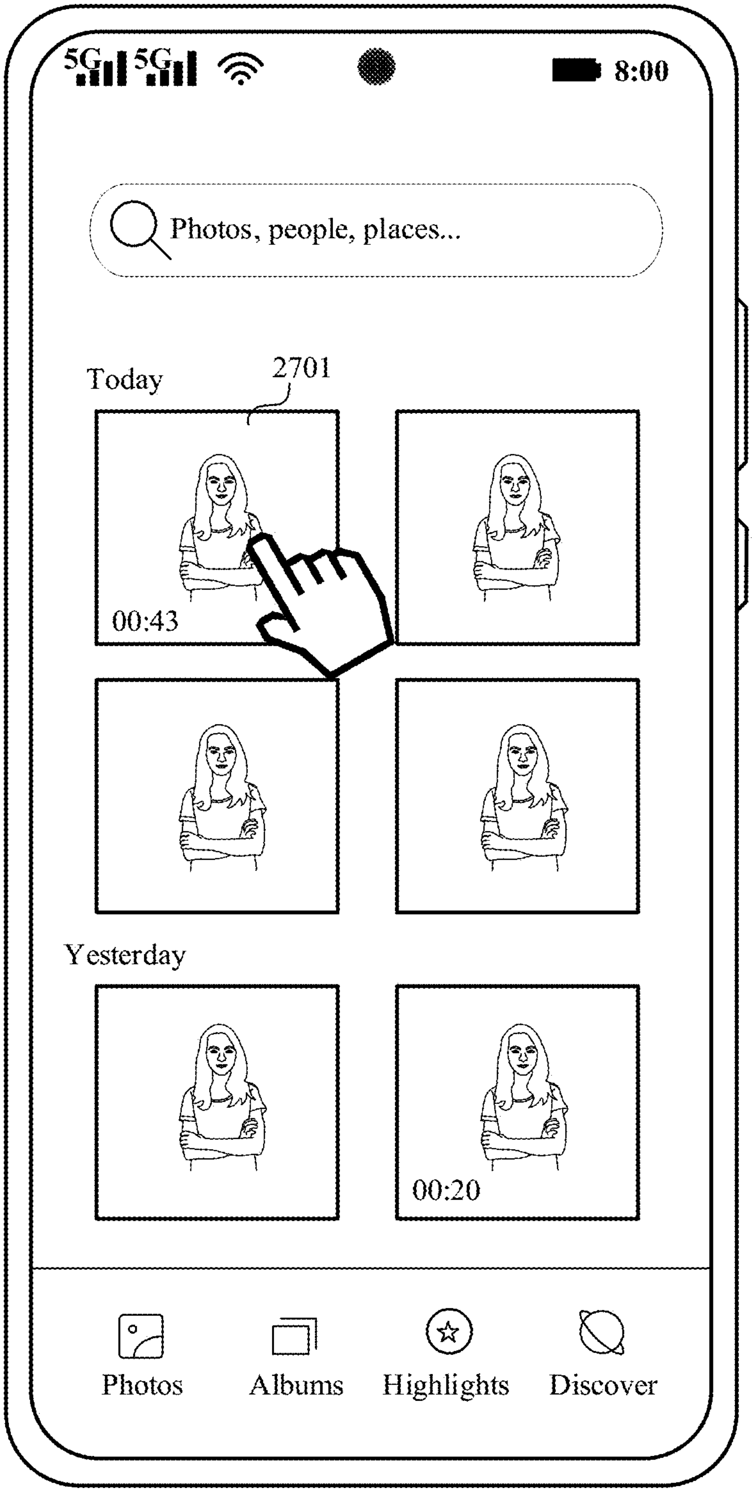
FIG. 27A and FIG. 27B are a third interface diagram involved in a sound signal processing method according to an embodiment of this application.
Figure 27B:
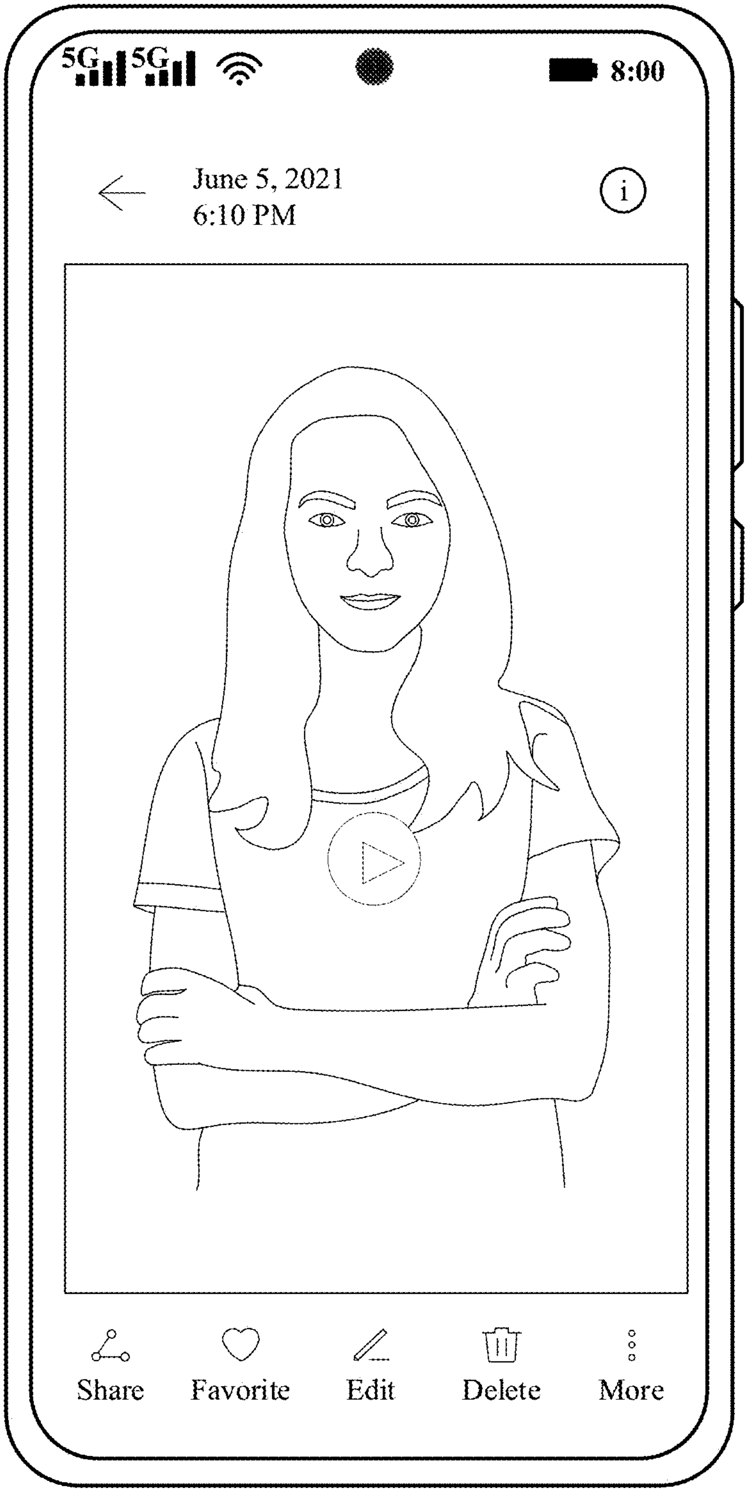

Exemplarily, after the mobile phone detects the user's operation of clicking a preview box 2701 shown in FIG. 27A, the mobile phone displays an operation interface for the first video file as shown in FIG. 27B in response to the user's clicking operation. On the operation interface, the user may play, share, collect, edit, or delete the first video file.

Figure 28A:
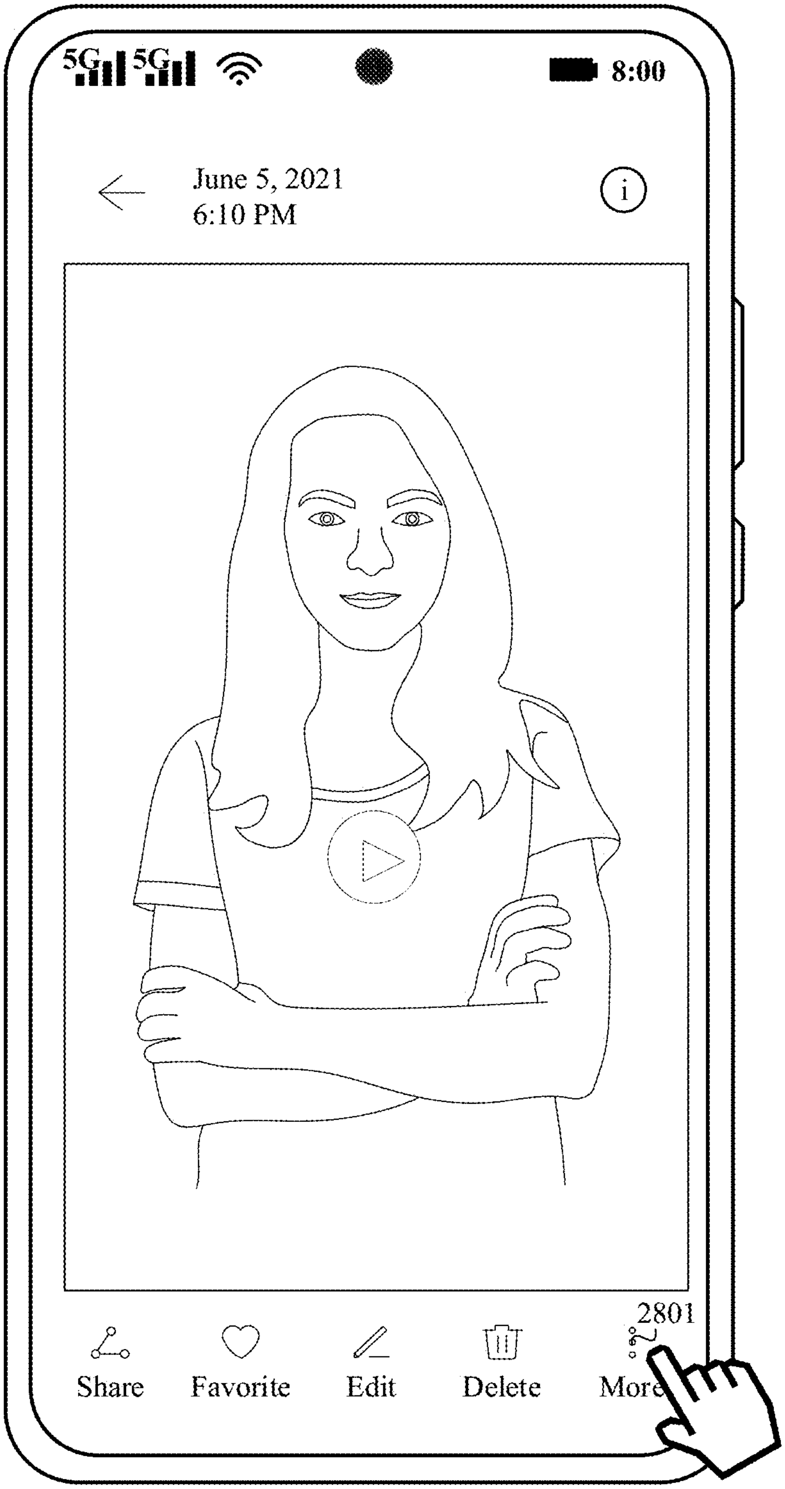
FIG. 28A and FIG. 28B are a fourth interface diagram involved in a sound signal processing method according to an embodiment of this application.
Figure 28B:
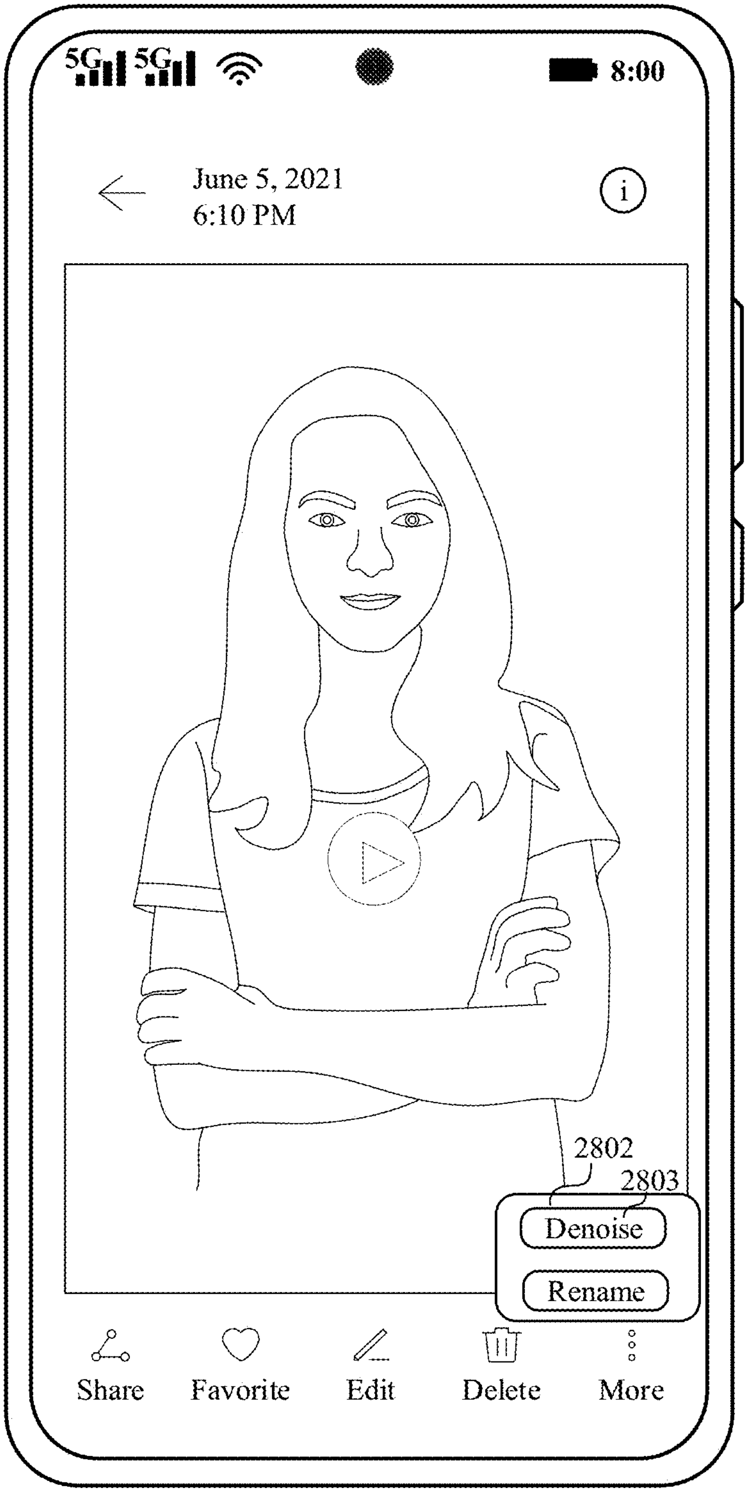

Exemplarily, on the operation interface for the first video file as shown in FIG. 27B, the user may also perform sound pickup and denoising operations on the first video file. Exemplarily, after the mobile phone detects the user's operation of clicking a "more" option 2801 shown in FIG. 28A, the mobile phone displays an operation selection box 2802 as shown in FIG. 28B in response to the user's clicking operation. In the operation selection box 2802, a "denoise" option button 2803 is provided, and the user may click the "denoise" option button 2803 to perform sound pickup and denoising on the first video file.

Figure 29A:
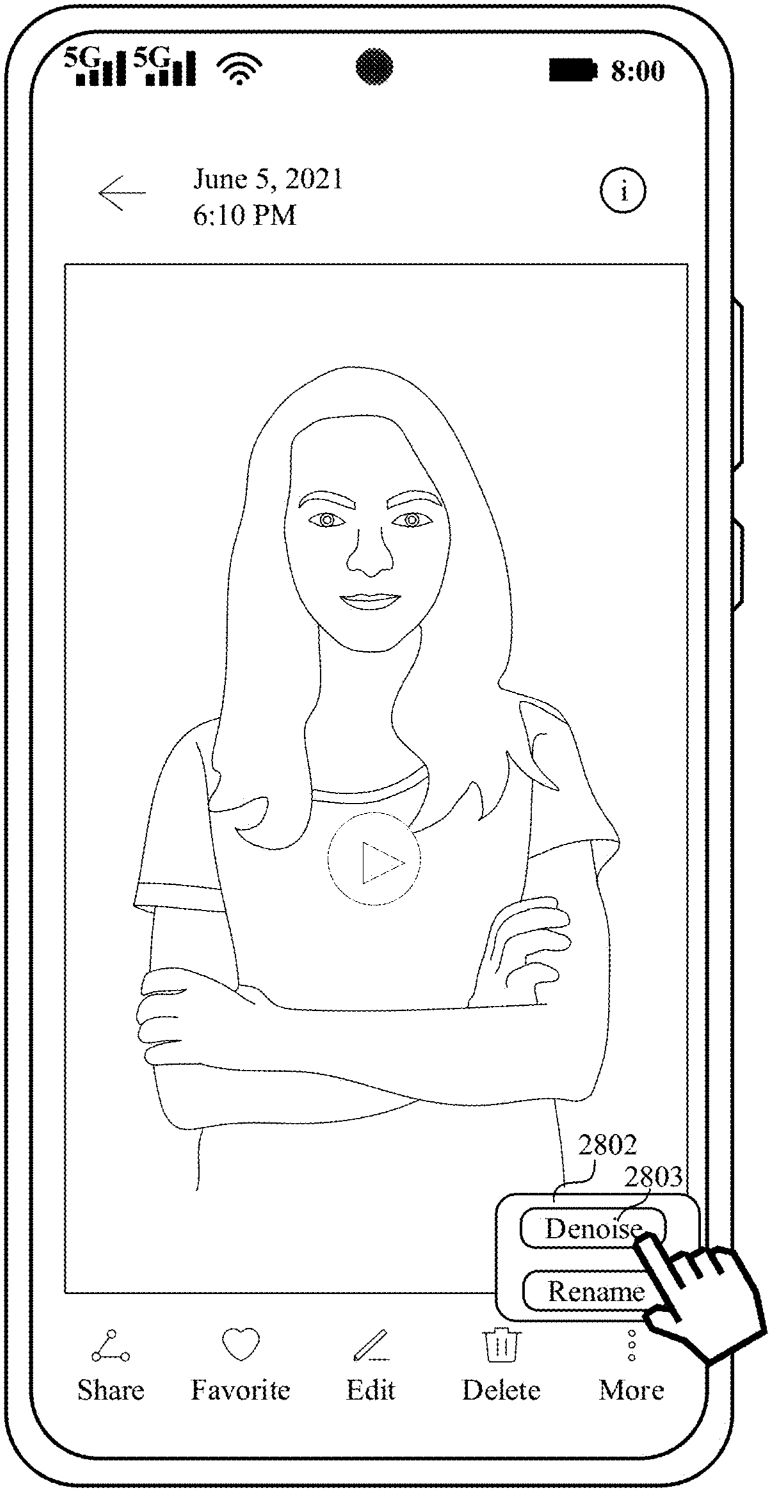
FIG. 29A and FIG. 29B are a fifth interface diagram involved in a sound signal processing method according to an embodiment of this application.
Figure 29B:
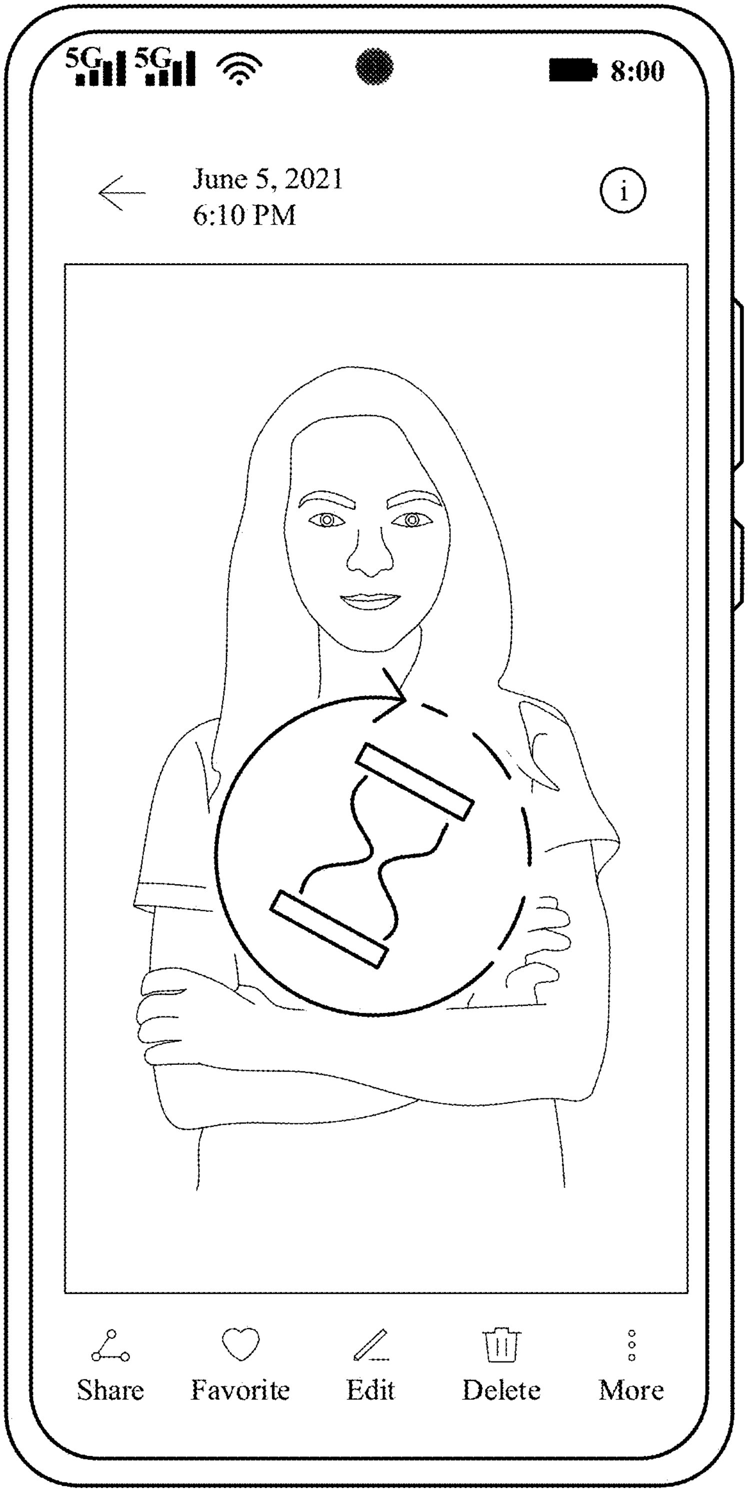

Exemplarily, after the mobile phone detects the user's operation of clicking the "denoise" option button 2803 shown in FIG. 29A, the mobile phone may acquire, in response to the user's clicking operation, the first video file to perform sound pickup and denoising on the first video file. In this case, the mobile phone may display a waiting interface for performing a sound pickup and denoising process as shown in FIG. 29B, and perform the following 2602 to 2604 at a backend to perform sound pickup and denoising on the first video file.

2602: The mobile phone separates the first video file into first image data and first audio data.

It should be understood that a goal of performing sound pickup and denoising on the first video file is to remove the sound of the non-target object and suppress the background noise (i.e., the diffuse field noise). Therefore, the mobile phone needs to separate audio data in the first video file so as to perform sound pickup and denoising on the audio data in the first video file.

Exemplarily, after the mobile phone acquires the first video file, image data and audio data in the first video file may be separated into first image data and first audio data. The first image data may be a set of a $1^{st}$ frame of image to a final frame of image in the image stream of the first video file. The first audio data may be a set of a $1^{st}$ frame of audio to a final frame of audio in the audio stream of the first video file.

2603: The mobile phone performs image processing on the first image data to obtain second image data; and processes the first audio data stream to obtain second audio data.

Exemplarily, the mobile phone may process each frame of image in the first image data, such as image denoising and tone mapping, to obtain the second image data. The second image data is a set of images obtained after each frame of image in the first image data is processed.

Exemplarily, the mobile phone may also process each frame of audio in the first audio data. For example, the sound signal processing method shown in FIG. 7 above is performed to process each frame of audio in first audio data and suppress the sound of the non-target object to highlight the sound of the target object. In another example, the sound signal processing method shown in FIG. 13 above may be performed to process each frame of audio in the first audio data to suppress the sound of the non-target object to highlight the sound of the target object and suppress the diffuse field noise to reduce noise energy in the audio signal and increase the signal-to-noise ratio of the audio signal. In still another example, the sound signal processing method shown in FIG. 17 above is performed to process each frame of audio in the first audio data to suppress the sound of the non-target object to highlight the sound of the target object and suppress the diffuse field noise to reduce noise energy in the audio signal and increase the signal-to-noise ratio of the audio signal, and can further smooth the background noise (i.e., the ambient noise), so that the user has a better sense of hearing.

After the mobile phone has processed each frame of audio in the first audio data, the second audio data can be obtained. The second audio data may be a set of audios obtained after each frame of audio in the first audio data is processed.

It should be understood that 2601 to 2603 above may correspond to step 400 in FIG. 7 or FIG. 13 or FIG. 17.

2604: The mobile phone synthesizes the second image data and the second audio data into a second video file.

It should be understood that the processed second image data and second audio data need to be synthesized into a video file before they can be shared or played back by the user. Therefore, after the mobile phone performs 2603 above to obtain the second image data and the second audio data, the second image data and the second audio data may be synthesized to form the second video file. In this case, the second video file is the first video file after sound pickup and denoising.

2605: The mobile phone saves the second video file.

Figure 30:
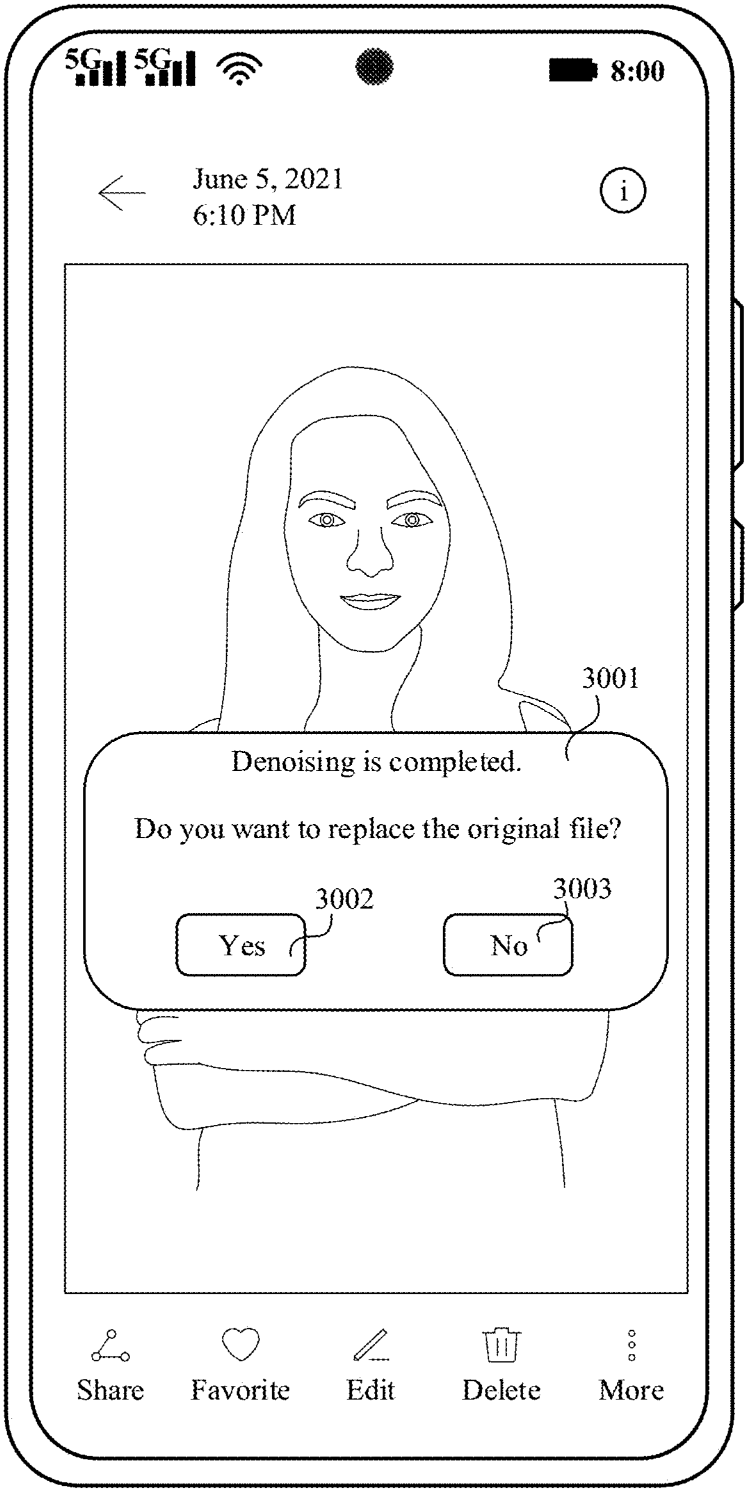
FIG. 30 is a sixth interface diagram involved in a sound signal processing method according to an embodiment of this application.

Exemplarily, after the mobile phone performs 2604 to synthesize the second image data and the second audio data into the second video file, sound pickup and denoising have been completed, and the mobile phone may display a file save tab 3001 as shown in FIG. 30. In the file save tab 3001, the user may be prompted "Denoising is completed. Do you want to replace the original file?", and a first option button 3002 and a second option button 3003 are provided for the user to choose. "Yes" may be displayed on the first option button 3002 to instruct the user to replace the original first video file with the second video file after processing. "No" may be displayed on the second option button 3003 to instruct the user to save the second video file after processing as a file without replacing the first video file. That is, both the first video file and the second video file are retained.

Exemplarily, if the mobile phone detects the user's operation of clicking the first option button 3002 shown in FIG. 30, the mobile phone replaces the original first video file with the second video file after processing in response to the user's operation of clicking the first option button 3002. If the mobile phone detects the user's operation of clicking the second option button 3003 shown in FIG. 30, the mobile phone save the first video file and the second video file separately in response to the user's operation of clicking the second option button 3003.

It may be understood that, in the above embodiment, one frame of image does not correspond to one frame of audio. However, in some embodiments, one frame of image corresponds to a plurality of frames of audios, or a plurality of frames of images correspond to one frame of audio. For example, one frame of image may correspond to three frames of audios, and then, during real-time synthesis in FIG. 23, the mobile phone may synthesize the processed $N^{th}$ frame of image and the processed $3N-2^{th}$ frame of audio, $3N-1^{th}$ frame of audio, and $3N^{th}$ frame of audio to obtain an $N^{th}$ frame of video data.

An embodiment of this application further provides another sound signal processing method. The method is applied to an electronic device, the electronic device including a camera and a microphone. A first target object is within a shooting range of the camera, and a second target object is not within the shooting range of the camera. "A first target object is within a shooting range of the camera" may mean that the first target object is within a field of view range of the camera. For example, the first target object may be the target object in the above embodiment. The second target object may be the non-target object 1 or the non-target object 2 in the above embodiment.

The method includes the following steps:

The electronic device enables the camera.

A preview interface is displayed, where the preview interface includes a first control. The first control may be a video recording button 2102 shown in FIG. 21A(2), or a live video enable button 2401 shown in FIG. 24A.

A first operation on the first control is detected. Shooting is started in response to the first operation. The first operation may be the user's operation of clicking the first control.

A shooting interface is displayed at a first moment, where the shooting interface includes a first image, the first image is an image captured by the camera in real time, the first image includes the first target object, and the first image does not include the second target object. The first moment may be any moment during the shooting. The first image may be each frame of image in the method shown in FIG. 20, FIG. 22, or FIG. 23. The first target object may be the target object in the above embodiment. The second target object may be the non-target object 1 or the non-target object 2 in the above embodiment.

The microphone collects a first audio at the first moment, where the first audio includes a first audio signal and a second audio signal, the first audio signal corresponds to the first target object, and the second audio signal corresponds to the second target object. Taking the scene shown in FIG. 1 as an example, the first audio signal may be a sound signal of the target object. The second audio signal may be a sound signal of the non-target object 1 or a sound signal of the non-target object 2.

A second operation on a first control of the shooting interface is detected. The first control of the shooting interface may be a recording end button 2103 shown in FIG. 21B(1). The second operation may be the user's operation of clicking the first control of the shooting interface.

Shooting is stopped and a first video is saved in response to the second operation, where a first image and a second audio are included at the first moment of the first video, the second audio includes the first audio signal and a third audio signal, the third audio signal is obtained by the electronic device by processing the second audio signal, and energy of the third audio signal is lower than energy of the second audio signal. For example, the third audio signal may be a processed sound signal of the non-target object 1 or a processed sound signal of the non-target object 2.

Optionally, the first audio may further include a fourth audio signal, where the fourth audio signal is a diffuse field noise audio signal. The second audio further includes a fifth audio signal, where the fifth audio signal is a diffuse field noise audio signal. The fifth audio signal is obtained by the electronic device by processing the fourth audio signal. Energy of the fifth audio signal is lower than energy of the fourth audio signal. For example, the fourth audio signal may be the sound signal of the diffuse field noise 1 in the above embodiment or the sound signal of the diffuse field noise 2 in the above embodiment. The fifth audio signal may be a processed sound signal of the diffuse field noise 1 or a processed sound signal of the diffuse field noise 2 obtained after the electronic device performs FIG. 13 or FIG. 17 above.

Optionally, the fifth audio signal being obtained by the electronic device by processing the fourth audio signal includes: performing suppression processing on the fourth audio signal to obtain a sixth audio signal; where the sixth audio signal may be, for example, a processed sound signal of the diffuse field noise 1 obtained after FIG. 13 is performed; and performing compensation processing on the sixth audio signal to obtain the fifth audio signal. The sixth audio signal is a diffuse field noise audio signal, energy of the sixth audio signal is lower than the energy of the fourth audio signal, and the sixth audio signal is less than the fifth audio signal. For example, the fifth audio signal in this case may be a processed sound signal of the diffuse field noise 1 obtained after FIG. 17 is performed.

Some other embodiments of this application provide an electronic device. The electronic device includes: a microphone; a camera; one or more processors; a memory; and a communication module; where the microphone is configured to collect a sound signal during video recording or live streaming; the camera is configured to collect an image signal during the video recording or live streaming; the communication module is configured to communicate with an external device; and the memory stores one or more computer programs, the one or more computer programs include instructions, When the processor executes the computer instructions, the electronic device can perform various functions or steps performed by the mobile phone in the above method embodiments.

Figure 31:
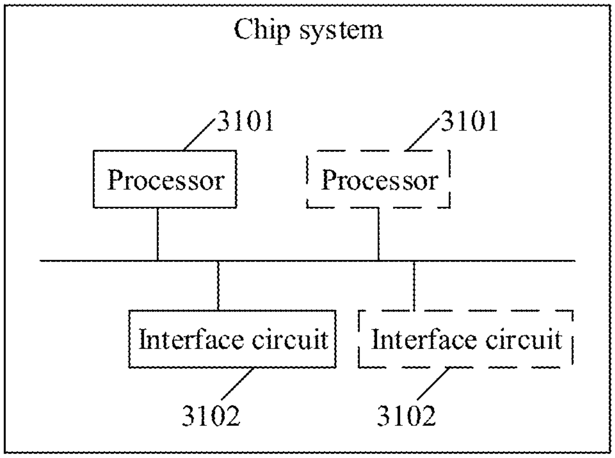
FIG. 31 is a schematic structural diagram of a chip system according to an embodiment of this application.

An embodiment of this application further provides a chip system. The chip system is applicable to a foldable electronic device. As shown in FIG. 31, the chip system includes at least one processor 3101 and at least one interface circuit 3102. The processor 3101 and the interface circuit 3102 may be connected to each other by using a line. For example, the interface circuit 3102 may be configured to receive a signal from another apparatus (for example, a memory of the electronic device). In another example, the interface circuit 3102 may be configured to send a signal to another apparatus (for example, the processor 3101). Exemplarily, the interface circuit 3102 may read instructions stored in the memory and send the instructions to the processor 3101. The instruction, when executed by the processor 3101, may cause the electronic device to perform the steps in the foregoing embodiments. Certainly, the chip system may further include other discrete devices, which is not specifically limited in this embodiment of this application.

An embodiment of this application further provides a computer storage medium. The computer storage medium includes a computer instruction, and the computer instruction, when running on the foldable electronic device, causes the electronic device to perform the functions or steps performed by the mobile phone in the foregoing method embodiments.

An embodiment of this application further provides a computer program product, where the computer program product, when running on a computer, causes the computer to perform the functions or steps performed by the mobile phone in the foregoing method embodiments.

The foregoing descriptions about implementations enable a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a specific work process of the system, apparatus and unit described above, a corresponding process in the foregoing method embodiments may be referred to, and the details are not described herein again.

In this embodiment of this application, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of this application essentially, or the part contributing to the existing technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A sound signal processing method, the method comprising:

enabling, by an electronic device, a camera comprising a shooting range corresponding to a field of view of the camera;

displaying a preview interface, the preview interface comprising a first control;

detecting a first operation on the first control;

starting shooting in response to the first operation;

displaying a shooting interface at a first moment, the shooting interface comprising a first image, the first image being an image captured by the camera in real time, the first image comprising a first target object in the field of view and not comprising a second target object not in the field of view;

collecting, by a microphone comprised on the electronic device, a first audio at the first moment, the first audio comprising a first audio signal and a second audio signal, the first audio signal corresponding to the first target object, the second audio signal corresponding to the second target object;

calculating, by the electronic device, a probability that the second audio signal is within a target orientation, wherein the target orientation is an orientation within a field of view range of the camera during video recording, and wherein the first target object is within the target orientation, and the second target object is not within the target orientation;

determining, by the electronic device, a gain of the second audio signal according to the probability that the second audio signal is within the target orientation;

detecting a second operation on a first control of the shooting interface; and stopping shooting and saving a first video in response to the second operation, wherein a first image and a second audio are comprised at the first moment of the first video, the second audio comprises the first audio signal and a third audio signal, the third audio signal is obtained by the electronic device by applying the gain to the second audio signal in response to the second target object not being in the field of view, and energy of the third audio signal is lower than energy of the second audio signal.

2. The method according to claim 1, wherein the first audio further comprises a fourth audio signal, the fourth audio signal being a diffuse field noise audio signal; and the second audio further comprises a fifth audio signal, the fifth audio signal being a diffuse field noise audio signal, wherein the fifth audio signal is obtained by the electronic device by processing the fourth audio signal, and energy of the fifth audio signal is lower than energy of the fourth audio signal.

3. The method according to claim 2, wherein the fifth audio signal being obtained by the electronic device by processing the fourth audio signal comprises:

performing suppression processing on the fourth audio signal to obtain a sixth audio signal; and performing compensation processing on the sixth audio signal to obtain the fifth audio signal, wherein the sixth audio signal is a diffuse field noise audio signal, energy of the sixth audio signal is lower than the energy of the fourth audio signal, and the sixth audio signal is less than the fifth audio signal.

4. The method according to claim 2, wherein the fifth audio signal being obtained by the electronic device by processing the fourth audio signal comprises:

configuring gain of the fourth audio signal to be less than 1; and obtaining the fifth audio signal according to the fourth audio signal and the gain of the fourth audio signal.

5. The method according to claim 1, wherein the third audio signal being obtained by the electronic device by processing the second audio signal comprises:

configuring the gain of the second audio signal to be less than 1; and obtaining the third audio signal according to the second audio signal and the gain of the second audio signal.

6. The method according to claim 1, wherein the third audio signal being obtained by the electronic device by processing the second audio signal comprises:

obtaining, by the electronic device, the third audio signal according to the second audio signal and the gain of the second audio signal, wherein the gain of the second audio signal is equal to 1 if the probability that the second audio signal is within the target orientation is greater than a preset probability threshold; and the gain of the second audio signal is less than 1 if the probability that the second audio signal is within the target orientation is less than or equal to the preset probability threshold.

7. The method according to claim 1, wherein the method further comprises:

processing, by the electronic device, the first audio to obtain the second audio after the microphone collects the first audio at the first moment.

8. The method according to claim 1, wherein the method further comprises:

processing, by the electronic device, the first audio to obtain the second audio after stopping shooting in response to the second operation.

9. An electronic device, wherein the electronic device comprises:

a microphone configured to collect a sound signal during video recording or live streaming;

a camera configured to collect an image signal during the video recording or live streaming;

one or more processors; and a memory, storing instructions that, when executed by the one or more processors, cause the electronic device to, enable the camera comprising a shooting range corresponding to a field of view of the camera;

display a preview interface, the preview interface comprising a first control;

detect a first operation on the first control;

start shooting in response to the first operation;

display a shooting interface at a first moment, the shooting interface comprising a first image, the first image being an image captured by the camera in real time, the first image comprising a first target object in the field of view and not comprising a second target object not in the field of view;

collect, by the microphone, a first audio at the first moment, the first audio comprising a first audio signal and a second audio signal, the first audio signal corresponding to the first target object, the second audio signal corresponding to the second target object;

calculate a probability that the second audio signal is within a target orientation, wherein the target orientation is an orientation within a field of view range of the camera during video recording, and wherein the first target object is within the target orientation, and the second target object is not within the target orientation;

determine a gain of the second audio signal according to the probability that the second audio signal is within the target orientation;

detect a second operation on a first control of the shooting interface; and stop shooting and saving a first video in response to the second operation, wherein a first image and a second audio are comprised at the first moment of the first video, the second audio comprises the first audio signal and a third audio signal, the third audio signal is obtained by the electronic device by applying the gain to the second audio signal in response to the second target object not being in the field of view, and energy of the third audio signal is lower than energy of the second audio signal.

10. The electronic device according to claim 9, wherein the first audio further comprises a fourth audio signal, the fourth audio signal being a diffuse field noise audio signal; and the second audio further comprises a fifth audio signal, the fifth audio signal being a diffuse field noise audio signal, wherein the fifth audio signal is obtained by the electronic device by processing the fourth audio signal, and energy of the fifth audio signal is lower than energy of the fourth audio signal.

11. The electronic device according to claim 10, wherein the fifth audio signal being obtained by the electronic device by processing the fourth audio signal, the electronic device is further to:

perform suppression processing on the fourth audio signal to obtain a sixth audio signal; and perform compensation processing on the sixth audio signal to obtain the fifth audio signal, wherein the sixth audio signal is a diffuse field noise audio signal, energy of the sixth audio signal is lower than the energy of the fourth audio signal, and the sixth audio signal is less than the fifth audio signal.

12. The electronic device according to claim 10, wherein the fifth audio signal being obtained by the electronic device by processing the fourth audio signal, the electronic device is further to:

configure gain of the fourth audio signal to be less than 1; and obtain the fifth audio signal according to the fourth audio signal and the gain of the fourth audio signal.

13. The electronic device according to claim 9, wherein the third audio signal being obtained by the electronic device by processing the second audio signal, the electronic device is further to:

configure the gain of the second audio signal to be less than 1; and obtain the third audio signal according to the second audio signal and the gain of the second audio signal.

14. The electronic device according to claim 9, wherein the third audio signal being obtained by the electronic device by processing the second audio signal, the electronic device is further to:

obtain the third audio signal according to the second audio signal and the gain of the second audio signal, wherein the gain of the second audio signal is equal to 1 if the probability that the second audio signal is within the target orientation is greater than a preset probability threshold; and the gain of the second audio signal is less than 1 if the probability that the second audio signal is within the target orientation is less than or equal to the preset probability threshold.

15. The electronic device according to claim 9, wherein when executed by the processor, cause the electronic device to:

process the first audio to obtain the second audio after the microphone collects the first audio at the first moment.

16. The electronic device according to claim 9, wherein when executed by the processor, cause the electronic device to:

process the first audio to obtain the second audio after stopping shooting in response to the second operation.

17. A non-transitory computer-readable storage medium, storing a computer program, wherein the computer program, when executed on an electronic device, causes the electronic device to:

enable a camera comprising a shooting range corresponding to a field of view of the camera;

display a preview interface, the preview interface comprising a first control;

detect a first operation on the first control;

start shooting in response to the first operation;

display a shooting interface at a first moment, the shooting interface comprising a first image, the first image being an image captured by the camera in real time, the first image comprising a first target object in the field of view and not comprising a second target object not in the field of view;

collect, by a microphone, a first audio at the first moment, the first audio comprising a first audio signal and a second audio signal, the first audio signal corresponding to the first target object, the second audio signal corresponding to the second target object;

calculate a probability that the second audio signal is within a target orientation, wherein the target orientation is an orientation within a field of view range of the camera during video recording, and wherein the first target object is within the target orientation, and the second target object is not within the target orientation;

determine a gain of the second audio signal according to the probability that the second audio signal is within the target orientation;

detect a second operation on a first control of the shooting interface; and stop shooting and saving a first video in response to the second operation, wherein a first image and a second audio are comprised at the first moment of the first video, the second audio comprises the first audio signal and a third audio signal, the third audio signal is obtained by the electronic device by applying the gain to the second audio signal in response to the second target object not being in the field of view, and energy of the third audio signal is lower than energy of the second audio signal.

18. The non-transitory computer-readable storage medium according to claim 17, wherein the first audio further comprises a fourth audio signal, the fourth audio signal being a diffuse field noise audio signal; and the second audio further comprises a fifth audio signal, the fifth audio signal being a diffuse field noise audio signal, wherein the fifth audio signal is obtained by the electronic device by processing the fourth audio signal, and energy of the fifth audio signal is lower than energy of the fourth audio signal.

19. The non-transitory computer-readable storage medium according to claim 18, wherein the fifth audio signal being obtained by the electronic device by processing the fourth audio signal, the electronic device is further to:

perform suppression processing on the fourth audio signal to obtain a sixth audio signal; and perform compensation processing on the sixth audio signal to obtain the fifth audio signal, wherein the sixth audio signal is a diffuse field noise audio signal, energy of the sixth audio signal is lower than the energy of the fourth audio signal, and the sixth audio signal is less than the fifth audio signal.

20. The non-transitory computer-readable storage medium according to claim 18, wherein the fifth audio signal being obtained by the electronic device by processing the fourth audio signal, the electronic device is further to:

configure gain of the fourth audio signal to be less than 1; and obtain the fifth audio signal according to the fourth audio signal and the gain of the fourth audio signal.

* * * * *